United States Patent
Umeda et al.

(10) Patent No.: US 7,666,482 B2
(45) Date of Patent: Feb. 23, 2010

(54) RETARDATION FILM, POLARIZING PLATE AND VERTICAL ALIGNMENT MODE LIQUID CRYSTAL DISPLAY

(75) Inventors: Hiroki Umeda, Hino (JP); Noriyasu Kuzuhara, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 135 days.

(21) Appl. No.: 11/538,490

(22) Filed: Oct. 4, 2006

(65) Prior Publication Data

US 2007/0097302 A1 May 3, 2007

(30) Foreign Application Priority Data

Oct. 12, 2005 (JP) .............................. 2005-297713
Oct. 13, 2005 (JP) .............................. 2005-298751

(51) Int. Cl.
*G02F 1/1335* (2006.01)

(52) U.S. Cl. ...................... 428/1.3; 428/1.31; 428/1.33; 349/96; 349/118

(58) Field of Classification Search .................. 428/1.3, 428/1.31, 1.33; 349/96, 117–118
See application file for complete search history.

(56) References Cited

U.S. PATENT DOCUMENTS

| 5,550,661 | A  | * | 8/1996 | Clark et al. .................. 349/117 |
| 6,814,914 | B2 | * | 11/2004 | Tasaka et al. ............... 264/217 |
| 2002/0149725 | A1 | * | 10/2002 | Hashimoto ................... 349/117 |
| 2003/0020208 | A1 | * | 1/2003 | Tasaka et al. ............... 264/217 |
| 2003/0219549 | A1 | * | 11/2003 | Shimizu ..................... 428/1.1 |
| 2005/0163943 | A1 | * | 7/2005 | Uchiyama et al. .......... 428/1.31 |
| 2007/0097302 | A1 | * | 5/2007 | Umeda et al. ............... 349/118 |

\* cited by examiner

*Primary Examiner*—Sophie Hon
(74) *Attorney, Agent, or Firm*—Lucas & Mercanti, LLP

(57) ABSTRACT

A retardation film manufactured as a long roll film having a slow axis in a lateral direction of the long roll film, wherein an elastic modulus in an in-plane slow axis direction $\epsilon_s$ and an elastic modulus in an in-plane fast axis direction $\epsilon_f$ meet Condition (1), the in-plane fast axis direction being perpendicular to the in-plane slow axis direction:

$1.26 \leq \epsilon_s/\epsilon_f \leq 2.60$     Condition (1).

11 Claims, 1 Drawing Sheet

RETARDATION FILM, POLARIZING PLATE AND VERTICAL ALIGNMENT MODE LIQUID CRYSTAL DISPLAY

This application is based on Japanese Patent Application No. 2005-297713 filed on Oct. 12, 2005, and No. 2005-298751 filed on Oct. 13, 2005, in Japanese Patent Office, the entire content of which is hereby incorporated by reference.

FIELD OF THE INVENTION

The present invention relates to a retardation film, a polarizing plate and a vertical alignment mode liquid crystal display, and particularly relates to a retardation film, a polarizing plate and a vertical alignment mode liquid crystal display in which light leak of a polarizing plate has been depressed and front contrast of a liquid crystal display has been improved.

BACKGROUND OF THE INVENTION

Heretofore, a retardation plate includes such as a type pasted on a polarizing plate and a type directly adhered on PVA (a structure combined with a polarizing plate protective film), however, a type in which a polarizing plate protective film has a function of a retardation plate has come to be a main current due to a requirement of decreasing the number of part materials or of cost down of part materials (for example, refer to patent literature 1). These films are subjected to a stretching treatment to be provided with a retardation control function and it has been considered that elastic modulus in the direction perpendicular to the stretching direction should be kept as high as possible to depress the dimension change of a polarizing plate.

For that purpose, it has been necessary to keep a certain amount of orientation remaining in the direction perpendicular to the stretching direction not to make polymer main chains excessively arranged in one direction at the time of stretching. Among retardation film, there is a type in which the film stretching direction and the absorption direction of polarizing film are approximately perpendicular. Heretofore, this film has been considered to be provided with a high elastic modulus as possible in the direction perpendicular to the stretching direction to restrain shrinkage in the absorption direction of a polarizing plate, when it is utilized being pasted on a polarizing plate or as a polarizing plate protective film. However, in the case of elastic modulus being in a range of a general polarizing plate protective film and a retardation plate, such as not more than 5,000 MPa at a film thickness of 80 μm, a further increased elastic modulus scarcely contributes to depression of shrinkage of a polarizing plate and even causes remaining stress in film at stretching, whereby an opposite result against the essential object may result with excess increase of elastic modulus.

Recently, in a liquid crystal TV, front contrast is required to be increased higher than before and various requirements and proposals, such as not only improvement of a polarization degree of a polarizing plate but also control of transparency, moisture permeability and a retardation value of retardation film, and decrease of an anti-glare treatment on the film surface, have been made (for example, refer to patent literatures 2, 3 and 4).

Front contrast is a ratio of a quantity of light at white display to a quantity of light at black display, and rises by increasing a quantity of light at white or decreasing a quantity of light at black. As for retardation film, in addition to the contents described before, proposed has been, for example, a method in which light leak at black display is depressed by restraining haze of film (for example, refer to patent literature 5).

However, contrast is not necessarily raised by the technologies disclosed above and sometimes there may cause phenomena to decrease the contrast.

Further, it has been disclosed that elastic modulus of cellulose ester film in the machine direction and in the direction perpendicular thereto is adjusted into a predetermined range, and, in this range, cellulose ester film, in which values of retardation in the thickness direction and retardation in the plane are suitably adjusted, can be provided. However, only limited information has been indicated concerning front contrast being improved by controlling the ratio of elastic modulus (for example, refer to patent literature 6).

[Patent literature 1] JP-A 2003-270442 (Hereinafter, JP-A refers to Japanese Patent Publication Open to Public Inspection No.)

| [Patent literature 1] | JP-A 2003-270442 (Hereinafter, JP-A refers to Japanese Patent Publication Open to Public Inspection No.) |
|---|---|
| [Patent literature 2] | JP-A 2005-55601 |
| [Patent literature 3] | JP-A 2005-17435 |
| [Patent literature 4] | JP-A 2003-222713 |
| [Patent literature 5] | JP-A 7-294736 |
| [Patent literature 6] | JP-A 2001-100039 |

SUMMARY OF THE INVENTION

An object of the present invention is to provide a retardation film, a polarizing plate and a vertical alignment mode liquid crystal display in which light leak of the polarizing plate has been depressed and front contrast of the liquid crystal display has been improved.

One of the aspects of the present invention to achieve the above object is a retardation film manufactured as a long roll film having a slow axis in a lateral direction of the long roll film, wherein an elastic modulus in an in-plane slow axis direction $\epsilon_s$ and an elastic modulus in an in-plane fast axis direction $\epsilon_f$ meet Condition (1), the in-plane fast axis direction being perpendicular to the in-plane slow axis direction; an in-plane retardation value Ro is 30 to 100 nm and a retardation value in a thickness direction of the retardation film Rt is 70 to 300 nm, Ro and Rt being measured at a wavelength of 589 nm; and Rt/Ro is 2 to 5, $$1.26 \leq \epsilon_s/\epsilon_f \leq 2.60 \qquad \text{Condition (1)}$$

DESCRIPTION OF THE PREFERRED EMBODIMENTS

Figure 1:
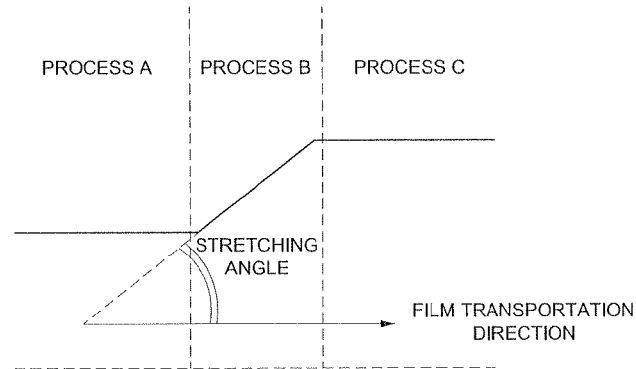
FIG. 1 is a drawing to explain a stretching angle in a stretching process.

The above object of the present invention is achieved by the following structures.

1. A retardation film manufactured as a long roll film having a slow axis in a lateral direction of the long roll film, wherein
an elastic modulus in an in-plane slow axis direction $\epsilon_s$ and an elastic modulus in an in-plane fast axis direction $\epsilon_f$ meet Condition (1), the in-plane fast axis direction being perpendicular to the in-plane slow axis direction;
an in-plane retardation value Ro is 30 to 100 nm and a retardation value in a thickness direction of the retardation film Rt is 70 to 300 nm, Ro and Rt being measured at a wavelength of 589 nm; and
Rt/Ro is 2 to 5, $$1.26 \leq \epsilon_s/\epsilon_f \leq 2.60 \quad \text{Condition (1)}$$

$$Ro = (nx - ny) \times d$$

$$Rt = \{(nx + ny)/2 - nz\} \times d$$

wherein nx represents a refractive index in the in-plane slow axis direction, ny represents a refractive index in the in-plane fast axis direction, nz represents a refractive index in the thickness direction of the retardation film and d represents a thickness of the retardation film (nm).

2. The retardation film of Item 1, wherein the elastic moduli $\epsilon_s$ and $\epsilon_f$ meet Conditions (2) and (3):

$$700 \leq \epsilon_s - \epsilon_f \leq 2450 \quad \text{Condition (2)}$$

$$100 \leq (\epsilon_s + \epsilon_f) \times d \leq 500 \quad \text{Condition (3)}$$

wherein a unit of $\epsilon$ is MPa and a unit of d is mm.

3. The retardation film of Item 1 or Item 2, wherein
the retardation film comprises a cellulose ester; and
the cellulose ester comprises at least one selected from the group consisting of cellulose acetate, cellulose acetate propionate, and cellulose acetate butyrate.

4. The retardation film of any one of Items 1 to 3, wherein
the retardation film comprises a retardation control agent.

5. The retardation film of Item 1 or Item 2, wherein
the retardation film comprises a cycloolefine polymer as a main component.

6. The retardation film of Item 1 or Item 2, wherein
the retardation film comprises a polycarbonate polymer as a main component.

7. The retardation film of any one of Items 1 to 3, wherein
the retardation film comprises a polyvinyl acetal polymer as a main component.

8. The retardation film of Item 1 or Item 2, wherein
the retardation film comprises a support having thereon an optical anisotropic layer; and the retardation film has an optical axis.

9. A polarizing plate comprising a polarizer provided with a retardation film of any one of Items 1 to 8 at least on one surface of the polarizer, wherein
the retardation film is provided on the polarizer so that a slow axis of the retardation film is perpendicular or parallel to a transmission axis of the polarizer.

10. A vertical alignment mode liquid crystal display employing the polarizing plate of Item 9.

The present invention can provide a retardation film, a polarizing plate and a vertical alignment mode liquid crystal display in which light leak of the polarizing plate has been depressed and front contrast of the liquid crystal display has been improved.

Contrast referred in the present invention means front contrast unless otherwise mentioned.

An object of the present invention is to improve this front contrast. Front contrast means front contrast of the whole display and does not means local contrast of a partial portion. For example, there is a phenomenon such as contrast decrease at four corners or contrast decrease due to light leak generated in a frame form; however, these are locally generated and means different from front contrast which is an object to be improved by the present invention.

Front contrast referred in the present invention means contrast of the whole display plane, and, for example, a case to improve a dynamic phenomenon, in which contrast is locally deteriorated under a specific condition (durability test of such as humidity and heat or dry), has a quite different mechanism and does not coincides with the content of the present invention.

Improvement of front contrast referred in the present invention can be achieved by depressing causes of light leak and, for example, the above-described dynamic phenomenon or those locally generated is often depress contrast decrease due to a coefficient of optical elastic modulus, a mechanism of which is quite different from the present invention.

In the following, the most preferable embodiment to practice the present invention will be detailed; however, the present invention is not limited thereto.

Retardation film of the present invention is long roll film which is characterized in that said film is provided with a slow axis along the width direction of film and elastic modulus in the slow axis in the film plane $\epsilon s$ and elastic modulus in the fast axis in the film plane (the direction perpendicular to $\epsilon s$) $\epsilon f$ satisfy the relationship of following Condition (1).

$$1.26 \leq \epsilon_s/\epsilon_f \leq 2.60 \quad \text{Condition (1)}$$

As a result of extensive study concerning the above-described problems, the inventers of the present invention have found a surprising fact that a great effect is exhibited to depress light leak of the whole image plane at the time of black display and to improve front contrast by positively providing anisotropy with respect to elastic modulus in the stretching direction and in the direction perpendicular thereto, of retardation film, resulting in achievement of the present invention.

This is considered that such as generation of micro-crystals (or crystallization) of polymer itself and additives, generation of micro-voids, and micro-phase separation of polymer and additives can be depressed by rapid orientation of polymer which constitutes film, thereby unnecessary light leak can be restrained.

Preparation of retardation film according to the present invention is preferably performed under the following manufacturing condition in the manufacturing of retardation film described later, however, is not limited thereto.

It is effective to depress elongation or to shrink in the direction approximately perpendicular to the stretching direction as much as possible, during film being peeled off from a casting support until being stretched. Specifically, to decrease the tension of peeling-off and transporting, it is effective to perform positive drying in a state of peeling-off tension being cut while film immediately after peeled off is exposed to cold wind of not higher than 20° C., and to keep the glass transition temperature of film in a range of −30--1° C. in a stretching process of the film.

Further, it is effective to provide a heating treatment at not higher than the glass transition temperature of film and not lower than 100° C. for 10-60 minutes, and to perform drying at a rate of atmosphere replacement of not less than 12 times/hour, in a drying or heating treatment process after the film has been stretched. Further, it is effective to adjust tension applied to film at the time of stretching to less than $1.96 \times 10^3$ N per 1 m at the stretching portion.

[Measurement of Elastic Modulus $\epsilon_s$, $\epsilon_f$]

A mean refractive index of a film sample is measured by use of an Abbe's refractometer (1T), and elastic modulus in the direction of the slow axis and that in the direction perpendicular to the slow axis, $\epsilon_s$ and $\epsilon_f$, are measured. For example, in the case of retardation film having been stretched in the TD direction (the width direction), generally, the slow axis is along the TD direction and the direction perpendicular to the slow axis is along the MD direction (the length direction). In this case, the measurement of elastic modulus may be performed with respect to the MD direction and the TD direction according to JIS K 7127.

In the case of the slow axis being the TD direction and the direction perpendicular to the slow axis being the MD direction, each sample, after having been kept under an environment of 23±2° C. and 50±5% RH for 24 hours, is cut in a strip form of 10 mm wide×200 mm long so as to make the MD direction and the TD direction of each sample become longitudinal directions, then the above-described strip form sample is set on TG-2KN Type Tensile Testing Machine produced by Minebea Co. Ltd. at a chucking pressure of 0.25 MPa and a standard line spacing distance of 100±10 mm and is pulled at a tension rate of 100±10 mm/min.

Then, based on the tension stress—distortion curve, while setting the elastic modulus calculation starting point to 10N and the end point to 30N, a tangent line between them is extrapolated to find elastic modulus in the MD direction and the TD direction.

In the following, the present invention will be detailed.

With respect to retardation film according to the present invention, preferable requirements include such as easy manufacturing, good adhesion with polarizer film and to be optically transparent, and polymer film is specifically preferable.

To be transparent referred in the present invention indicates that transmittance of visible light is not less than 60%, preferably not less than 80% and specifically preferably not less than 90%.

The aforesaid polymer film is not specifically limited provided having the above-described characteristics, however, includes cellulose ester type film such as cellulose diacetate film, cellulose triacetate film, cellulose acetate butyrate film and cellulose acetate propionate film, polyester type film, polycarbonate type film, polyaryrate type film, polysulfon (including polyethersulfon) type film, polyester film such as polyethylene terephthalate and polyethylene naphthalate, polyethylene film, polypropylene film, cellophane, polyvinylidene chloride film, polyvinyl alcohol film, ehtylenevinyl alcohol film, syndiotactic polystyrene type film, polycarbonate film, cycloolefin type polymer film (Arton, manufactured by JRS Corp.), Zeonex and Zeonoa (manufactured by Nippon Zeon Corp.), polymethylpentene film, polyether ketone film, polyether ketone imide film, polyamide film, fluorine resin film, nylon film, polymethylmethacrylate film, acryl film, polyvinyl acetal film and a glass plate. Among them, preferable are cellulose ester type film, cycloolefin polymer film, polycarbonate type film, and polysulfon (including polyethersulfon) type film, and in the present invention, specifically preferably utilized are cellulose ester film, cycloolefin polymer film, polycarbonate film and polyvinyl acetal film, with respect to such as manufacturing, a cost aspect, transparency and an adhesive property. These films may be those manufactured either by a fusion casting method or a solution casting method.

Further, retardation film of the present invention is also preferably polymer film, in which an optical anisotropic layer comprising a polymer layer of such as polyamide and polyimide is provided on the above-described film, which is described in such as JP-A Nos. 2000-190385, 2004-4474 and 2005-195811.

[Cellulose Ester Film]

Cellulose ester preferable as a primary component of retardation film according to the present invention is preferably cellulose acetate, cellulose propionate, cellulose butyrate, cellulose acetate butyrate, cellulose acetate phthalate, cellulose acetate propionate and cellulose acetate propionate butyrate and among them, cellulose acetate butyrate, cellulose acetate phthalate and cellulose acetate propionate are specifically preferably utilized.

Specifically, utilized is a transparent film substrate provided with mixed fatty acid ester of cellulose having X and Y of the following range, when a substitution degree of an acetyl group is X and a substitution degree of a propionyl group or a butyryl group is Y.

$$2.0 \leq X+Y \leq 2.6 \qquad \text{Equation (I)}$$

$$0.1 \leq Y \leq 1.2 \qquad \text{Equation (II)}$$

Further, cellulose acetate propionate satisfying $2.4 \leq X+Y \leq 2.6$ and $1.4 \leq X \leq 2.3$ (total substitution degree of an acyl group=X+Y) is preferable. Among them specifically preferable are cellulose acetate propionate and cellulose acetate butyrate satisfying $2.4 \leq X+Y \leq 2.6$, $1.7 \leq X \leq 2.3$ and $0.1 \leq Y \leq 0.9$ (total substitution degree of an acyl group=X+Y). The substitution degree of C6 position of cellulose is preferably not less than 0.75, and more preferably 0.75-0.95. The portion not substituted with an acyl group generally exists as a hydroxyl group. These cellulose esters can be synthesized by a method well known in the art.

In the case of utilizing cellulose ester film as retardation film according to the present invention, cellulose as a raw material of cellulose ester is not specifically limited, however, includes such as cotton linter, wood pulp (derived from an acerose tree, and a broard-leaved tree) and kenaf.

Further, cellulose esters prepared from them can be utilized by mixing at an arbitrary ratio, respectively. These cellulose esters can be prepared, when an acylation agent is acid anhydride (such as acetic acid anhydride, propionic acid anhydride and butyric acid anhydride), by utilizing an organic solvent such as organic acid like acetic acid and methylene chloride and reacting said acylation agent with a cellulose raw material by use of a proton catalyst such as sulfuric acid.

In the case of an acylation agent being acid chloride (such as $CH_3COCl$, $C_2H_5COCl$ and $C_3H_7COCl$), the reaction is performed employing a basic compound such as amine as a catalyst. Specifically, the cellulose ester can be synthesized with reference to such as a method described in JP-A 10-45804. Further, cellulose ester utilized in the present invention is one in which reaction is performed by mixing the above-described acylation agents corresponding to each substitution degree, and these acylation agents reacts with an hydroxyl group of a cellulose molecule to prepare cellulose ester. A cellulose molecule is comprised of many glucose units connected, and each glucose unit has three hydroxyl groups. The number of acyl groups derived to these three hydroxyl groups is called as a substitution degree (mole %). For example, in cellulose triacetate, an acetyl group is bonded to every hydroxyl groups of a glucose unit (actually 2.6-3.0).

As cellulose ester utilized in the present invention, mixed fatty acid ester of cellulose such as cellulose acetate propionate, cellulose acetate butyrate and cellulose acetate propionate butyrate, which is bonded with a propionate group or a butyrate group in addition to an acetyl group, is specifically preferably utilized. Herein, cellulose acetate propionate which contains a propionate group as a substituent is superior in water resistance and useful as film for a liquid crystal display.

A substitution degree of an acyl group can be measured based on the definition of ASTM-D817-96.

A number average molecular weight of cellulose ester is preferably 40,000-200,000 with respect to strong mechanical strength when being molded and suitable dope viscosity in the case of a solution casting method, and more preferably 50,000-150,000. Further, weight average molecular weight (Mw)/number average molecular weight (Mw) is preferably in a range of 1.4-4.5.

These cellulose ester films are preferably manufactured generally by a method called as a solution casting method in which a cellulose ester solution (a dope) is cast on a casting support of an infinitely transporting endless metal belt or a rotating metal drum to be formed into film.

An organic solvent utilized to prepare these dopes is one capable of dissolving cellulose ester and having a suitable boiling point, and includes such as methylene chloride, methyl acetate, ethyl acetate, methyl acetoacetate, acetone, tetrahydrofuran, 1,3-dioxolan, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitromethane and 1,3-dimethyl-2-imidazolidinone, however, a preferable organic solvent (that is a good solvent) includes such as an organic halogenide compound such as methylene chloride, a dioxolan derivative, methyl acetate, ethyl acetate, acetone and methyl acetoacetate.

Further, a boiling point of a utilized organic solvent is preferably 30-80° C. in view of preventing foaming in a web at the time of drying solvent from a web (dope film) having been formed on a casting support in a solvent evaporation process, and a boiling point of the above-described good solvent is that of such as methylene chloride (boiling point of 40.4° C.), methyl acetate (boiling point of 56.32° C.), acetone (boiling point of 56.3° C.) and ethyl acetate (boiling point of 76.82° C.).

Among the above-described good solvents, methylene chloride or methyl acetate, which is excellent in solubility, is preferably utilized.

In addition to the above-described organic solvent, 0.1-40 weight % of alcohol having a carbon number of 1-4 is preferably incorporated. Specifically preferably 5-30 weight % of the foresaid alcohol is incorporated. These are utilized as a gelation solvent to make a web easily peelable from a casting support due to gelation of a web (dope film) when a solvent starts to evaporate to increase an alcohol ratio, after the above-described dope has been cast on a casting support, whereby the web is strengthened; or are also provided with a role to accelerate dissolution of cellulose ester by non-chlorine type organic solvent in the case of these ratio being small.

Alcohol having a carbon number of 1-4 includes such as methanol, ethanol, n-propanol, iso-propanol, n-butanol, sec-butanol and tert-butanol.

Among these solvents, ethanol is preferable because of good stability of a dope, a relatively low boiling point and an excellent drying property. Preferably, a solvent, comprising 5-30 weight % of ethanol and 70-95 weight % of methylene chloride, is preferably utilized. Methyl acetate is also utilized instead of methylene chloride. In this case, a dope may be prepared by a cooled dissolution method.

In the case of utilizing cellulose ester film for retardation film according to the present invention, a plastisizer such as described below is preferably incorporated with respect to flexibility, moisture permeability and dimension stability. A plastisizer utilized is not specifically limited, however, is preferably provided with a functional group which is capable of interacting with a cellulose derivative by such as hydrogen bonding not to generate haze in film and not to bleed out or evaporate from film.

Such a functional group includes a hydroxyl group, an ether group, a carbonyl group, an ester group, a carboxylic acid residual group, an amino group, an imino group, an amido group, an imido group, a cyano group, a nitro group, a sulfonyl group, a sulfonic acid residual group, a phosphonyl group and a phosphonic acid residual group, however, preferably is a carbonyl group, an ester group or a sulfonyl group.

Phosphate ester plasticizers and non-phosphate ester plasticizers are preferably usable as plasticizers employed in the present invention.

Examples of phosphate ester plasticizers include triphenyl phosphate, tricresyl phosphate, cresyl diphenyl phosphate, octyl diphenyl phosphate, diphenyl biphenyl phosphate, trioctyl phosphate and tributyl phosphate.

Examples of non-phosphate ester plasticizers include a phthalate ester plasticizer, a trimellitate ester plasticizer, a pyromellitate ester plasticizer, a polyalcohol ester plasticizer, a glycolate ester plasticizer, a citrate ester plasticizer, an aliphatic acid ester plasticizer, a polyester plasticizer and a polycarboxylic acid ester plasticizer. Of these, preferable are a polyalcohol ester plasticizer, a polyester plasticizer and a polycarboxylic acid ester plasticizer with respect to obtaining the effect of the present invention.

A polyalcohol ester plasticizer is a plasticizer containing an ester of an aliphatic polyalcohol of divalent or more and a monocarboxylic acid, and it preferably contains an aromatic ring or a cycloalkyl ring in thr molecule.

The polyalcohol usable in the present invention is expressed by following Formula (1).

$$R1_1\text{-}(OH)n \qquad \text{Formula (1)}$$

wherein, $R1_1$ represents an organic group having a valence of n, n represents an integer of two or more.

Examples of a preferable polyalcohol include: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol, pentaerythritol and dipentaerythritol. Of these, preferable are trimethylol propane and pentaerythritol.

The monocarboxylic acid to be used in the polyalcohol ester of the present invention is not specifically limted, and any known aliphatic monocarboxylic acid, alicyclic monocarboxylic acid and aromatic monocarboxylic acid may be employed. Specifically, aliphatic monocarboxylic acid and aromatic monocarboxylic acid are preferable, since moisture permeability and retainability are improved. Examples of the preferable monocarboxylic acid are listed below but the present invention is not limited thereto.

A straight chain or branched chain carboxylic acid having 1 to 32 carbon atoms is preferably employed. The number of carbon atoms is more preferably 1-20, and specifically preferably 1-10. The addition of acetic acid is preferable for raising the compatibility with a cellulose ester, and the mixed use of acetic acid and another carboxylic acid is also preferable.

As the preferable aliphatic monocarboxylic acid, saturated aliphatic acids such as acetic acid, propionic acid, butylic acid, valeric acid, caproic acid, enantic acid, caprylic acid, pelargonic acid, capric acid, 2-ethyl-hexane acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid and lacceric acid; and unsaturated aliphatic acids such as undecylenic acid, oleic acid, sorbic acid, linolic acid, linolenic acid and arachidonic acid can be exemplified. Examples of preferable alicyclic carboxylic acid include cyclopentane carboxylic acid, cyclohexane carboxylic acid, cyclooctane carboxylic acid and derivatives thereof. Examples of preferable aromatic carboxylic acid include ones formed by introducing an alkyl group into the benzene ring of benzoic acid such as benzoic acid and toluic acid; and an aromatic monocarboxylic acid having two or more benzene rings such as biphenylcarboxylic acid, naphthalene carboxylic acid and tetralin carboxylic acid, and derivatives thereof, of these, benzoic acid is specifically preferable.

The molecular weight of the polyalcohol ester is preferably 300-1500, and more preferably 350-750. Larger molecular weight is preferable since volatility decreases, while smaller molecular weight is preferable with respect to moisture permeability and compatibility with cellulose ester. The carboxylic acid to be employed in the polyalcohol ester may be one kind or a mixture of two or more kinds of them. The OH groups in the polyalcohol may be fully esterified or a part of OH groups may be left unreacted. Specific examples of the polyalcohol ester are listed below.

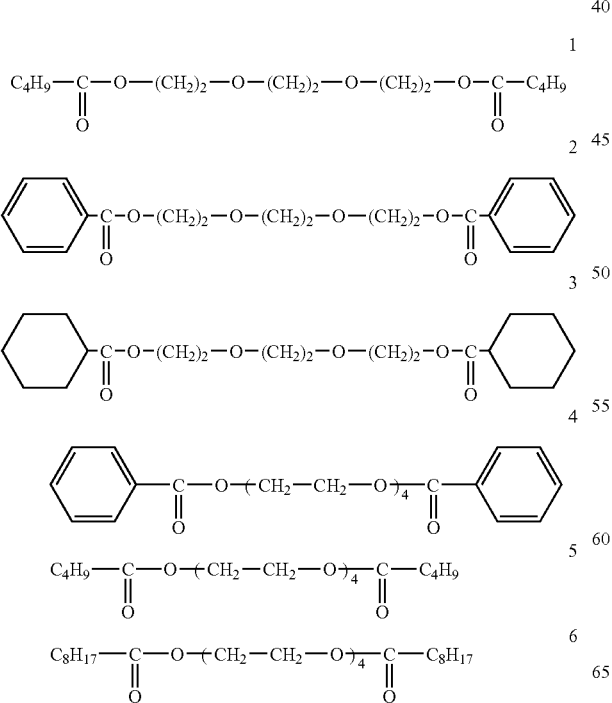

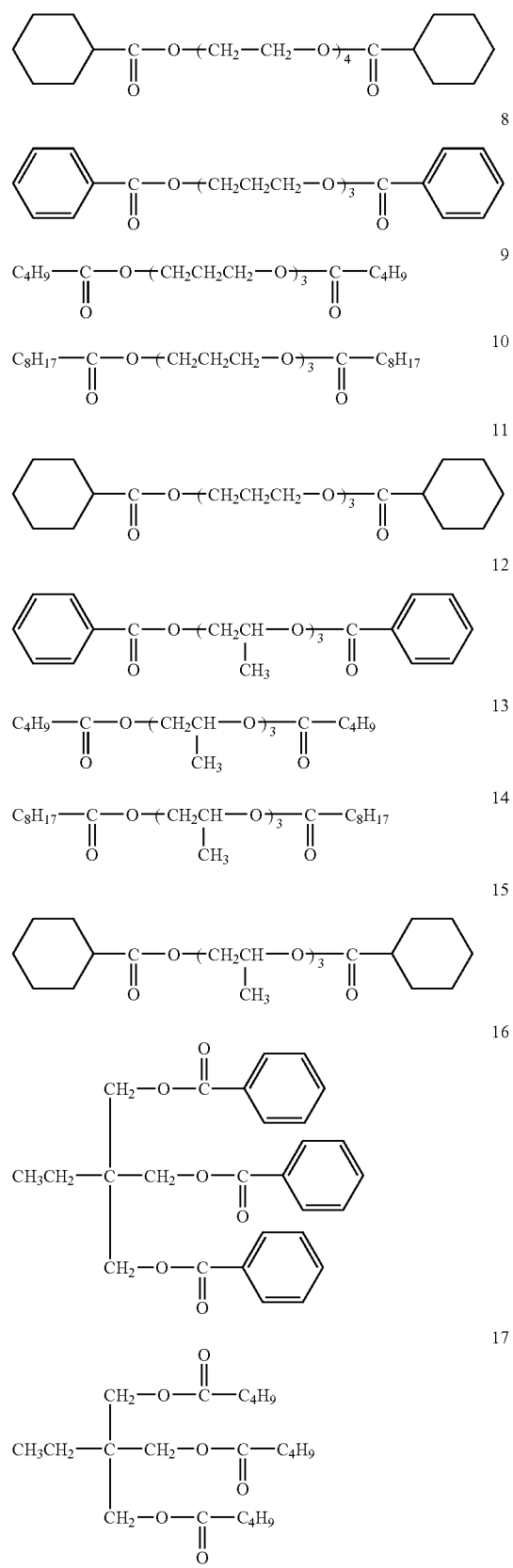

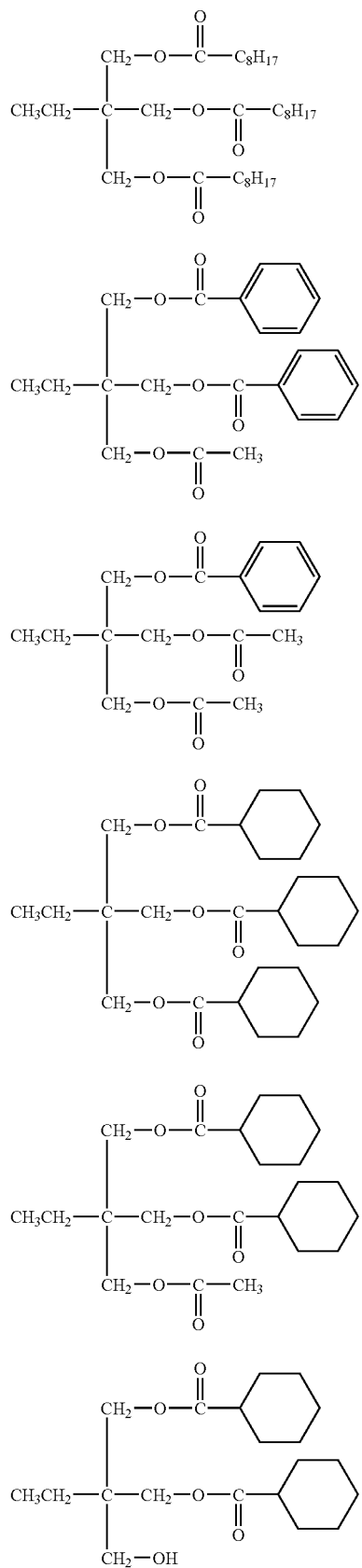
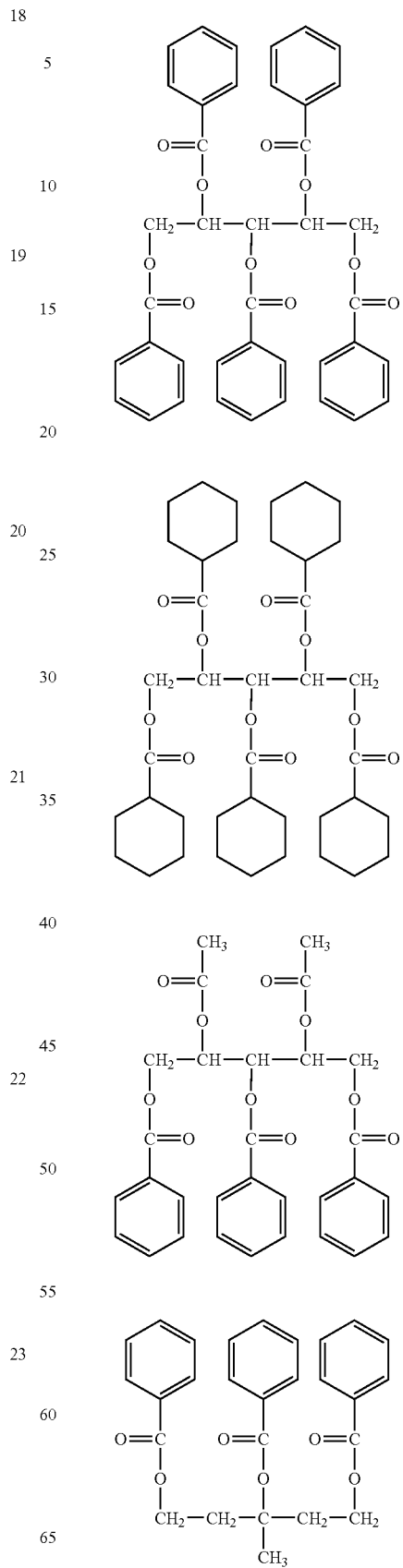

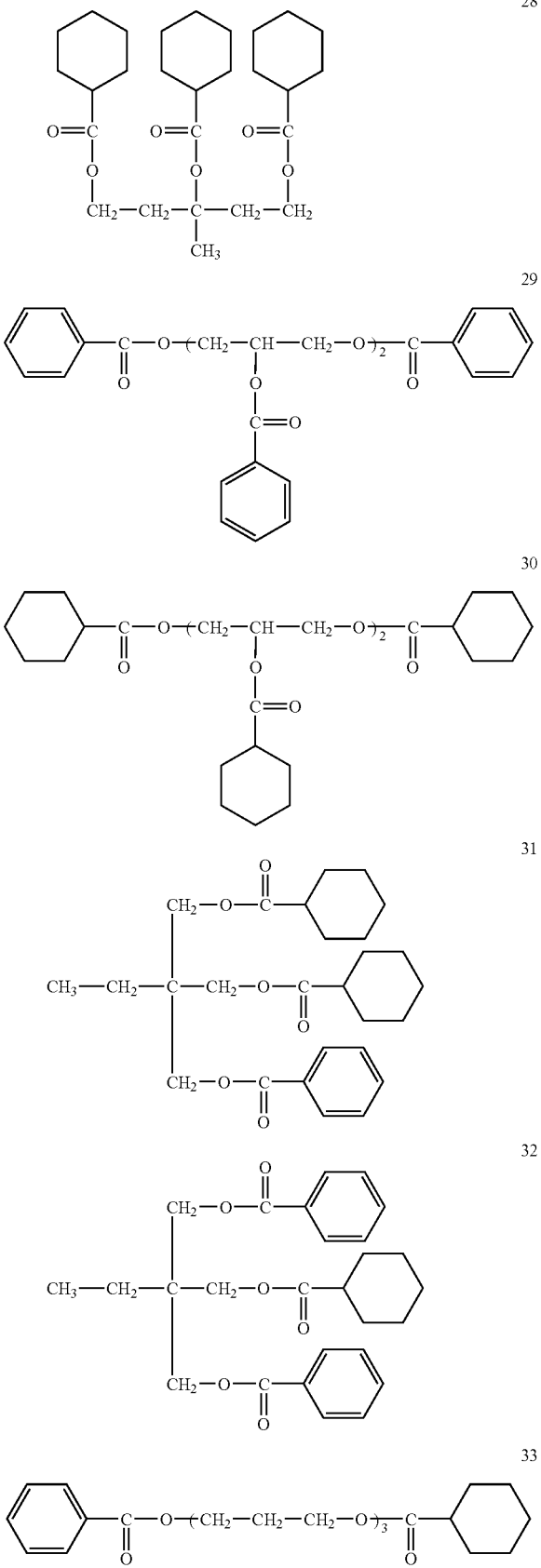

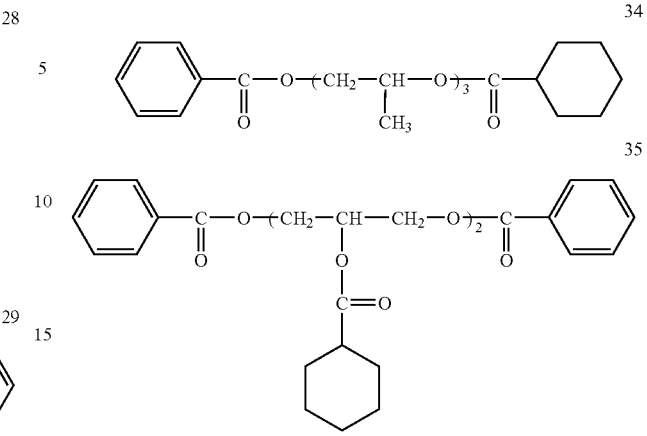

The content of the polyalcohol of the present invention is preferably 1-15 weight % based on the weight of cellulose ester film, and more preferably 3-10 weight %.

(PolyesterPlasticizer)

The polyester plasticizer is not specifically limited, however, a polyester plasticizer having an aromatic ring or a cycloalkyl group in the molecule thereof is preferably employed. For example, aromatic terminal polyester plasticizers represented by following Formula (2) are preferable, though the polyester plasticizer is not specifically limited.

B-(G-A)n-G-B                    Formula (2)

wherein B is a benzene monocarboxylic acid residue, G is an alkylene glycol residue having 2-12 carbon atoms, an aryl glycol residue having 6-12 carbon atoms or an oxyalkylene glycol residue having 4-12 carbon atoms, A is an alkylenecarboxylic acid residue having 4-12 carbon atoms or an aryldicarboxylic acid residue having 6-12 carbon atoms, and n is an integer of 1 or more.

The polyester plasticizer is constituted by the benzene monocarboxylic acid residue represented by B, the alkylene glycol residue, the aryl glycol residue or the oxyalkylene glycol residue represented by G, and an alkylenecarboxylic acid residue or an aryldicarboxylic acid residue represented by A, in Formula (2); the plasticizer can be obtained by a reaction similar to that for obtaining usual polyester plasticizer.

As the benzene monocarboxylic acid component of the polyester plasticizer employed in the present invention, for example, benzoic acid, p-tert-butylbenzoic acid, o-toluic acid, m-toluic acid, p-toluic acid, dimethylbenzoic acid, ethylbenzoic acid, n-propylbenzoic acid, aminobenzoic acid and acetoxybenzoic acid are applicable. They can be employed solely or in combination.

Examples of the alkylene glycol with 2-12 carbon atoms as the component of the polyester plasticizer employed in the present invention include: ethylene glycol, 1,2 propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol. These glycols are employed solely or in mixture of two or more kinds thereof. An alkylene glycol with 2-12 carbon atoms is particularly preferable since compatibility with cellulose ester is excellent.

Examples of the oxyalkylene glycol component with 4-12 carbon atoms forming the aromatic terminal ester employed in the present invention include: diethylene glycol, triethylene glycol, tetraethylene glycol, dipropylene glycol and tripropylene glycol. These glycols can be employed singly or in combination of two or more kinds.

Examples of the alkylenedicarboxylic acid component with 4-12 carbon atoms forming the aromatic terminal ester employed in the present invention include succinic acid, maleic acid, fumaric acid, glutaric acid, adipic acid, azelaic acid, sebacic acid and dodecanedicarboxylic acid. These acids can be employed solely or in a combination of two or more kinds. The examples of the arylenedicarboxylic acid component having 6 to 12 carbon atoms include phthalic acid, tetraphthalic acid, 1,5-naphthalenedicarboxylic acid and 1,4-naphthalenedicarboxylic acid.

The suitable number average molecular weight of the polyester plasticizer to be employed in the present invention is preferably 300-1500, and more preferably 400-1000. The acid value and the hydroxyl group value are at most 0.5 mg KOH/g and at most 25 mg KOH/g, respectively, and preferably at most 0.3 mg KOH/g and 15 mg KOH/g, respectively.

Synthetic examples of the aromatic terminal ester plasticizer are described below.

<Sample No. 1 (Sample of Aromatic Terminal Type Ester)>
In a reaction vessel, 410 parts of phthalic acid, 610 parts of benzoic acid, 737 parts of dipropylene glycol, 365 parts of adipic acid and 0.40 parts of tetraisopropyl titanate as a catalyst were charged at once and stirred in nitrogen gas stream, and heated at a temperature of 130-250° C. until the acid value becomes at most 2 while formed water was continuously removed and excessive monohydric alcohol was refluxed by a reflux condenser. After that, distillate was removed under a reduced pressure of at most $1 \times 10^4$ Pa, finally at most $4 \times 10^2$ Pa at a temperature of 200-230° C., and then the content of the vessel was filtered to obtain an aromatic terminal type ester plasticizer having the following properties.

Viscosity (mPa·s at 25° C.): 43400
Acid value: 0.2

<Sample No. 2 (Sample of Aromatic Terminal Type Ester)>
An aromatic terminal type ester having the following properties was obtained similarly to Sample 1, except that 410 parts of phthalic acid, 610 parts of benzoic acid, 341 parts of ethylene glycol and 0.35 parts of tetraisopropyl titanate as a catalyst were employed.

Viscosity (mPa·s at 25° C.): 31000
Acid value: 0.1

Sample No. 3 (Sample of Aromatic Terminal Type Ester)
An aromatic terminal type ester having the following properties was obtained similarly to Sample 1, except that 410 parts of phthalic acid, 610 parts of benzoic acid, 410 parts of 1,2-propylene diol and 0.35 parts of tetraisopropyl titanate as a catalyst were employed.

Viscosity (mPa·s at 25° C.): 38000
Acid value: 0.05

Sample No. 4 (Sample of Aromatic Terminal Type Ester)
An aromatic terminal type ester having the following properties was obtained similarly to Sample 1, except that 410 parts of phthalic acid, 610 parts of benzoic acid, 418 parts of 1,3-propylene diol and 0.35 parts of tetraisopropyl titanate as a catalyst were employed.

Viscosity (mPa·s at 25° C.): 37000
Acid value: 0.05

Specific compounds of the aromatic terminal ester plasticizer employed in the present invention are listed below, but the present invention is not limited thereto.

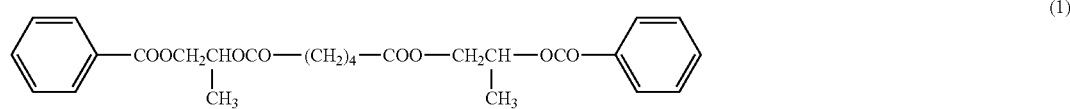

(1)

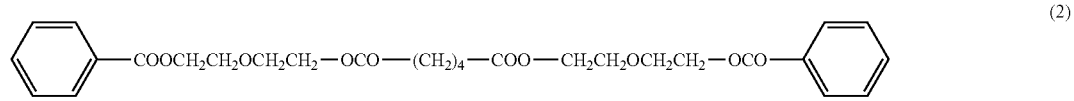

(2)

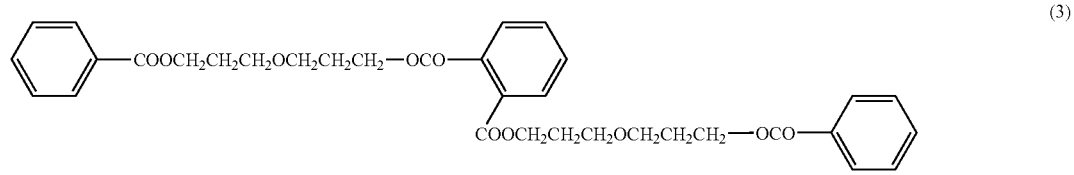

(3)

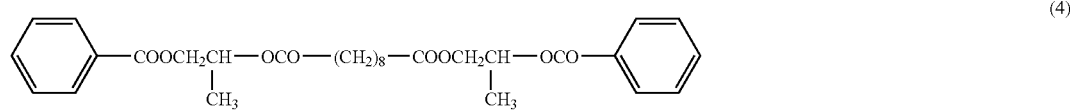

(4)

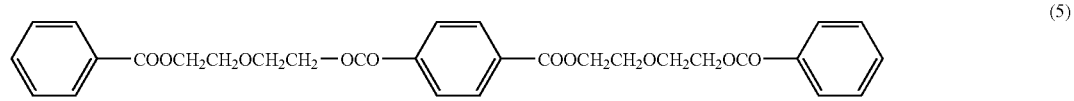

(5)

-continued

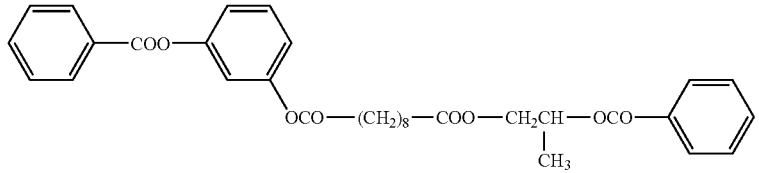

(6)

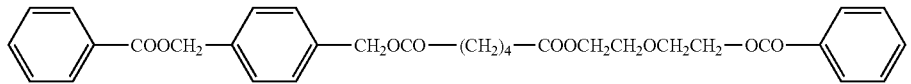

(7)

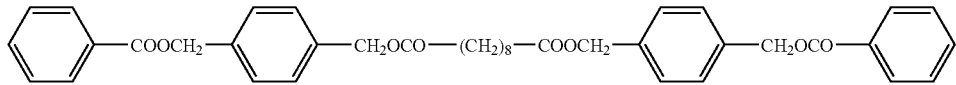

(8)

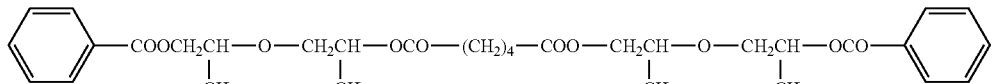

(9)

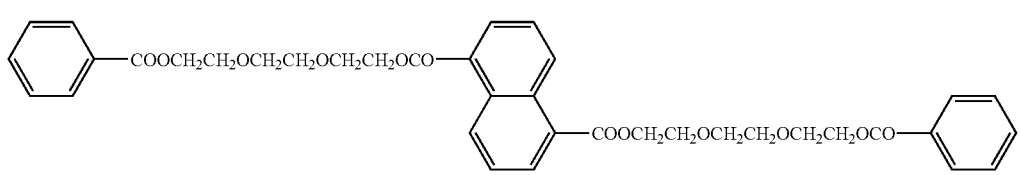

(10)

The polycarboxylic acid plasticizer useful for the present invention is an ester of an alcohol and a polycarboxylic acid having a valence of 2 or more, or preferably 2-20. The valence of an aliphatic polycarboxylic acid is preferably 2-20, and the valence of an aromatic polycarboxylic acid and that of an alicyclic polycarboxylic acid are preferably 3-20.

The polycarboxylic acid used for the present invention is represented by following Formula (3).

  Formula (3)

wherein $R_5$ is an organic group having a valence of value (m+n), m is an integer of 2 or more, n is an integer of 0 or more, COOH group represents a carboxyl group, and OH group represents an alcoholic or a phenolic hydroxyl group.

As a preferable polycarboxylic acid, the following examples are listed, however, the present invention is not limited thereto. The examples include: aromatic polycarboxylic acids having a valence of 3 or more such as trimellitic acid, trimesic acid and pyromellitic acid, and the derivatives thereof; aliphatic polycarboxylic acids such as succinic acid, adipic acid, azelaic acid, sebacic acid, oxalic acid, fumaric acid, maleic acid and tetrahydro phthalic acid; and polyoxycarboxylic acids such as tartaric acid, tartronic acid, malic acid and citric acid. With respect to obtaining an excellent retainability, specifically preferable is to use an polyoxycarboxylic acid.

The alcohol used for the polycarboxylic acid ester of the present invention is not specifically limited, and well-known alcohols and phenols are usable. For example, an aliphatic saturated alcohol or an aliphatic unsaturated alcohol with the normal chain or branched chain having 1-32 carbon atoms can be used preferably. The carbon number is more preferably 1-20, and specifically preferably 1-10. Also, preferably usable are alicyclic alcohols such as cyclopentanol and cyclohexanol, and derivatives thereof; and aromatic alcohols such as benzyl alcohol and cinnamyl alcohol, and derivatives thereof.

When a polyoxycarboxylic acid is used as a polycarboxylic acid, the alcoholic or phenolic hydroxyl group may be esterified using a monocarboxylic acid. As examples of a monocarboxylic acid, the following may be listed, however, the present invention is not limited thereto. As an aliphatic monocarboxylic acid, preferably usable are fatty acids having a normal chain or branched chain of 1-32 carbon atoms. The carbon number is more preferably 1-20 and specifically preferably 1-10.

Examples of a preferable aliphatic monocarboxylic acid include: aliphatic saturated acids such as acetic acid, propionic acid, butyric acid, valeric acid, caproic acid, enanthic acid, caprylic acid, pelargonic acid, capric acid, 2-ethylhexanecarboxylic acid, undecylic acid, lauric acid, tridecyl acid, myristic acid, pentadecyl acid, palmitic acid, a hepta-decyl acid, stearic acid, nonadecane acid, arachic acid, behenic acid, lignoceric acid, cerotic acid, heptacosanic acid, montanoic acid, melissic acid and luxellic acid; and aliphatic unsaturated acids such undecylenic acid, oleic acid, sorbic acid, linolic acid, linolenic acid and arachidonic acid.

Examples of a preferable alicyclic monocarboxylic acid include: cyclopentane carboxylic acid, cyclohexane carboxylic acid, cyclooctane carboxylic acid, and derivatives thereof. Examples of a preferable aromatic monocarboxylic acid include: compounds formed by introducing an alkyl group into a benzene ring of benzoic acid, such as benzoic acid and toluic acid; aromatic monocarboxylic acids having two or more benzene rings, such as biphenyl carboxylic acid and naphthalene carboxylic acid, tetralin carboxylic acid. Specifically preferable are acetic acid, propionic acid, and benzoic acid.

The molecular weight of a polycarboxylic acid ester is not specifically limited, however, it is preferably 300-1000 and more preferably 350-750. A larger molecular weight is preferable in view of retainability, and a smaller molecular weight is preferable in view of moisture permeability and compatibility with cellulose ester.

The alcohol used for the polycarboxylic acid ester may be one kind or a mixture of two or more kinds.

The acid value of the polycarboxylic acid ester used for the present invention is preferably not more than 1 mgKOH/g, and more preferably not more than 0.2 mgKOH/g. Examples of a preferable polycarboxylic acid ester will be shown below, however, the present invention is not limited thereto. The examples include: triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyltartrate, diacetyl dibutyltartarate, tributyl trimellitate and tetra-butyl pyromellitate.

These plasticizers may be used alone of in combination of two or more kinds. The amount of used plasticizer of less than 1 weight % is not preferable, since an effect to reduce moisture permeability becomes smaller, while the amount of used plasticizer of more than 20 weight % may cause bleeding out of the plasticizer. Accordingly the amount of used plasticizer is preferably 1-20 weight %, more preferably 6-16 weight %, and specifically preferably 8-13 weight %.

A UV absorber is preferably used in the retardation film of the present invention.

Preferably used is a UV absorber, having an excellent absorbing power to UV rays of wavelengths of 370 nm or less, and a less absorbing power to visible rays of wavelengths of 400 nm or more, with respect to obtaining an excellent display property of a liquid crystal display.

Examples of a UV absorber preferably used in the present invention include: oxybenzophenone, benzotriazole, a salicylic acid ester, benzophenone, cyanoacrylate and a nickel complex salt, however the present invention is not limited thereto.

As specific examples of a benzotriazole UV absorber, the following UV absorbers are listed, however, the present invention is not limited thereto.

UV-1: 2(2'-hydroxy-5'-methylphenyl)benzotriazole
UV-2: 2(2'-hydroxy-3',5'-di-tert-butylphenyl)benzotriazole
UV-3: 2(2'-hydroxy-3'-tert-butyl-5'-methylphenyl)benzotriazole
UV-4: 2(2'-hydroxy-3',5'-di-tert-butylphenyl)-5-chlorobenzotriazole
UV-5: 2(2'-hydroxy-3' (3",4",5",6"-tetrahydrophthalimidomethyl)-5'-methylphenyl)benzotriazole
UV-6: 2,2-methylenebis(4-(1,1,3,3-rtetramethylbutyl)-6-(2H-benzotriazole-2-yl)phenol
UV-7: 2(2'-hydroxy-3'-tert-butyl-5'-methylphenyl)-chlorobenzotriazole
UV-8: 2-(2H-benzotriazole-2-yl)-6-(straight chain or branched chain dodecyl)-4-methylphenol (TINUVIN 171, produced by Ciba Specialty Chemicals Co.)
UV-9: a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(chloro-2H-benzotriazole-2-yl)phenyl]propionate (TINUVIN 109, produced by Ciba Specialty Chemicals Co.)

As specific examples of a benzophenone UV absorber, the following UV absorbers are listed, however, the present invention is not limited thereto.
UV-10: 2,4-dihydroxybenzophenone
UV-11: 2,2'-di-hydroxy-4-methoxybenzophenone
UV-12: 2-hydroxy-4-methoxy-5-sulfobenzophenone
UV-13: bis(2-methoxy-4-hydroxy-5-benzoylphenyl-methane)

In the present invention, preferably employed in the cellulose ester film may be benzotriazole UV absorbers and benzophenone UV absorbers which exhibit high transparency as a UV absorber, and effectively minimize degradation of polarizing plates and liquid crystals. Of these, particularly preferred are benzotriazole UV absorbers which are less colored.

Moreover, it is preferable to contain UV absorbers having a distribution coefficient of 9.2 or more as described in JP-A No. 2001-187825, since the UV absorber improves the surface quality of the long roll film of the present invention as well as providing an excellent coating characteristics, and especially it is preferable to use UV absorbers having a distribution coefficient of 10.1 or more.

Also, preferably used are: polymer UV absorbers (also referred to as UV absorbing polymers) disclosed in Formula (1) or (2) in JP-A No. 148430; or UV absorbing copolymers disclosed in paragraphs [0027]-[0055] in JP-A No. 2002-169020. Examples of a commercially available UV absorber include PUVA-30M (produced by OTSUKA Chemical Co., Ltd.).

An antioxidant may also be incorporated in the retardation film of the present invention. When a liquid crystal display is placed in the state of high humidity and high temperature, deterioration of a polarizing plate protective film may occur. Since, for example, an antioxidant has a function to delay or prevent decomposition of a polarizing plate protective film due to halogen in the residual solvent or phosphoric acid contained a phosphate plasticizer, in the retardation film, it is preferable to incorporate an antioxidant in the polarizing plate protective film.

As antioxidants, hindered phenol compounds are also preferably employed. Examples of the compounds include 2,6-di-t-butyl-p-cresol, pentaerythityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)-propionate, 2,4-bis(n-octyl)-6-(4-hydroxy-3,5-di-t-butylanilino)-1,3,5-triazine, 2,2-thio-diethylene-bis[3-(3,5-t-butyl-4-hydroxyphenyl)propionate, octadecyl-3-(3,5-di-t-butyl-4-hydroxyphenyl)propionate, N,N'-hexamethylene-bis (3,5-di-t-butyl-4-hydroxy-4-hydroxy-hydrocinnamide), 1,3,5-trimethyl-2,4,6-tris(3,5-di-t-butyl-4-hydroxybenzyl) benzene and tris(3,5-di-t-butyl-4-hydroxybenzyl)-isocyanurate. Specifically, 2,6-di-t-butyl-p-cresol, pentaerythityl-tetrakis[3-(3,5-di-t-butyl-4-hydroxyphenyl) propionate] and triethylene glycol-bis[3-(3-t-butyl-5-methyl-4-hydroxyphenyl)-propionate] are preferred. A hydrazine metal inactivation agent such as N,N'-bis[3-(3,5-di-t-butyl-4-hydroxyphenyl)propionyl]hydrazine and a phosphor processing stabilizing agent such as tris(2,4-di-t-butylphenyl)phosphite may be used in combination.

The adding amount of these compounds is preferably 1 ppm to 1.0%, and more preferably from 10 ppm to 1,000 ppm, by weight based on the weight of the cellulose derivative.

Particles are preferably used in the retardation film of the present invention, in order to provide lubricity.

The primary particle diameter of the particles added in the retardation film of the present invention is preferably not more than 20 nm, more preferably 5-16 nm, and still more preferably 5-12 nm. These particles are preferably incorporated in the retardation film with forming secondary particles having a diameter of 0.1-5 μm. The average diameter is preferably 0.1-2 μm and more preferably 0.1-0.6 μm, whereby convexoconcave of the height of 0.1-1.0 μm is formed on the surface of the film, by which preferable lubricity is provided on the surface of the film.

In order to measure a primary average particle diameter utilized in the present invention, the particles were observed employing a transmission electron microscope (at a magnification of 500,000-2,000,000 times) to determine the primary average particle diameter as an average value via observation of 100 particles.

The apparent specific gravity of particles is preferably at least 70 g/liter, more preferably 90-200 g/liter and specifically preferably 100-200 g/liter. The larger apparent specific gravity is preferable, since dispersion having a higher concentration can be prepared, whereby haze and aggregation are improved, and is specifically preferable during preparation of a dope having a high solid density as carried out in the present invention.

Silicon dioxide particles having a primary particle diameter of not more than 20 nm and an apparent specific gravity of 70 g/liter or more can be prepared, for example, by combustion of a mixture of gaseous silicon tetrachloride and hydrogen in air at 1000-1200° C. Such silicon dioxide particles are commercially available as trade names of AEROSIL 200V and AEROSIL 972V (both produced by Nippon Aerosil Co., Ltd.).

The above-described apparent specific gravity is determined by sampling a predetermined volume of silicon dioxide particles in a mess cylinder to measure the weight and is calculated according to the following equation.

Apparent specific gravity (g/liter)=weight of silicon dioxide (g)/volume of silicon dioxide (liter)

A preparation method of a dispersion of particles utilized in the present invention includes, such as the following three types.

<Preparation Method A>

Dispersion is performed by use of a homogenizer after a solvent and particles have been stirring mixed. This is designated as particle dispersion. The particle dispersion is added into a dope solution to be mixed.

<Preparation Method B>

Dispersion is performed by using a homogenizer after an organic solvent and particles have been mixed while stirring. This is designated as a particle dispersion. Separately, a small amount of cellulose ester is added into an organic solvent and is dissolved while stirring. The aforesaid particle dispersion is added therein and the resulting solution is mixed. This is designated as a particle containing liquid, and the particle containing liquid is sufficiently mixed with a dope employing an in-line mixer.

<Preparation Method C>

A small amount of cellulose ester is added into an organic solvent and is dissolved while stirring. Particles are added therein and dispersed by using a homogenizer. This is designated as a particle containing liquid. The particle containing liquid is sufficiently mixed with a dope employing an in-line mixer.

Preparation method A is superior in dispersibility of silicon dioxide particles and preparation method C is superior in that silicon dioxide particles are hard to be re-aggregated. Among them, the above-described preparation method B is a preferable method which is superior in both of dispersibility of silicon dioxide particles and re-aggregation resistance of silicon dioxide particles.

<Dispersion Method>

The concentration of silicon dioxide at the time of dispersing silicon dioxide particles by being mixed with a solvent is preferably 5-30% by weight, more preferably 10-25% by weight and most preferably 15-20% by weight. A higher dispersion content tends to result in a lower turbidity of the dope and is preferable with respect to improving haze and aggregation.

Examples of organic solvents utilized in the dispersion preferably include: lower alcohols such as methanol, ethanol, propyl alcohol, isopropyl alcohol and buthanol. Organic solvents other than lower alcohols are not specifically limited, but preferably utilized are organic solvents which are employed in the film forming process of cellulose ester.

The addition amount of silicon dioxide particles based on cellulose ester is preferably 0.01-5.0 parts by weight, more preferably 0.05-1.0 parts by weight and most preferably 0.1-0.5 parts by weight in 100 parts by weight of cellulose ester. The larger addition amount results in a superior dynamic friction factor of a cellulose ester film, while the smaller addition amount results in a smaller amount of aggregation.

As a homogenizer, an ordinary homogenizer can be utilized. Homogenizers can be roughly classified into a media homogenizer and a media-less homogenizer. For dispersion of silicon dioxide particles, a media-less homogenizer is preferred due to a lower haze. A media homogenizer includes such as a ball mill, a sand mill and a dyno mill. A media-less homogenizer includes an ultrasonic type, a centrifugal type and a high pressure type, however, a high pressure homogenizer is preferable in the present invention. A high pressure homogenizer is an apparatus to make a special condition such as a high share or high pressure state by passing a composition, comprising particles and a solvent having been mixed, through a fine tube at a high speed. In the case of processing by a high pressure homogenizer, it is preferable, for example, to set the maximum pressure condition in a fine tube having a diameter of 1-2000 μm of at least 9.807 MPa and more preferably of at least 19.613 MPa. Further, at that time, preferable are those in which the maximum speed of at least 100 m/sec and the heat transmission rate of at least 420 kJ/hour.

High pressure homogenizers such as described above include a high pressure homogenizer (product name: Microfluidizer) manufactured by Microfluidics Corporation or Nanomizer manufactured by Nanomizer Corp., in addition to Manton-Gaulin type high pressure homogenizers such as a homogenizer manufactured by Izumi Food Machinery Co., Ltd. and UHN-01 manufactured by Sanwa Machine Co., Inc.

It is preferable that the dope containing is carried out so that the dope containing particles becomes directly in contact with the support, whereby haze can be reduced, and dynamic friction factor can be lowered.

Further, after the cast film is peeled, dried and wound in a roll, a functional film, for example, a hard coat layer or an antireflection layer is provided on the film. Before the film is further treated or shipped, the film is usually packaged in order to protect the film from stain or attachment of dust due to static electricity. The material for package is not specifically limited, as far as the above object is achieved, however, preferable is a film which does not prevent evaporation of a residual solvent. Specifically, preferably used are, for example, polyethylene, polyester, polypropylene, nylon, polystyrene, paper and various non-woven clothes. A fiber mesh cloth is more preferably employed.

The retardation film of the present invention is preferably subjected to control of retardation via incorporation of a retardation control agent.

(Rod-Shaped Compound)

The retardation film according to the present invention preferably contains a rod-shaped compound which has the maximum absorption wavelength ($\lambda_{max}$) of less than 250 nm in UV absorption spectrum as a retardation control agent.

The rod-shaped compound preferably has one or more, and preferably two or more, aromatic rings from the viewpoint of the retardation controlling function. The rod-shaped compound preferably has a linear molecular structure. The linear molecular structure means that the molecular structure of the rod-shaped compound is linear in the thermodynamically most stable structure state. The thermodynamically most stable structure can be determined by crystal structure analyzing or molecular orbital calculation. The molecular structure, by which the heat of formation is made minimum, can be determined on the calculation by, for example, a software for molecular orbital calculation WinMOPAC2000, manufactured by Fujitsu Co., Ltd. The linear molecular structure means that the angle of the molecular structure is not less than 140° in the thermodynamically most stable structure calculated as the above. The rod-shaped compound is preferably one displaying a liquid crystal property. The rod-shaped compound more preferably displays a crystal liquid property by heating (thermotropic liquid crystal property). The phase of the liquid crystal is preferably a nematic phase or a smectic phase.

As the rod-shaped compound, trans-1,4-cyclohexane-dicarboxylic acid ester represented by following Formula (4) is preferable.

Formula (4)

In Formula (4), $Ar^1$ and $R^2$ are each independently an aromatic group. The aromatic group includes an aryl group (an aromatic hydrocarbon group), a substituted aryl group, an aromatic heterocyclic group and a substituted heterocyclic group. The aryl group and the substituted aryl group are more preferable than the aromatic heterocyclic group and the substituted aromatic heterocyclic group. The heterocycle of the aromatic heterocyclic group is usually unsaturated. The aromatic heterocyclic group is preferably a 5-, 6 or 7-member ring, and more preferably a 5- or 6-member ring. The heterocyclic ring usually has the largest number of double bond. The hetero atom is preferably a nitrogen atom, an oxygen atom or a sulfur atom and the nitrogen atom or the oxygen atom is more preferable. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazane ring, a triazole ring, a pyrane ring, a pyridine ring, a pyridazine ring, a pyrimidine ring, a pyrazine ring and a 1,3,5-triazine ring. As the aromatic ring of the aromatic group, a benzene ring, a furan ring, a thiophene ring, a pyrrole ring, an oxazole ring, a thiazole ring, a thiazole ring, an imidazole ring, a triazole ring, a pyridine ring, a pyrimidine ring and pyrazine ring are preferable and the benzene ring is particularly preferable.

Examples of the substituent of the substituted aryl group and the substituted aromatic heterocyclic group include a halogen atom (F, Cl, Br, I), a hydroxyl group, a carboxyl group, a cyano group, an amino group, an alkylamino group (such as a methylamino group, an ethylamino group, a utylamno group and a dimethylamino group), a nitro group, a sulfo group, a carbamoyl group, an alkylcarbamoyl group (such as an N-methylcarbaamoyl group and an N,N-dimethylcarbamoyl group), a sulfamoyl group, an alkylsulfamoyl group (such as an N-methylsulfamoyl group, an N-ethylsulfamoyl group and an N,N-dimethylsulfamoyl group), a ureido group, an alkylureido group (such as an N-methylureido group, an N,N-dimethylureido group and N,N,N-trimethylureido group), an alkyl group (such as a methyl group, an ethyl group, a propyl group, a butyl group, a pentyl group, a heptyl group, an octyl group, an isopropyl group, an s-butyl group, a t-amyl group, a cyclohexyl group and a cyclopentyl group), an alkenyl group (such as a vinyl group, an allyl group and a hexenyl group), an alkynyl group (such as an ethynyl group and a butynyl group), an acyl group (such as a formyl group, an acetyl group, a butylyl group, a hexanoyl group and a lauryl group), an acyloxy group (such as an acetoxy group, a butylyloxy group, a hexanoyloxy group and lauryloxy group), an alkoxy group (such as a methoxy group, an ethoxy group, a propoxy group, a butoxy group, a pentyloxy group, a heptyloxy group and an octyloxy group), an aryloxy group (such as a phenoxy group), an alkoxycarbonyl group (such as a methoxycarbonyl group, an ethoxycarbonyl group, a propoxycarbonyl group, a butoxycarbonyl group, a pentyloxycarbonyl group and a heptyloxycarbonyl group), an aryloxycarbonyl group (such as a phenoxycarbonyl group), an alkoxycarbonylamino group (such as a butoxycarbonylamino group and a hexyloxycarbonylamino group), an alkylthio group (such as a methylthio group, an ethylthio group, a propylthio group, butylthio group, a pentylthio group, a heptylthio group and an octylthio group), an arylthio group such (as a thiophenyl group), an alkylsulfonyl group (such as a methylsulfonyl group, an ethylsulfonyl group, a propylsulfonyl group, a butylsulfonyl group, a pentylsulfonyl group, a heptylsulfonyl group and an octylsulfonyl group), an amido group (such as an acetoamido group, a butylamido group, a hexylamido group and an laurylamido group), and a non-aromatic heterocyclic group (such as a morpholyl group and a pyradinyl group).

Examples of the substituent of the substituted aryl group and the substituted aromatic heterocyclic group include: a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group are preferable. The alkyl moiety of the alkylamino group, the alkoxycarbonyl group, the alkoxy group and the alkylthio group, and the alkyl group each may further have a substituent. Examples of the substituent of the alkyl moiety or the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. The halogen atom, the hydroxyl group, an amino group, an alkylamino group, an acyl group, an acyloxy group, an acylamino group, an alkoxycarbonyl group and an alkoxy group are preferable as the substituent of the alkyl moiety or the alkyl group.

In Formula (4), $L^1$ is a di-valent linking group selected from the group consisting of an alkylene group, an alkenylene group, an alkynylene group, a di-valent saturated heterocyclic group, —O—, —CO— and a combination thereof. The alkylene group may have a cyclic structure. As the cyclic alkylene group, a cyclohexylene group is preferable, and 1,4-cyclohexylene group is more preferable. As the chain-shaped alkylene group, a straight-chain alkylene group is more preferable than a branched-chain alkylene group. The number of carbon atoms of the alkylene group is preferably from 1 to 20, more preferably from 1 to 15, further preferably from 1 to 10, further more preferably from 1 to 8, and most preferably from 1 to 6.

Each of the alkenylene group and the alkynylene group more preferably has a chain structure than has a cyclic structure, and more preferably has a straight-chain structure than has a branched-chain structure. The number of carbon atom of each of the alkenylene group and the alkynylene group is preferably 2 to 10, more preferably from 2 to 8, still more preferably from 2 to 6, and further more preferably 2 to 4, and most preferably 2, (namely vinylene or ethynylene). The di-valent saturated heterocyclic group is preferably a 3- to 9-member heterocyclic ring. The hetero atom of the heterocyclic ring is preferably an oxygen atom, a nitrogen atom, a boron atom, a sulfur atom, a silicon atom, a phosphor atom or a germanium atom. Examples of the saturated heterocyclic ring include a piperidine ring, a piperazine ring, a morpholine ring, a pyrrolidine ring, an imidazolidine ring, a tetrahydrofuran ring, a tetrahydropyrane ring, a 1-3-dioxane ring, a 1,4-dioxane ring, a terahydrothiophene ring, a 1,3-thiazolidine ring, a 1,3-oxazolidine ring, a 1,3-dioxoran ring, a 1,3-dithiosilane ring and a 1,3,2-dioxoboran ring. Particularly preferable di-valent saturated heterocyclic group is a piperazine-1,4-diylene group, a 1,3-dioxane-2,5-diylene group and a 1,3,2-dioxobororane-2,5-diylene group.

Examples of a divalent linking group composed of a combination of groups are listed as follows.

L-1: —O—CO-alkylene-CO—O—
L-2: —CO—O-alkylene-O—CO—
L-3: —O—CO-alkenylene-CO—O—
L-4: —CO—O-alkenylene-O—CO—
L-5: —O—CO-alkynylene-CO—O—
L-6: —CO—O-alkynylene-O—CO—
L-7: —O—CO-divalent saturated heterocyclic group-CO—O—
L-8: —CO—O— divalent saturated heterocyclic group —O—CO—

In the structure of Formula (4), the angle formed by $Ar^1$ and $Ar^2$ through $L^1$ is preferably not less than 140°. Compounds represented by Formula (5) are further preferable as the rod-shaped compound.

$$Ar^1\text{-}L^2\text{-}X\text{-}L^3\text{-}Ar^2 \qquad \text{Formula (5)}$$

In Formula (5), $Ar^1$ and $Ar^2$ each independently represent an aromatic group. The definition and examples of the aromatic group are the same as those of $Ar^1$ and $Ar^2$ in Formula (4).

In Formula (5), $L^1$ and $L^2$ each independently represent a di-valent bonding group selected from the group consisting of an alkylene group, —O—, —CO— and a combination thereof. The alkylene group having a chain structured is preferably to that having a cyclic structure, and a straight-chain structure is more preferably to a branched-chain structure. The number of carbon atoms in the alkylene group is preferably from 1 to 10, more preferably from 1 to 8, further preferably from 1 to 6, further more preferably 1 to 4, and most preferably 1 or 2 (methylene or ethylene). $L^2$ and $L^3$ are particularly preferably an —O—CO— group or a -CO—O- group.

In Formula (5), X represents 1,4-cyclohexylene, vinylene or ethynylene. Concrete examples of the compounds represented by Formula (4) are listed below.

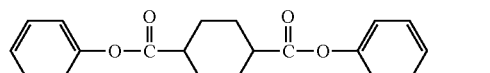
(1)

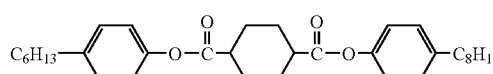
(2)

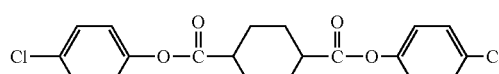
(3)

(4)

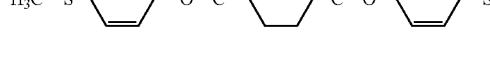
(5)

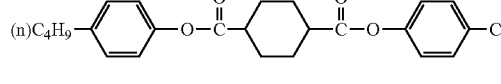
(6)

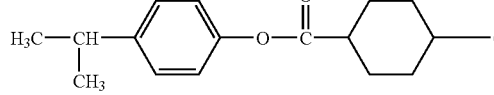
(7)

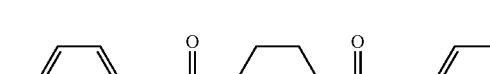
(8)

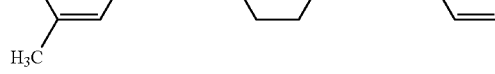
(9)

(10)

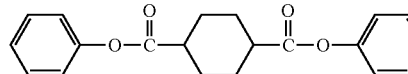
(11)

(12)

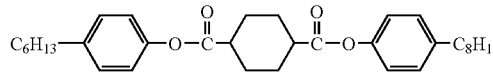
(13)

-continued
(14)
(15)
(16)
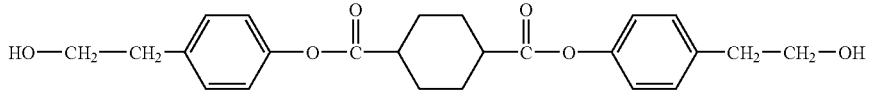
(17)
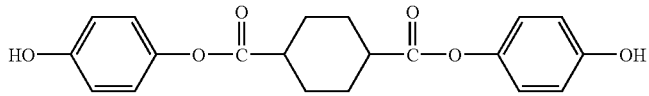
(18)
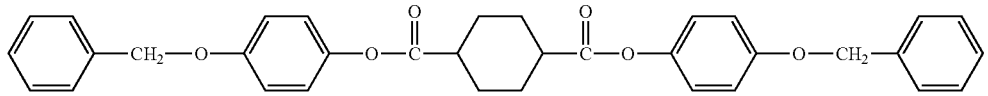
(19)
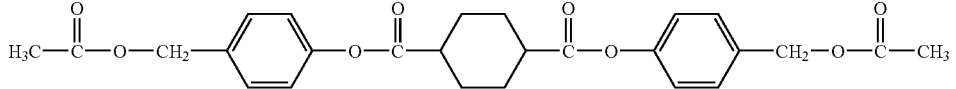
(20)
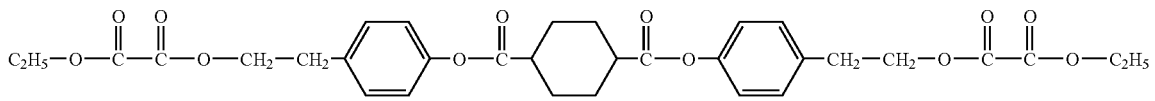
(21)
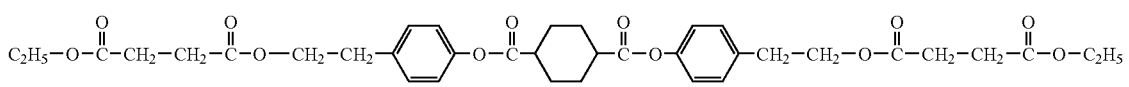
(22)
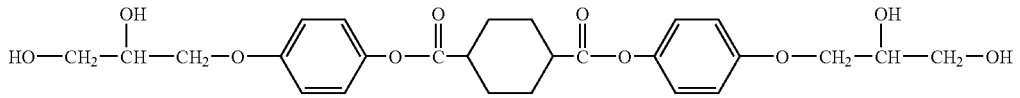
(23)
(24)
(25)
(26)
(27)

-continued
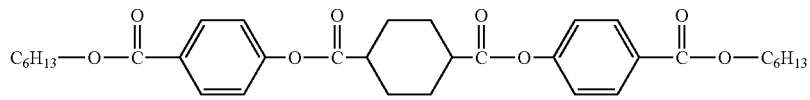
(28)
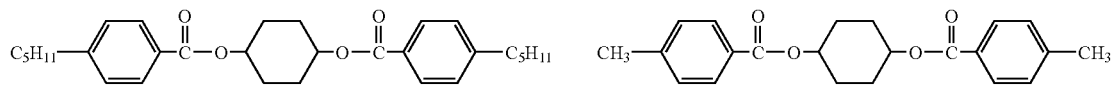
(29) (30)
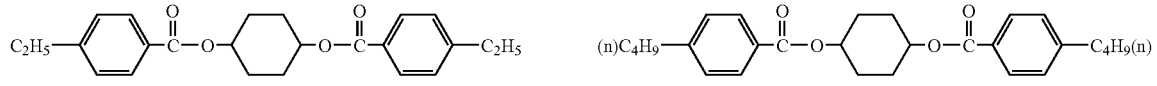
(31) (32)
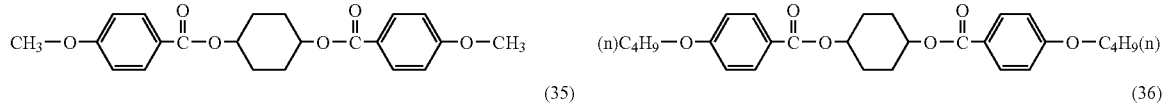
(33) (34)
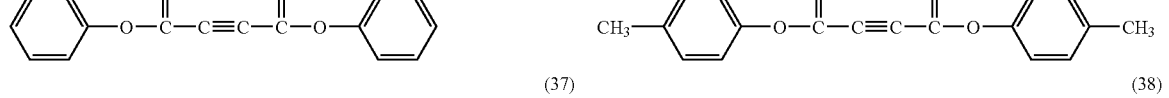
(35) (36)
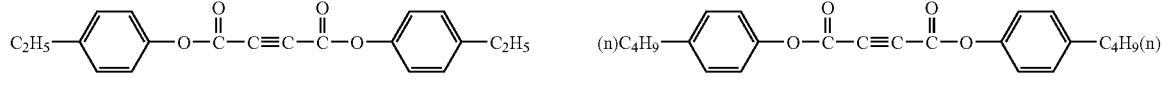
(37) (38)
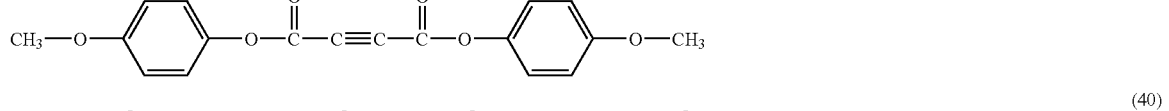
(39)
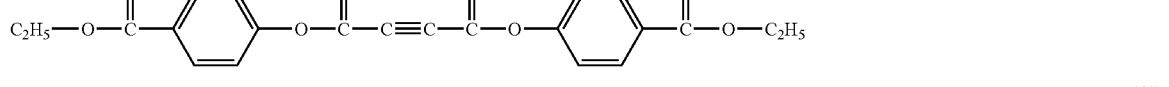
(40)
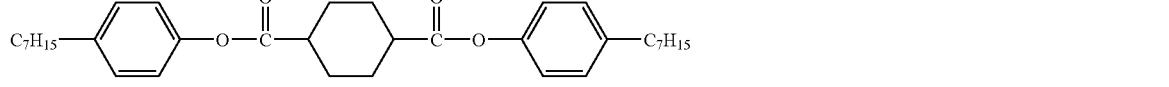
(41)
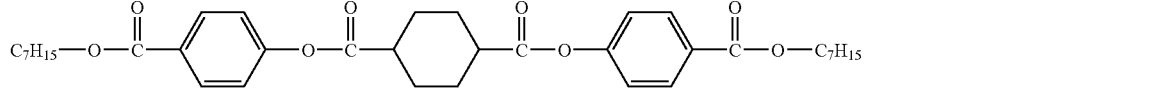
(42)
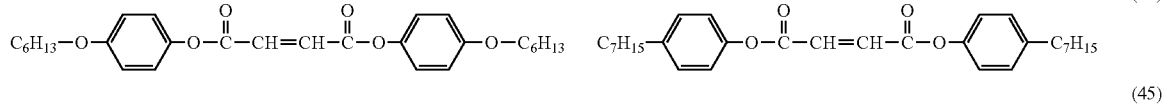
(43)
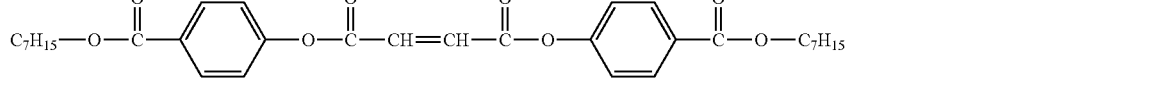
(44) (45)
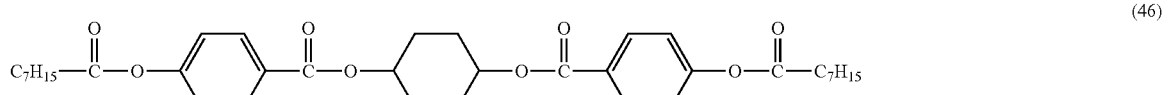
(46)
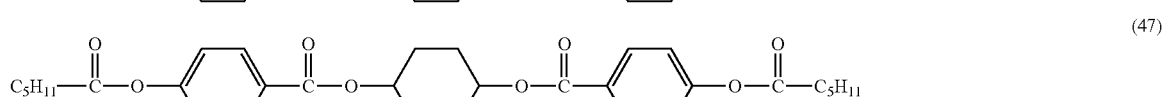
(47)

-continued

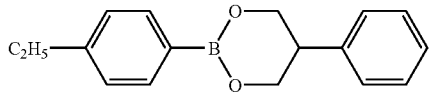 (48)

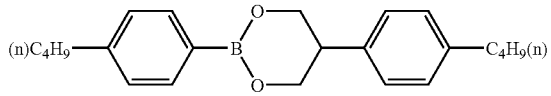 (49)

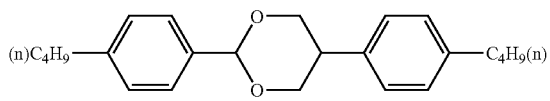 (50)

 (51)

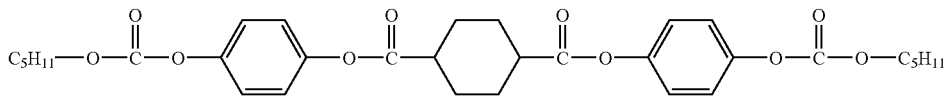 (52)

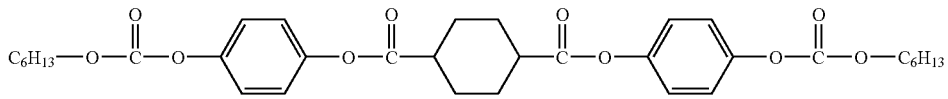 (53)

Exemplified compounds (1) to (34), (41), (42), (46), (47), (52) and (53) each has two asymmetric carbon atoms at 1- and 4-positions of the cyclohexane ring. However, Exemplified compounds (1), (4) to (34), (41), (42), (46), (47), (52) and (53) have no optical isomers (optical activity) since they have symmetrical meso form molecular structure, and there are only geometric isomers thereof. Exemplified compound (1) in trans-form (1-trans) and that in cis-form (1-cis) are shown below.

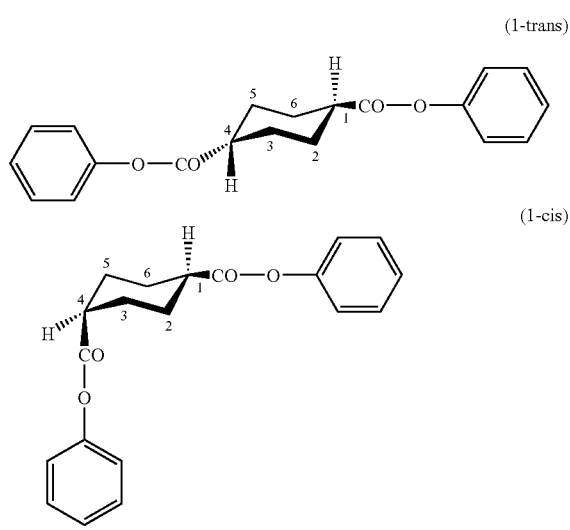

(1-trans)

(1-cis)

As for a rod-like compound, as mentioned above, it is preferable to have a linear molecular structure. Therefore, the trans form is more preferable than a cis form. In addition to a geometrical isomer, examples (2) and (3) have an optical isomer (a total of four kinds of isomers). As a geometrical isomer, similar to the above, the trans form is more preferable than a cis form. As an optical isomer, there may not be any superiority or inferiority in particular, and any of D, L, or a racemic modification may be usable. In specific examples (43)-(45), the central vinylene bond may be a trans form or a cis form. According to the same reason as the above, the trans form is more preferable than a cis form.

Two or more kinds of rod-like compounds having maximal absorption wavelengths (λmax) of less than 250 in UV absorption spectrum of solution may be used together. A rod-like compound can be synthesized with a method described in the literature, for example, Mol. Cryst. Liq. Cryst., 53, 229 (1979); ibid 89, 93; ibid, 145, 111 (1987); ibid, 170, 43 (1989); J. Am. Chem. Soc., 113, 1349 (1991); ibid, 118, 5346 (1996); ibid, 92, 1582 (1970); J. Org. Chem., 40, 420 (1975); and Tetrahedron, 48(16), 3437 (1992).

The compounds disclosed in JP-A No. 2005-179638 paragraph number [0020]-[0116] can also be preferably used in the retardation film of the present invention, specific examples of which will be shown below.

[Phenyl Benzoate Ester Compound]

Compounds represented by Formula (6) used in the present invention will be described in detail below.

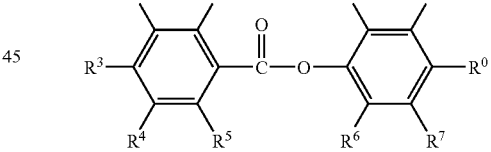

In Formula (6), $R^0$, $R^1$, $R^2$, $R^3$, $R^4$, $R^5$, $R^6$, $R^7$, $R^9$, and $R^{10}$ each independently represent a hydrogen atom or a substituent while substituent T which will be described below is applicable as the substituent.

At least one of $R^1$, $R^2$, $R^3$, $R^4$ and $R^5$ is an electron donating group, more preferably, one of $R^1$, $R^3$ and R5 is an electron donating group, and, further more preferably, $R^3$ is an electron donatinging group.

An electron donating group means that σp value of Hammet is zero or less. The electron donating groups exhibiting σ p value of zero or less described in Chem. Rev., 91, 165 (1991) are applicable and more preferable are those exhibiting σp value of −0.85-0. Examples of such electron donating group include: an alkyl group, an alkoxy group, an amino group and a hydroxyl group.

Preferable as an electron donating group are, for example, an alkyl group and an alkoxy group and more preferable is an alkoxy group (preferably having 1 to 12 carbon atoms, more preferably 1 to 8 carbon atoms, further more preferably 1 to 6 carbon atoms and specifically more preferably 1 to 4 carbon atoms).

As $R^1$, preferable is a hydrogen atom or an electron donating group; more preferable is an alkyl group, an alkoxy group, an amino group or a hydroxyl group; further more preferable is an alkyl group having 1 to 4 carbon atoms, an alkoxy group having 1 to 12 carbon atoms or a hydroxyl group; specifically more preferable is an alkoxy group (preferably having 1 to 12 carbon atoms, more preferably 1 to 8 carbon atoms, further more preferably 1 to 6 carbon atoms and specifically more preferably 1 to 4 carbon atoms); and most preferable is a methoxy group.

As $R^2$, preferable is a hydrogen atom, an alkyl group, an alkoxy group, an amino group or a hydroxyl group; more preferable is a hydrogen atom, an alkyl group or an alkoxy group, further more preferable is a hydrogen atom, an alkyl group (preferably having 1 to 4 carbon atoms and more preferably a methyl group) or an alkoxy group (preferably having 1 to 12 carbon atoms, more preferably 1 to 8 carbon atoms, further more preferably 1 to 6 carbon atoms, still more preferably 1 to 4 carbon atoms); specifically preferable is a hydrogen atom, a methyl group or a methoxy group; and most preferable is a hydrogen atom.

As $R^3$, preferable is a hydrogen atom or an electron donating group; more preferable is a hydrogen atom, an alkyl group, an alkoxy group, an amino group or a hydroxyl group; further more preferable is an alkyl group or an alkoxy group; specifically more preferable is an alkoxy group (preferably having 1 to 12 carbon atoms, more preferably 1 to 8 carbon atoms, further more preferably 1 to 6 carbon atoms, still more preferably 1 to 4 carbon atoms); and most preferable is an n-propoxy group, an ethoxy group or a methoxy group.

As $R^4$, preferable is a hydrogen atom or an electron donating group; more preferable is a hydrogen atom, an alkyl group, an alkoxy group, an amino group or a hydroxyl group; further more preferable is a hydrogen atom, an alkyl group having 1 to 4 carbon atoms or an alkoxy group having 1 to 12 carbon atoms (preferably having 1 to 8 carbon atoms, more preferably 1 to 6 carbon atoms, still more preferably 1 to 4 carbon atoms); specifically more preferable is a hydrogen atom, an alkyl group having 1 to 4 carbon atoms or an alkoxy group having 1 to 4 carbon atoms; most preferable is a hydrogen atom, a methyl group or a methoxy group.

As $R^5$, preferable is a hydrogen atom, an alkyl group, an alkoxy group, an amino group or a hydroxyl group; more preferable is a hydrogen atom, an alkyl group or an alkoxy group, further more preferable is a hydrogen atom, an alkyl group (preferably having 1 to 4 carbon atoms and more preferably a methyl group) or an alkoxy group (preferably having 1 to 12 carbon atoms, more preferably 1 to 8 carbon atoms, further more preferably 1 to 6 carbon atoms, still more preferably 1 to 4 carbon atoms); specifically preferable is a hydrogen atom, a methyl group or a methoxy group; and most preferable is a hydrogen atom.

As each of $R^6$, $R^7$, $R^9$, and $R^{10}$, preferable is a hydrogen atom, an alkyl group having 1 to 12 carbon atoms, an alkoxy group having 1 to 12 carbon atoms or a halogen atom; more preferable is a hydrogen atom or a halogen atom; and further more preferable is a hydrogen atom.

$R^0$ represents a hydrogen atom or a substituent, and preferable as $R^0$ is a hydrogen atom, an alkyl group having 1 to 4 carbon atoms, an alkynyl group having 2 to 6 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom.

The compound represented by Formula (6) is preferably a compound represented by Formula (7).

In the following, the compound represented by Formula (7) will be described in detail.

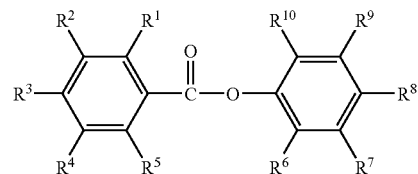

In the formula, $R^2$, $R^3$, $R^4$, $R^5$, $R^6$, $R^7$, $R^9$, and $R^{10}$ each independently represent a hydrogen atom or a substituent. At least one of $R^1$, $R^2$, $R^3$, $R^4$, and $R^5$ represents an electron donating group.

$R^8$ represents a hydrogen atom, an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom, which may further have a substituent, if possible, and the substituent may be one of the substituent T which will be described below. Moreover, the substituent may further has a substituent.

As $R^8$, preferable is an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, more preferable is an alkynyl group having 2 to 7 carbon atoms, an aryl group of 6 to 12 carbon atoms, an alkoxycarbonyl group of 2 to 6 carbon atoms, an acylamino group having 2 to 7 carbon atoms or a cyano group, and specifically preferable is a phenyl ethynyl group, a phenyl group, a p-cyanophenyl group, a p-methoxyphenyl group, a benzoylamino group, a n-propoxy carbonyl group, an ethoxycarbonyl group, a methoxycarbonyl group or a cyano group.

Among compounds represented by Formula (7), preferable is a compound represented by Formula (7-A).

Formula (7-A)

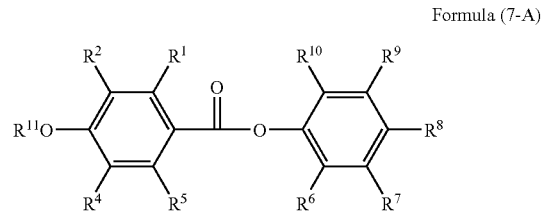

In Formula (7-A), $R^1$, $R^2$, $R^4$, $R^5$, $R^6$, $R^7$, $R^9$, and $R^{10}$ each independently represent a hydrogen atom or a substituent. $R^8$ represents a hydrogen atom, an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom. $R^{11}$ represents an alkyl group having 1 to 12 carbon atoms. In Formula (7-A), $R^1$, $R^2$, $R^4$, $R^5$, $R^6$, $R^7$, $R^8$, $R^9$, and $R^{10}$ have the same meaning as $R^1$, $R^2$, $R^4$, $R^5$, $R^6$, $R^7$, $R^8$, $R^9$, and $R^{10}$, respectively, in Formula (7), and the preferable ranges thereof are also the same.

In Formula (7-A), $R^{11}$ represents an alkyl group having 1 to 12 carbon atoms. The alkyl group represented by $R^{11}$ may be of a linear chain or a branched chain, and, also, may have a substituent. $R^{11}$ is preferably an alkyl group having 1 to 12 carbon atoms, more preferably an alkyl group having 1 to 8 carbon atoms, further more preferably an alkyl group having 1 to 6 carbon atoms, and specifically preferably an alkyl group having 1 to 4 carbon atoms (for example, a methyl group, an ethyl group, an n-propyl group, an iso-propyl group, an n-butyl group, an iso-butyl group and a tert-butyl group).

Among compounds represented by Formula (7), more preferable is a compound represented by Formula (7-B).

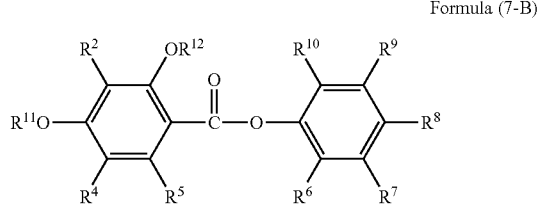

Formula (7-B)

In Formula (7-B), $R^2$, $R^4$, $R^5$, $R^6$, $R^7$, $R^9$, and $R^{10}$ each independently represent a hydrogen atom or a substituent. $R^8$ represents a hydrogen atom, an alkyl group having 1 to 4 carbon atoms, an alkynyl group having 2 to 12 carbon atoms, an aryl group having 6 to 12 carbon atoms, an alkoxy group having 1 to 12 carbon atoms, an aryloxy group having 6 to 12 carbon atoms, an alkoxycarbonyl group having 2 to 12 carbon atoms, an acylamino group having 2 to 12 carbon atoms, a cyano group, a carbonyl group or a halogen atom. $R^{11}$ represents an alkyl group having 1 to 12 carbon atoms. $R^{12}$ represents a hydrogen atom or an alkyl group having 1 to 4 carbon atoms. In Formula (7-B), $R^2$, $R^4$, $R^5$, $R^6$, $R^7$, $R^8$, $R^9$, $R^{10}$ and $R^{11}$ have the same meaning as $R^2$, $R^4$, $R^5$, $R^6$, $R^7$, $R^8$, $R^9$, $R^{10}$ and $R^{11}$, respectively, in Formula (7), and the preferable ranges thereof are also common.

In Formula (7-B), $R^{12}$ represents a hydrogen atom or an alkyl group having 1 to 4 carbon atoms, preferably a hydrogen atom or an alkyl group having 1 to 3 carbon atoms, more preferably a hydrogen atom, a methyl group or an ethyl group, further more preferably a hydrogen atom or a methyl group, and specifically preferably a methyl group.

Among compounds represented by Formula (7-B), preferable is a compound represented by Formula (8) or Formula (7-C).

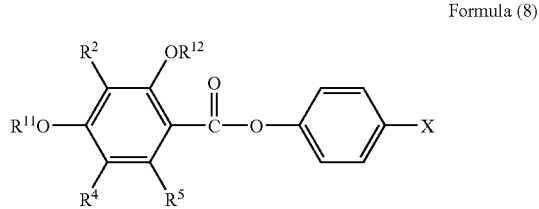

Formula (8)

In Formula (8), $R^2$, $R^4$, $R^5$, $R^{11}$ and $R^{12}$ have the same meaning as $R^2$, $R^4$, $R^5$, $R^{11}$ and $R^{12}$, respectively, in Formula (7-B), and the preferable ranges thereof are also the same. X represents an alkynyl group having 2 to 7 carbon atoms, an aryl group having 6 to 12 carbon atoms, an alkoxycarbonyl group having 2 to 6 carbon atoms, an acylamino group having 2 to 7 carbon atoms or a cyano group, preferably represents a phenyethynyl group, a phenyl group, a p-cyanophenyl group, a p-methoxyphenyl group, a benzoylamino group, an alkoxycarbonyl group having 2 to 4 carbon atoms or a cyano group, and more preferably represents a phenyl group, a p-cyanophenyl group, a p-methoxyphenyl group, an alkoxycarbonyl group having 2 to 4 carbon atoms or a cyano group.

Formula (7-C) will now is described below.

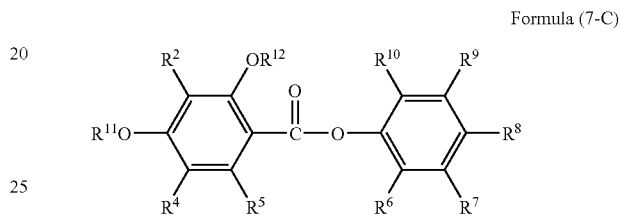

Formula (7-C)

In Formula (7-C), $R^2$, $R^4$ and $R^5$ have the same meaning as $R^2$, $R^4$ and $R^5$, respectively, in Formula (7-B), and the preferable ranges thereof are also the same, provided that one of $R^2$, $R^4$ and $R^5$ is a group represented by —$OR^{13}$ wherein —$OR^{13}$ represents an alkyl group having 1 to 4 carbon atoms. Preferably, $R^4$ or $R^5$ is a group represented by —$OR^{13}$, and more preferably, $R^4$ is a group represented by —$OR^{13}$. $R^6$, $R^7$, $R^8$, $R^9$, $R^{10}$, $R^{11}$, and $R^{12}$ have the same meaning as $R^6$, $R^7$, $R^8$, $R^9$, $R^{10}$, $R^{11}$, and $R^{12}$, respectively, in Formula (7-B), and the preferable ranges thereof are also the same.

$R^{13}$ represents an alkyl group having 1 to 4 carbon atoms, more preferably an alkyl group having 1 to 3 carbon atoms, further more preferably an ethyl group or a methyl group, and specifically preferably a methyl group.

Among compounds represented by Formula (7-C), preferable is a compound represented by Formula (7-D).

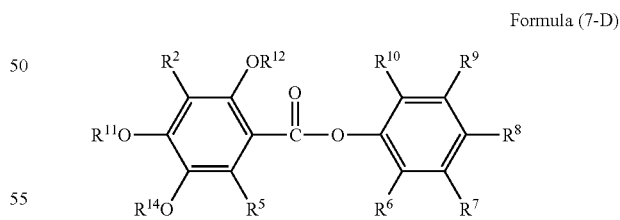

Formula (7-D)

In Formula (7-D), $R^2$, $R^5$, $R^6$, $R^7$, $R^8$, $R^9$, $R^{10}$, $R^{11}$ and $R^{12}$ have the same meaning as $R^2$, $R^5$, $R^6$, $R^7$, $R^8$, $R^9$, $R^{10}$, $R^{11}$ and $R^{12}$, respectively, in Formula (7-C), and the preferable ranges thereof are also the same. $R^{14}$ represents an alkyl group having 1 to 4 carbon atoms, preferably represents an alkyl group having 1 to 3 carbon atoms, more preferably represents an ethyl group and a methyl group, and further more preferably represents a methyl group.

Among compounds represented by Formula (7-D), preferable is a compound represented by Formula (7-E).

Formula (7-E)

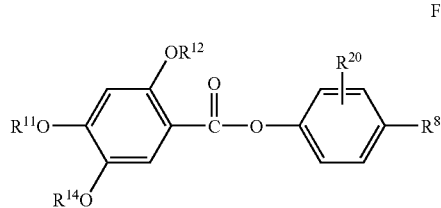

In Formula (7-E), $R^8$, $R^{11}$, $R^{12}$ and $R^{14}$ have the same meaning as $R^8$, $R^{11}$, $R^{12}$ and $R^{14}$, respectively, in Formula (7-D), and the preferable ranges thereof are also the same. $R^{20}$ represents a hydrogen atom or a substituent and as the substituent, substituents T which will be described below are applicable. $R^{20}$ may be bonded at any position of the benzene ring, provided that the benzene ring never has a plurality of $R^{20}$. As $R^{20}$, preferable is a hydrogen atom or a substituent having a number of constituting atoms of not more than 4 excluding the number of hydrogen atoms, more preferable is a substituent having a number of constituting atoms of not more than 3 excluding the number of hydrogen atoms, further more preferable is a substituent having a number of constituting atoms of not more than 2 excluding the number of hydrogen atoms, specifically preferable is a hydrogen atom, a methyl group, a methoxy group, a halogen atom, a formyl group, or a cyano group, and most preferable is a hydrogen atom.

The above-mentioned substituent T will now be described.

Examples of substituent T include: an alkyl group (preferably having 1 to 20 carbon atoms, more preferably having 1 to 12 carbon atoms, further more preferably having 1 to 8 carbon atoms, and examples of an alkyl group include: a methyl group, an ethyl group, an iso-propyl group, a tert-butyl group, an n-octyl group, an n-decyl group, an n-hexadecyl group, a cyclopropyl group, a cyclopentyl group and a cyclohexyl group); an alkenyl group (preferably having 2 to 20 carbon atoms, more preferably having 2 to 12 carbon atoms, further more preferably having 2 to 8 carbon atoms, and examples of an alkenyl group include: a vinyl group, an allyl group, a 2-butenyl group and a 3-pentenyl group); an alkynyl group (preferably having 2 to 20 carbon atoms, more preferably 2 to 12 carbon atoms, further more preferably having 2 to 8 carbon atoms, and examples of an alkynyl group include: a propargyl group and a 3-pentinyl group); an aryl group (preferably having 6 to 30 carbon atoms, more preferably having 6 to 20 carbon atoms, further more preferably having 6 to 12 carbon atoms, and examples of an aryl group include: a phenyl group, a p-methylphenyl group and a naphthyl group); a substituted or non-substituted amino group (preferably having 0 to 20 carbon atoms, more preferably having 0 to 10 carbon atoms, further more preferably having 0 to 6 carbon atoms, and examples of an amino group include: an amino group, a methylamino group, a dimethylamino group, a diethylamino group and a dibenzylamino group); an alkoxy group (preferably having 1 to 20 carbon atoms, more preferably having 1 to 12 carbon atoms, further more preferably having 1 to 8 carbon atoms, and examples of an alkoxy group include: a methoxy group, an ethoxy group and a butoxy group); an aryloxy group (preferably having 6 to 20 carbon atoms, more preferably having 6 to 16 carbon atoms, further more preferably having 6 to 12 carbon atoms, and examples of an aryloxy group include: a phenyloxy group and a 2-naphthyloxy group); an acyl group (preferably having 1 to 20 carbon atoms, more preferably having 1 to 16 carbon atoms, further more preferably having 1 to 12 carbon atoms, and examples of an acyl group include: an acetyl group, a benzoyl group, a formyl group and a pivaloyl group); an alkoxycarbonyl group (preferably having 2 to 20 carbon atoms, more preferably having 2 to 16 carbon atoms, further more preferably having 2 to 12 carbon atoms, and examples of an alkoxycarbonyl group include: a methoxycarbonyl group and an ethoxycarbonyl group); an aryloxycarbonyl group (preferably having 7 to 20 carbon atoms, more preferably having 7 to 16 carbon atoms, further more preferably having 7 to 10 carbon atoms, and examples of an aryloxycarbonyl group include: a phenyloxycarbonyl group); an acyloxy group (preferably having 2 to 20 carbon atoms, more preferably having 2 to 16 carbon atoms, further more preferably having 2 to 10 carbon atoms, and examples of an acyloxy group include: an acetoxy group and a benzoyloxy group); an acylamino group (preferably having 2 to 20 carbon atoms, more preferably having 2 to 16 carbon atoms, further more preferably having 2 to 10 carbon atoms, and examples of an acylamino group include: an acetylamino group and a benzoylamino group); an alkoxycarbonylamino group (preferably having 2 to 20 carbon atoms, more preferably having 2 to 16 carbon atoms, further more preferably having 2 to 12 carbon atoms, and examples of an alkoxycarbonylamino group include: a methoxycarbonylamino group); an aryloxycarbonylamino group (preferably having 7 to 20 carbon atoms, more preferably having 7 to 16 carbon atoms, further more preferably having 7 to 12 carbon atoms, and examples of an aryloxycarbonylamino group include: a phenyloxycarbonylamino group); a sulfonylamino group (preferably having 1 to 20 carbon atoms, more preferably having 1 to 16 carbon atoms, further more preferably having 1 to 12 carbon atoms, and examples of a sulfonylamino group include: a methanesulfonylamino group and a benzenesulfonylamino group); a sulfamoyl group (preferably having 0 to 20 carbon atoms, more preferably having 0 to 16 carbon atoms, further more preferably having 0 to 12 carbon atoms, and examples of a sulfamoyl group include: a sulfamoyl group, a methylsulfamoyl group, a dimethylsulfamoyl group and a phenylsulfamoyl group); a carbamoyl group (preferably having 1 to 20 carbon atoms, more preferably having 1 to 16 carbon atoms, further more preferably having 1 to 12 carbon atoms, and examples of a carbamoyl group include: a carbamoyl group, a methylcarbamoyl group, a diethylcarbamoyl group and a phenylcarbamoyl group); an alkylthio group (preferably having 1 to 20 carbon atoms, more preferably having 1 to 16 carbon atoms, further more preferably having 1 to 12 carbon atoms, and examples of an alkylthio group include: a methylthio group and an ethylthio group); an arylthio group (preferably having 6 to 20 carbon atoms, more preferably having 6 to 16 carbon atoms, further more preferably having 6 to 12 carbon atoms, and examples of an arylthio group include: a phenylthio group); a sulfonyl group (preferably having 1 to 20 carbon atoms, more preferably having 1 to 16 carbon atoms, further more preferably having 1 to 12 carbon atoms, and examples of an sulfonyl group include: a mesyl group and a tosyl group); a sulfinyl group (preferably having 1 to 20 carbon atoms, more preferably having 1 to 16 carbon atoms, further more preferably having 1 to 12 carbon atoms, examples of a sulfinyl group include: a methane sulfinyl group and a benzene sulfinyl group); an ureido group (preferably having 1 to 20 carbon atoms, more preferably having 1 to 16 carbon atoms, further more preferably having 1 to 12 carbon atoms, examples of an ureido group include: an ureido group, a methylureido group and a phenylureido group); a phosphoric acid amido group (preferably having 1 to 20 carbon atoms, more preferably having 1 to 16 carbon atoms, further more preferably having 1 to 12 carbon atoms, examples of a phosphoric acid amido group include: a diethyl phosphoric acid amido group and a phenyl phosphoric acid amide); a hydroxy group; a mercapto group; a halogen atom (for example, a fluorine atom, a chlorine atom, a bromine atom and an iodine atom); a cyano group; a sulfo group; a carboxyl group; a nitro group; a hydroxamic acid group; a sulfino group; a hydrazino group; an imino group; a heterocycle group (preferably having 1 to 30 carbon atoms, more preferably having 1 to 12 carbon atoms, examples of a hetero atom include: a nitrogen atom, an oxygen atom and a sulfur atom, and concrete examples include: an imidazolyl group, a pyridyl group, a quinolyl group, a furyl group, a piperidyl group, a morpholino group, a benzooxazolyl group, a benzimidazol group and a group benzthiazolyl); and a silyl group (preferably having 3 to 40 carbon atoms, more preferably having 3 to 30 carbon atoms and specifically preferably 3-24, and examples of a silyl group include: a trimethylsilyl group, a triphenylsilyl group). These substituents may further be substituted.

Two or more substituents, if any, may be the same or different from each other. Further, they may form a ring through mutual bondage wherever possible.

The following describes the specific examples of the compounds represented by Formula (6), however, the present invention is not limited thereto.

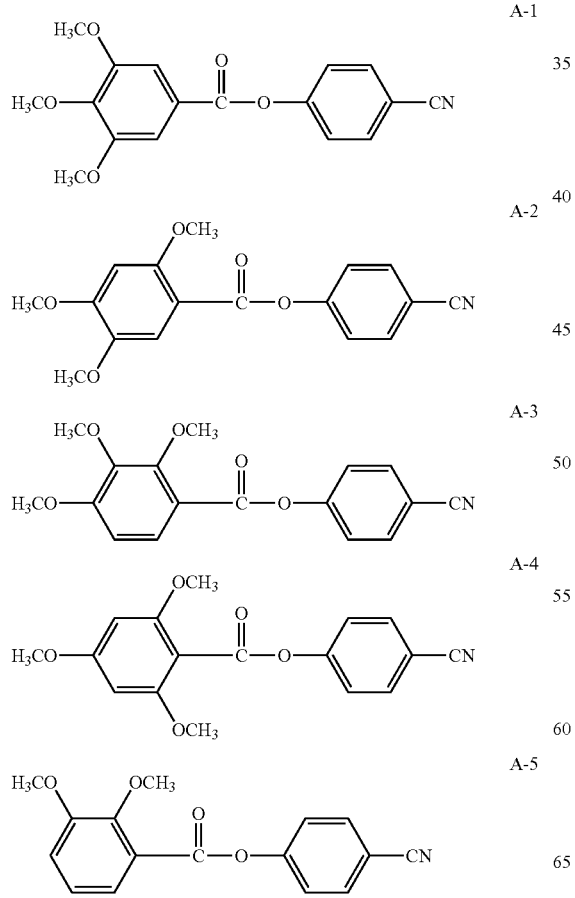

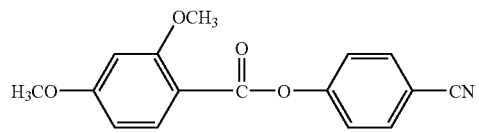

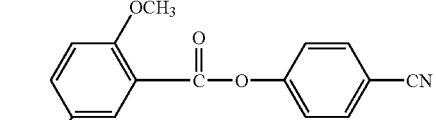

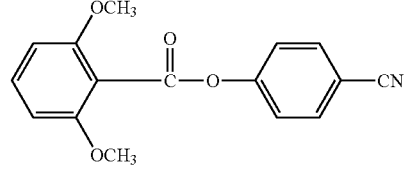

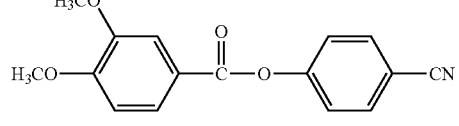

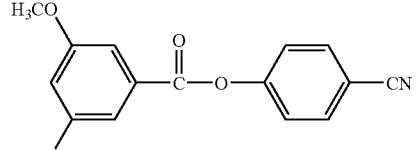

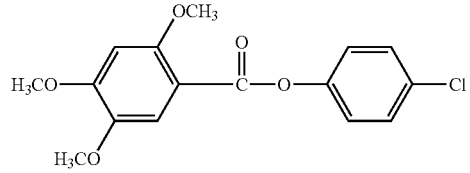

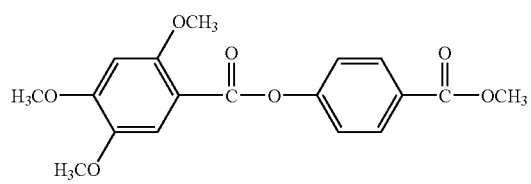

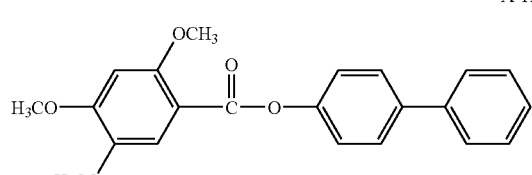

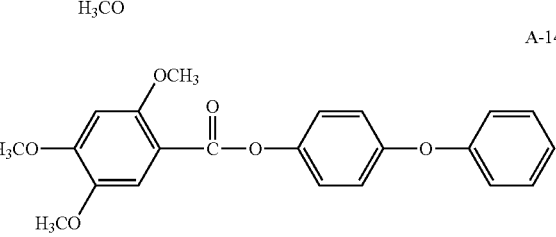

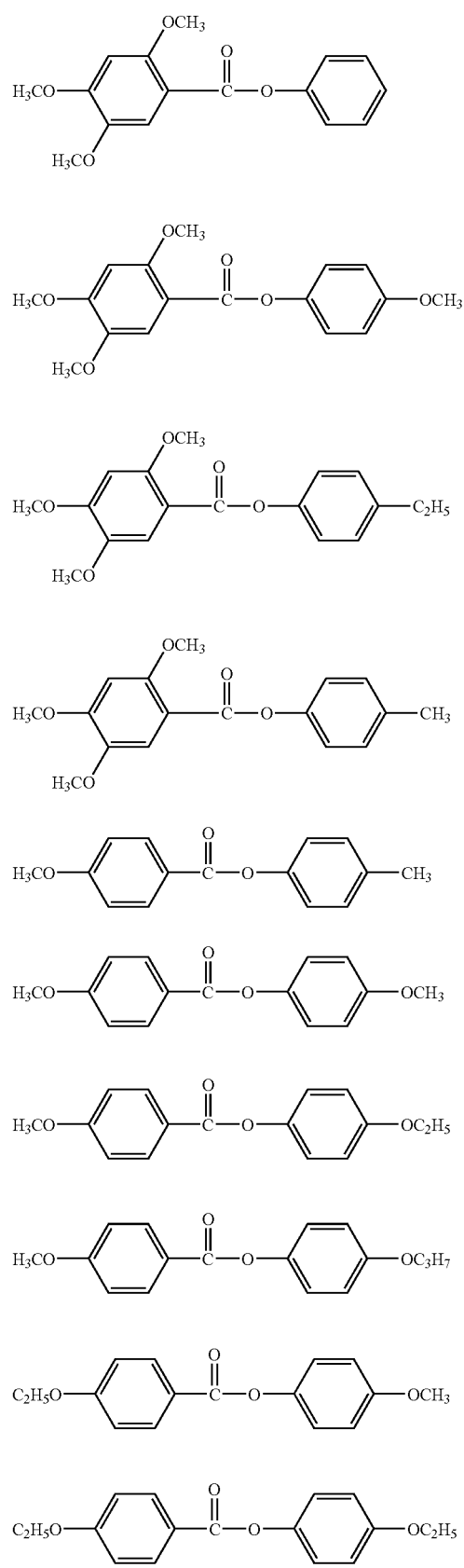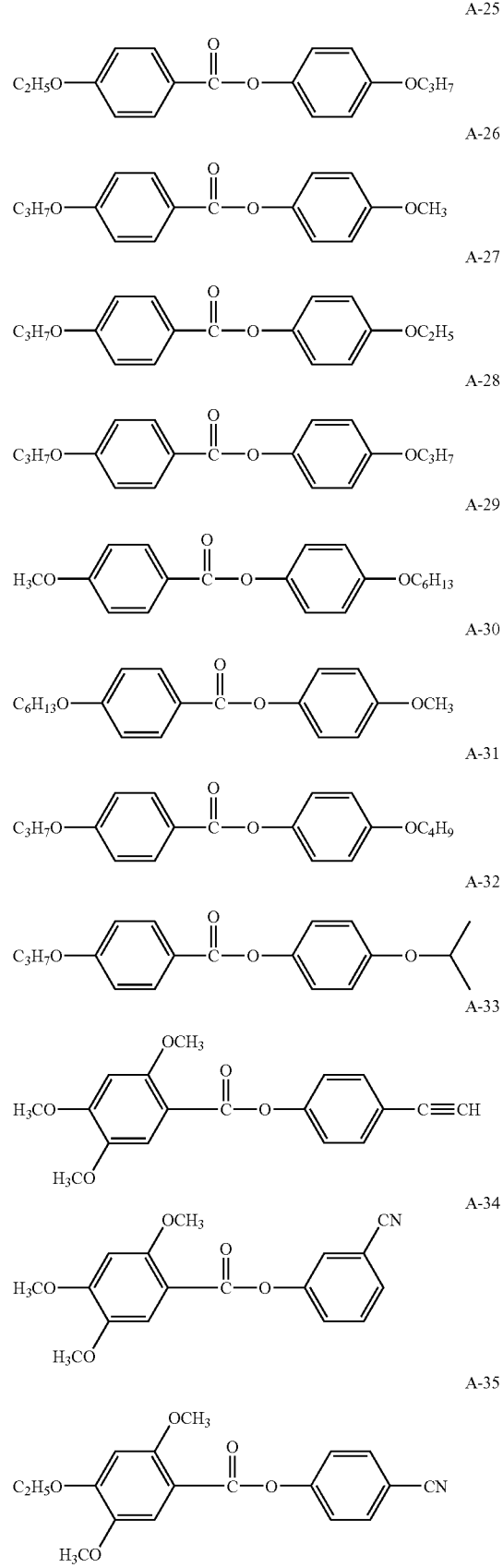

-continued

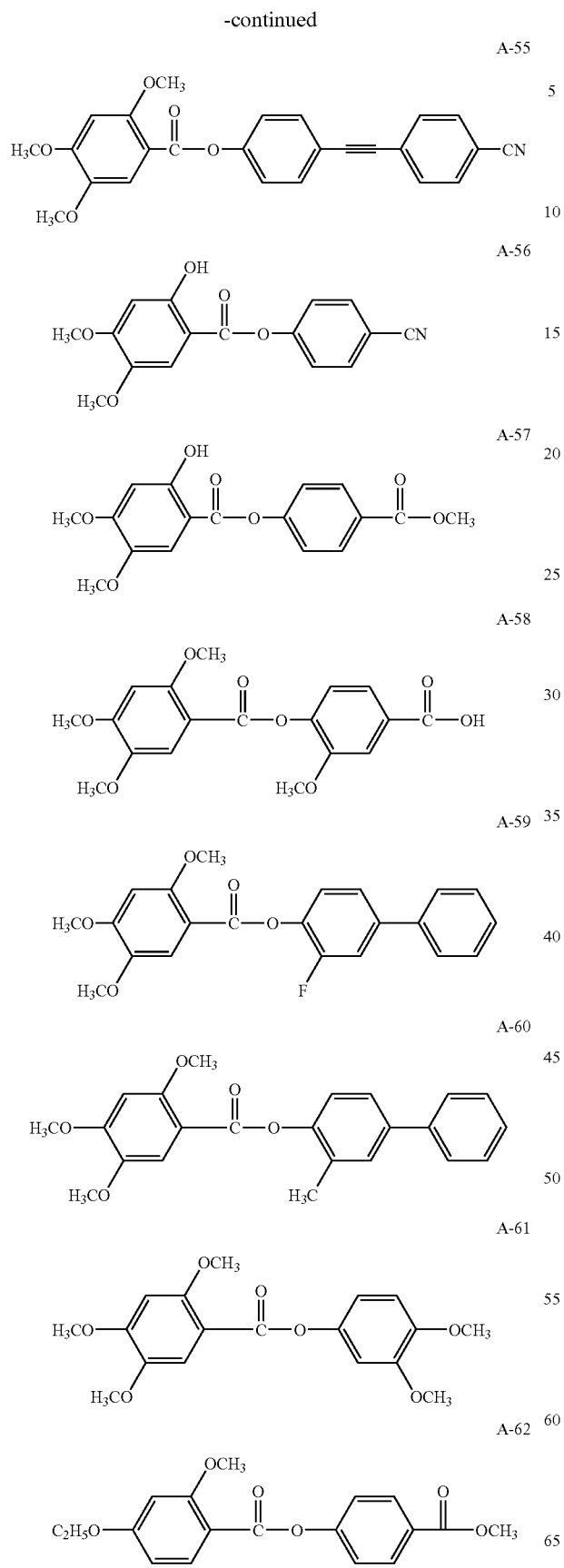

The compound expressed by Formula (6) can be synthesized by the general reaction to form an ester bond between a substituted benzoic acid and a phenol derivative, wherein any form of reaction can be used if only the reaction forms an ester bond. For example, it is possible to use the method for condensation with phenol subsequent to functional conversion of the substituted benzoic acid into an acid halide. Further, it is also possible to use the method for dehydration and condensation of the substituted benzoic acid and phenol derivative utilizing a condensing agent or catalyst.

When the manufacturing process is taken into account, it is preferred to use the method for condensation with phenol subsequent to functional conversion of the substituted benzoic acid into an acid halide.

A hydrocarbon based solvent (preferably toluene and xylene), ether based solvent (preferably dimethyl ether, tetrahydrofuran, dioxane), ketone based solvent, ester based solvent, acetonitryl, dimethylformamide, and dimethyl acetoamide can be used as a reaction solvent. These solvents can be used independently or as a mixture. The preferable reaction solvents include toluene, acetonitryl, dimethylformamide and dimethylacetoamide.

The reaction temperature is preferably 0° C. through 150° C., more preferably 0° C. through 100° C., still more preferably 0° C. through 90° C., and particularly 20° C. through 90° C.

It is preferred in this reaction that a base is not used. However, when a base is used, either an organic or inorganic base can be employed. Of these, the organic base is preferably used, and is exemplified by pyridine and tertiary alkylamine (preferably triethylamine and ethyl diisopropylamine).

The following describes a specific method of synthesizing the compound, however, the present invention is not limited thereto:

EXAMPLE OF SYNTHESIS 1

Synthesis of Example Compound A-1

After heating 24.6 g (0.116 mol) of 3,4,5-trimethoxybenzoic acid, 100 ml of toluene and 1 ml of N—N-dimethylformamide to 60° C., 15.2 g (0.127 mol) of thionyl chloride was slowly added dropwise, and this mixture was heated at 60° C. for two hours. Then 15.1 g (0.127 mol) of 4-cyanophenol dissolved previously into 50 ml of acetonitryl was slowly added dropwise into this solution. After that, the solution was heated and stirred at 60° C. for 3 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 100 ml of acetonitryl was added to the solid having been obtained, thereby recrystalizing the mixture. The acetonitryl solution was cooled down to the room temperature, and the crystal having been precipitated was recovered by filtration, whereby 11.0 g (yield 11%) of the target compound was obtained as a white crystal. In this case, the compound was identified by 1H-NMR (400 MHz) and mass spectrum.

1H-NMR (CDC13) δ3.50 (br, 9H), 7.37 (d, 2H), 7.45 (s, 2H), 7.77 (s, 2H), Mass spectrum: m/z 314 (M+H)+, The compound having been obtained has a melting point of 172° C. through 173° C.

EXAMPLE OF SYNTHESIS 2

Synthesis of Example Compound A-2

After heating 106.1 g (0.5 mol) of 2,4,5-trimethoxybenzoic acid, 340 ml of toluene and 1 ml of dimethylformamide to 60° C., 65.4 g (0.55 mol) of thionyl chloride was slowly added dropwise, and this mixture was heated for 2 hours at 65° C. through 70° C. Then 71.5 g (0.6 mol) of 4-cyanophenol previously dissolved into 150 ml of acetonitryl was slowly added dropwise into this solution. After that, the solution was heated and stirred at 80° C. through 85° C. for 2 hours, and the reaction solution was cooled down to the room temperature. Then ethyl acetate (1 L) and water were used to perform liquid separation, and sodium sulfate was used to remove water from the organic phase having been obtained. Approximately 500 ml of solvent was distilled off under reduced pressure, and 1 L of methanol was added to the solid having been obtained, thereby recrystalizing the mixture. The crystal having been precipitated was recovered by filtration, whereby 125.4 g (yield 80%) of the target compound was obtained as a white crystal. In this case, the compound was identified by 1H-NMR (400 MHz) and mass spectrum.

1H-NMR (CDC13) δ3.91 (s, 3H), 3.93 (s, 3H), 3.98 (s, 3H), 6.59 (s, 1H), 7.35 (d, 2H), 7.58 (s, 1H), 7.74 (d, 2H), Mass spectrum: m/z 314 (M+H)+, The compound having been obtained has a melting point of 116° C.

EXAMPLE OF SYNTHESIS 3

Synthesis of Example Compound A-3

After heating 10.1 g (47.5 mM) of 2,3,4-trimethoxybenzoic acid, 40 ml of toluene and 0.5 ml of dimethylformamide to 80° C., 6.22 g (52.3 mM) of thionyl chloride was slowly added dropwise, and this mixture was heated and stirred for 2 hours at 80° C. Then 6.2 g (52.3 mM) of 4-cyanophenol previously dissolved into 20 ml of acetonitryl was slowly added dropwise into this solution. After that, the solution was heated and stirred at 80° C. through 85° C. for 2 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 50 ml of methanol was added, thereby recrystalizing the mixture. The crystal having been precipitated was recovered by filtration, whereby 11.9 g (yield 80%) of the target compound was obtained as a white crystal. In this case, the compound was identified by 1H-NMR (400 MHz) and mass spectrum.

1H-NMR (CDC13): δ3.50 (br, 9H), 7.37 (d, 2H), 7.45 (s, 2H), 7.77 (s, 2H), Mass spectrum: m/z 314 (M+H)+, The compound having been obtained has a melting point of 102° C. through 103° C.

EXAMPLE OF SYNTHESIS 4

Synthesis of Example Compound A-4

After heating 25.0 g (118 mM) of 2,4,6-trimethoxybenzoic acid, 100 ml of toluene and 1 ml of dimethylformamide to 60° C., 15.4 g (129 mM) of thionyl chloride was slowly added dropwise, and this mixture was heated and stirred for 2 hours at 60° C. Then 15.4 g (129 mM) of 4-cyanophenol previously dissolved into 50 ml of acetonitryl was slowly added dropwise into this solution. After that, the solution was heated and stirred at 80° C. through 85° C. for 4.5 hours, and the reaction solution was cooled down to the room temperature. Then ethyl acetate and water were used to perform liquid separation, and sodium sulfate was used to remove water from the organic phase having been obtained. The solvent was distilled off under reduced pressure, and 500 mL of methanol and 100 ml of acetonitryl were added, thereby recrystalizing the mixture. The crystal having been precipitated was recovered by filtration, whereby 10.0 g (yield 27%) of the target compound was obtained as a white crystal. In this case, the compound was identified by mass spectrum.

Mass spectrum: m/z 314 (M+H)+,

The compound having been obtained has a melting point of 172° C. through 173° C.

EXAMPLE OF SYNTHESIS 5

Synthesis of Example Compound A-5

After heating 15.0 g (82.3 mM) of 2,3-dimethoxybenzoic acid, 60 ml of toluene and 0.5 ml of dimethylformamide to 60° C., thionyl chloride 10.7 (90.5 mM) was slowly added dropwise, and this mixture was heated and stirred for 2 hours at 60° C. Then 10.8 g (90.5 mM) of 4-cyanophenol previously dissolved into 30 ml of acetonitryl was slowly added dropwise into this solution. After that, the solution was heated and stirred at 70° C. through 80° C. for 7 hours, and the reaction solution was cooled down to the room temperature. Then 90 ml of isopropyl alcohol was added, and the crystal having been precipitated was recovered by filtration, whereby 12.3 g (yield 53%) of the target compound was obtained as a white crystal. In this case, the compound was identified by mass spectrum.

Mass spectrum: m/z 284 (M+H)+,

The compound having been obtained has a melting point of 104° C.

EXAMPLE OF SYNTHESIS 6

Synthesis of Example Compound A-6

The compound A-6 was synthesized according to the same procedure as that in the Example of synthesis 5, except that 2,3-dimethoxybenzoic acid of the Example of synthesis 5 was replaced by 2,4-dimethoxybenzoic acid. The compound was identified by mass spectrum.

Mass spectrum: m/z 284 (M+H)+,

The compound having been obtained has a melting point of 134° C. through 136° C.

EXAMPLE OF SYNTHESIS 7

Synthesis of Example Compound A-7

After heating 25.0 g (137 mM) of 2,5-dimethoxybenzoic acid, 100 ml of toluene and 1.0 ml of dimethylformamide to 60° C., 18.0 (151 mM) of thionyl chloride was slowly added dropwise, and this mixture was heated and stirred for 2 hours at 60° C. Then 18.0 g (151 mM) of 4-cyanophenol previously dissolved in 50 ml of acetonitryl was slowly added dropwise into this solution. After that, the solution was heated and stirred at 70° C. through 80° C. for 7.5 hours, and the reaction solution was cooled down to the room temperature. Then ethyl acetate and saturated saline solution were used to perform liquid separation, and sodium sulfate was used to remove water from the organic phase having been obtained. The solvent was distilled off under reduced pressure, and silica gel column chromatography (hexane-ethyl acetate (9/1, V/V)) was used for purification, whereby 18.8 g (yield 48%) of the target compound was obtained as a white crystal. In this case, the compound was identified by mass spectrum.

Mass spectrum: m/z 284 (M+H)+,

The compound having been obtained has a melting point of 79° C. through 80° C.

EXAMPLE OF SYNTHESIS 8

Synthesis of Example Compound A-8

The compound A-8 was synthesized according to the same procedure as that in the Example of synthesis 5, except that 2,3-dimethoxybenzoic acid of the Example of synthesis 5 was replaced by 2,6-dimethoxybenzoic acid. The compound was identified by mass spectrum.

Mass spectrum: m/z 284 (M+H)+,

The compound having been obtained has a melting point of 130° C. through 131° C.

EXAMPLE OF SYNTHESIS 9

Synthesis of Example Compound A-11

The compound A-11 was synthesized according to the same procedure as that in the Example of synthesis 2, except that 71.5 g of 4-cyanophenol of the Example of synthesis 2 was replaced by 76.9 g of 4-chlorophenol. The compound was identified by 1H-NMR (400 MHz) and mass spectrum.

1H-NMR (CDCl3) δ3.90 (s, 3H), 3.94 (s, 3H), 3.99 (s, 3H), 6.58 (s, 1H), 7.15 (d, 2H), 7.37 (d, 2H), 7.56 (s, 1H), Mass spectrum: m/z 323 (M+H)+, The compound having been obtained has a melting point of 127° C. through 129° C.

EXAMPLE OF SYNTHESIS 10

Synthesis of Example Compound A-12

After heating 45.0 g (212 mM) of 2,4,5-trimethoxybenzoic acid, 180 ml of toluene and 1.8 ml of dimethylformamide to 60° C., 27.8 g (233 mM) of thionyl chloride was slowly added dropwise, and this mixture was heated and stirred for 2.5 hours at 60° C. Then 35.4 g (233 mM) of methyl 4-hydroxybenzoate previously dissolved in 27 ml of dimethylformamide was slowly added dropwise into this solution. After that, the solution was heated and stirred at 80° C. for 3 hours, and the reaction solution was cooled down to the room temperature. Then 270 ml of methanol was added, and the crystal having been precipitated was recovered by filtration, whereby 64.5 g (yield 88%) of the target compound was obtained as a white crystal. In this case, the compound was identified by 1H-NMR (400 MHz) and mass spectrum.

1H-NMR (CDCl3) δ3.95 (m, 9H), 3.99 (s, 3H), 6.57 (s, 1H), 7.28 (d, 2H), 7.57 (s, 1H) 8.11 (d, 2H), Mass spectrum: m/z 347 (M+H)+, The compound having been obtained has a melting point of 121° C. through 123° C.

EXAMPLE OF SYNTHESIS 11

Synthesis of Example Compound A-13

After heating 20.0 g (94.3 mM) of 2,4,5-trimethoxybenzoic acid, 100 ml of toluene and 1 ml of dimethylformamide to 60° C., 12.3 g (104 mM) of thionyl chloride was slowly added dropwise, and this mixture was heated and stirred for 3.5 hours at 60° C. Then 17.7 g (104 mM) of 4-phenyl phenol previously dissolved in 150 ml of toluene was slowly added dropwise into this solution. After that, the solution was heated and stirred at 80° C. for 3 hours, and the reaction solution was cooled down to the room temperature. Then 250 ml of methanol was added, and the crystal having been precipitated was recovered by filtration, whereby 21.2 g (yield 62%) of the target compound was obtained as a white crystal. In this case, the compound was identified by 1H-NMR (400 MHz) and mass spectrum.

1H-NMR (CDCl3) δ3.93 (s, 3H), 3.96 (s, 3H), 3.99 (s, 3H), 6.59 (s, 1H), 7.26-7.75 (m, 10H), Mass spectrum: m/z 365 (M+H)+, The compound having been obtained has a melting point of 131° C. through 132° C.

EXAMPLE OF SYNTHESIS 12

Synthesis of Example Compound A-14

After heating 12.9 g (61 mM) of 2,4,5-trimethoxybenzoic acid, 50 ml of toluene and 0.6 ml of dimethylformamide to 60° C., 8.0 g (67 mM) of thionyl chloride was slowly added dropwise, and this mixture was heated and stirred for 3.5 hours at 60° C. Then 17.7 g (104 mM) of 4-phenoxyphenol previously dissolved in 25 ml of acetonitryl was slowly added dropwise into this solution. After that, the solution was heated and stirred at 80° C. for 3 hours, and the reaction solution was cooled down to the room temperature. Then 100 ml of methanol was added, and the crystal having been precipitated was recovered by filtration, whereby 21.6 g (yield 93%) of the target compound was obtained as a white crystal. In this case, the compound was identified by mass spectrum.

Mass spectrum: m/z 381 (M+H)+,

The compound having been obtained has a melting point of 91° C. through 92° C.

EXAMPLE OF SYNTHESIS 13

Synthesis of Example Compound A-15

The compound A-15 was synthesized according to the same procedure as that in the Example of synthesis 2, except that 71.5 g of 4-cyanophenol of the Example of synthesis 2 was replaced by 56.4 g of phenol. The compound was identified by 1H-NMR (400 MHz) and mass spectrum.

1H-NMR (CDC13) δ3.91 (s, 3H), 3.93 (s, 3H), 3.99 (s, 3H), 6.58 (s, 1H), 7.19-7.27 (m, 3H), 7.42 (m, 2H), 7.58 (s, 1H) Mass spectrum: m/z 289 (M+H)+, The compound having been obtained has a melting point of 105° C. through 108° C.

EXAMPLE OF SYNTHESIS 14

Synthesis of Example Compound A-16

The compound A-16 was synthesized according to the same procedure as that in the Example of synthesis 2, except that 71.5 g of 4-cyanophenol of the Example of synthesis 2 was replaced by 74.4 g of 4-methoxy phenol. In this case, the compound was identified by 1H-NMR (400 MHz) and mass spectrum.

1H-NMR (CDC13) δ3.84 (s, 3H), 3.92 (s, 3H), 3.93 (s, 3H), 3.99 (s, 3H), 6.58 (s, 1H), 6.92 (d, 2H), 7.12 (d, 2H), 7.42 (m, 2H), 7.58 (s, 1H), Mass spectrum: m/z 319 (M+H)+, The compound having been obtained has a melting point of 102° C. through 103° C.

EXAMPLE OF SYNTHESIS 15

Synthesis of Example Compound A-17

The compound A-17 was synthesized according to the same procedure as that in the Example of synthesis 2, except that 71.5 g of 4-cyanophenol of the Example of synthesis 2 was replaced by 73.3 g of 4-ethyl phenol. The compound was identified by 1H-NMR (400 MHz) and mass spectrum.

Mass spectrum: m/z 317 (M+H)+,

The compound having been obtained has a melting point of 70° C. through 71° C.

EXAMPLE OF SYNTHESIS 16

Synthesis of Example Compound A-24

After heating 27.3 g (164 mM) of 4-ethoxybenzoic acid, 108 ml of toluene and 1 ml of dimethylformamide to 60° C., 21.5 g (181 mM) of thionyl chloride was slowly added dropwise, and this mixture was heated and stirred for 2 hours at 60° C. Then 25.0 g (181 mM) of 4-ethoxy phenol previously dissolved into 50 ml of acetonitryl was slowly added dropwise into this solution. After that, the solution was heated and stirred at 80° C. for 4 hours, and the reaction solution was cooled down to the room temperature. Then 100 ml of methanol was added, and the crystal having been precipitated was recovered by filtration, whereby 30.6 g (yield 65%) of the target compound was obtained as a white crystal. In this case, the compound was identified by 1H-NMR (400 MHz) and mass spectrum.

1H-NMR (CDC13) δ1.48-1.59 (m, 6H), 4.05 (q, 2H), 4.10 (q, 2H), 6.89-7.00 (m, 4H), 7.10 (d, 2H), 8.12 (d, 2H), Mass spectrum: m/z 287 (M+H)+, The compound having been obtained has a melting point of 113° C. through 114° C.

EXAMPLE OF SYNTHESIS 17

Synthesis of Example Compound A-25

After heating 24.7 g (149 mM) of 4-ethoxybenzoic acid, 100 ml of toluene and 1 ml of dimethylformamide to 60° C., 19.5 g (164 mM) of thionyl chloride was slowly added dropwise, and this mixture was heated and stirred for 2 hours at 60° C. Then 25.0 g (165 mM) of 4-propoxy phenol previously dissolved into 50 ml of acetonitryl was slowly added dropwise into this solution. After that, the solution was heated and stirred at 80° C. for 4 hours, and the reaction solution was cooled down to the room temperature. Then 100 ml of methanol was added, and the crystal having been precipitated was recovered by filtration. 100 ml of acetonitryl was added to the solid having been obtained, thereby recrystalizing the mixture. The crystal having been obtained was recovered by filtration, whereby 33.9 g (yield 76%) of the target compound was obtained as a white crystal. In this case, the compound was identified by 1H-NMR (400 MHz) and mass spectrum.

1H-NMR (CDC13) δ1.04 (t, 3H), 1.45 (t, 3H), 1.82 (q, 2H), 3.93 (q, 2H), 4.04 (q, 2H), 6.89-7.00 (m, 4H), 7.10 (d, 2H), 8.12 (d, 2H), mass spectrum: m/z 301 (M+H)+, The compound having been obtained has a melting point of 107° C.

EXAMPLE OF SYNTHESIS 18

Synthesis of Example Compound A-27

The compound A-27 was synthesized according to the same procedure as that in the Example of synthesis 16 (Synthesis of A-24), except that 27.3 g of 4-ethoxybenzoic acid of the Example of synthesis 1 was replaced by 29.5 g of 4-propoxybenzoic acid. In this case, the compound was identified by mass spectrum.

Mass spectrum: m/z 301 (M+H)+,

The compound having been obtained has a melting point of 88° C. through 89° C.

EXAMPLE OF SYNTHESIS 19

Synthesis of Example Compound A-28

The compound A-28 was synthesized according to the same procedure as that in the Example of synthesis 17 (Synthesis of A-25), except that 24.7 g of 4-ethoxybenzoic acid of the Example of synthesis 1 was replaced by 26.8 g of 4-propoxybenzoic acid. In this case, the compound was identified by mass spectrum.

Mass spectrum: m/z 315 (M+H)+,

The compound having been obtained has a melting point of 92° C.

EXAMPLE OF SYNTHESIS 20

Synthesis of Example Compound A-40

After heating 20.0 g (109 mM) of 2,4-dimethoxybenzoic acid, 80 ml of toluene and 0.8 ml of dimethylformamide to 60° C., 14.4 g (121 mM) of thionyl chloride was slowly added dropwise, and this mixture was heated and stirred for 3.5 hours at 60° C. Then 20.5 g (121 mM) of 4-phenyl phenol previously dissolved into 50 ml of dimethylformamide was slowly added dropwise into this solution. After that, the solution was heated and stirred at 80° C. for 6 hours, and the reaction solution was cooled down to the room temperature. Then 100 ml of methanol was added, and the crystal having been precipitated was recovered by filtration, whereby 31.7 g (yield 86%) of the target compound was obtained as a white crystal. In this case, the compound was identified by mass spectrum.

Mass spectrum: m/z 335 (M+H)+,

EXAMPLE OF SYNTHESIS 21

Synthesis of Example Compound A-42

After heating 30.0 g (165 mM) of 2,4-dimethoxybenzoic acid, 120 ml of toluene and 1.2 ml of dimethylformamide to 60° C., 21.6 g (181 mM) of thionyl chloride was slowly added dropwise, and this mixture was heated and stirred for 2 hours at 60° C. Then 27.6 g (181 mM) of methyl 4-hydroxybenzoate previously dissolved into 40 ml of dimethylformamide was slowly added dropwise into this solution. After that, the solution was heated and stirred at 80° C. for 6 hours, and the reaction solution was cooled down to the room temperature. Then 140 ml of methanol was added, and the crystal having been precipitated was recovered by filtration, whereby 24.4 g (yield 47%) of the target compound was obtained as a white crystal. In this case, the compound was identified by 1H-NMR (400 MHz) and mass spectrum.

Mass spectrum: m/z 317 (M+H)+,

The compound having been obtained has a melting point of 122° C. through 123° C.

EXAMPLE OF SYNTHESIS 22

Synthesis of Example Compound A-51

20.7 g (50 mM) of 2,4,5-trimethoxybenzoic acid 4-iodophenyl, 5.61 g (55 mM) of ethynyl benzene, 27.8 ml (200 mM) of triethylamine and 40 ml of tetrahydrofuran was stirred in an atmosphere of nitrogen at the room temperature, and 114 mg (0.6 mM) of cuprous chloride, 655 mg (2.5 mM) of triphenyl phosphine and 351 mg (0.5 mM) of bis(triphenyl phosphine) palladium dichloride were added to this mixture. The mixture was heated and stirred at 60° C. for 6 hours. After that, the reaction solution was cooled down to the room temperature, and 400 ml of water was added. The crystal having been obtained was filtered, and 160 ml of methanol 160 ml was added for recrystalization, whereby 17.2 g (yield 89%) of the target compound was obtained as a yellowish white crystal. In this case, the compound was identified by 1H-NMR (400 MHz) and mass spectrum.

1H-NMR (CDC13) δ3.92 (s, 3H), 3.95 (s, 3H) 4.00 (s, 3H) 6.58 (s, 1H), 7.22 (m, 2H), 7.32 (m, 3H), 7.53-7.62 (m, 5H), Mass spectrum: m/z 389 (M+H)+, The compound having been obtained has a melting point of 129° C. through 130° C.

EXAMPLE OF SYNTHESIS 23

Synthesis of Example Compound A-52

After heating 42.4 g (0.2 mol) of 2,4,5-trimethoxybenzoic acid, 26.8 g (0.22 mol) of 4-hydroxybenzaldehyde, 170 ml of toluene and 1.7 ml of N,N-dimethylformamide to 80° C., 26.0 g (0.22 mol) of thionyl chloride was slowly added dropwise. The mixture was heated at 80° C. for 6 hours, and the reaction solution was cooled down to the room temperature. After that, ethyl acetate, water and saturated saline solution were added for liquid separation. Water was removed from the organic phase having been obtained by sodium sulfate. After that, the solvent was distilled off under reduced pressure. 240 ml of isopropyl alcohol was added to the solid having been obtained, thereby recrystalizing the mixture. The solution was cooled down to the room temperature and the crystal having been obtained was recovered by filtration, whereby 40.8 g (yield 65%) of the target compound was obtained as a white crystal. In this case, the compound was identified by 1H-NMR (400 MHz) and mass spectrum.

1H-NMR (CDC13) δ3.92 (s, 3H), 3.95 (s, 3H) 4.00 (s, 3H), 6.58 (s, 1H), 7.34 (d, 2H), 7.59 (s, 1H), 8.17 (d, 2H), Mass spectrum: m/z 317 (M+H)+, The compound having been obtained has a melting point of 103° C. through 105° C.

EXAMPLE OF SYNTHESIS 24

Synthesis of Example Compound A-53

After adding 3.93 g (25.2 mM) of sodium dihydrogen phosphate dissolved in 5 ml of water was added dropwise into 40 g (126 mM) of 2,4,5-trimethoxybenzoic acid 4-formyl phenyl and 400 ml of acetonitryl, 18.3 g of 35% hydrogen peroxide solution was added to the mixture dropwise for 20 minutes. This was followed by the step of adding 14.1 g (126 mM) of 80% sodium chlorite (by Wako Junyaku Co., Ltd.) dissolved in 43 ml of water for 20 minutes, and stirring the mixture for 4.5 hours at the room temperature. After that, 100 ml of water was added and the mixture was cooled down to 10° C. The crystal having been obtained was filtered out and was recrystallized by addition of 500 ml of methanol, whereby 25.4 g (yield 60%) of the target compound was obtained as a white crystal.

The compound was identified by 1H-NMR (400 MHz) and mass spectrum.

1H-NMR (CDC13) δ3.92 (s, 3H), 3.95 (s, 3H) 4.00 (s, 3H), 6.59 (s, 1H), 7.40 (d, 2H), 7.57 (s, 1H), 7.96 (d, 2H), 10.0 (s, 1H), Mass spectrum: m/z 333 (M+H)+, The compound having been obtained has a melting point of 188° C. through 189° C.

EXAMPLE OF SYNTHESIS 25

Synthesis of Example Compound A-54

After heating 5.00 g (23.5 mM) of 2,4,5-trimethoxybenzoic acid, 5.52 g (23.5 mM) of benzoic acid (4-hydroxy) anilide, 50 ml of acetonitryl and 1.0 ml of N,N-dimethylformamide to 70° C., 3.4 g (28.5 mM) of thionyl chloride was slowly added, and the mixture was heated at 70° C. for 3 hours. The reaction solution was cooled down to the room temperature, and 50 ml of methanol was added thereafter. The crystal having been precipitated was recovered by filtration, whereby 8.1 g (yield 84%) of the target compound was obtained as a white crystal. In this case, the compound was identified by 1H-NMR (400 MHz) and mass spectrum.

1H-NMR (CDC13) δ3.92 (s, 3H), 3.95 (s, 3H) 4.00 (s, 3H), 6.60 (s, 1H), 7.12-8.10 (m, 10H), Mass spectrum: m/z 408 (M+H)+, The compound having been obtained has a melting point of 189° C. through 190° C.

EXAMPLE OF SYNTHESIS 26

Synthesis of Example Compound A-56

After heating 8.50 g (42.8 mM) of 2-hydroxy-4,5-dimethoxybenzoic acid, 5.62 g (42.8 mM) of 4-cyanophenol, 45 ml of toluene and 0.5 ml of N,N-dimethylformamide to 70° C., 5.6 g (47.1 mM) of thionyl chloride was slowly added dropwise, and this mixture was heated and stirred for 3 hours at 80° C. The reaction solution was cooled down to the room temperature. Then 50 ml of methanol was added, and the crystal having been precipitated was recovered by filtration, whereby 5.8 g (yield 45%) of the target compound was obtained as a white crystal. In this case, the compound was identified by 1H-NMR (400 MHz).

1H-NMR (CDC13) δ3.92 (s, 3H), 3.97 (s, 3H), 6.67 (s, 1H), 7.38 (m, 3H), 7.77 (d, 2H), 10.28 (s, 1H), Mass spectrum: m/z 333 (M+H)+, The compound having been obtained has a melting point of 145° C. through 146° C.

EXAMPLE OF SYNTHESIS 27

Synthesis of Example Compound A-57

After heating 8.50 g (42.8 mM) of 2-hydroxy-4,5-dimethoxybenzoic acid, 7.17 g (42.8 mM) of methyl 4-hydroxybenzoate, 45 ml of toluene and 0.5 ml of N,N-dimethylformamide to 70° C., 6.1 g (51.2 mM) of thionyl chloride was slowly added dropwise, and this mixture was heated and stirred for 3 hours at 80° C. Then the reaction solution was cooled down to the room temperature. Thus, 50 ml of methanol was added, and the crystal having been precipitated was recovered by filtration, whereby 6.9 g (yield 49%) of the target compound was obtained as a white crystal. In this case, the compound was identified by 1H-NMR (400 MHz).

1H-NMR (CDC13) δ3.92 (s, 3H), 3.97 (s, 6H), 6.55 (s, 1H), 7.31 (d, 2H), 7.41 (s, 1H), 8.16 (d, 2H), 10.41 (s, 1H), Mass spectrum: m/z 333 (M+H)+, The compound having been obtained has a melting point of 128° C.

EXAMPLE OF SYNTHESIS 28

Synthesis of Example Compound A-58

The compound A-58 was synthesized according to the same procedure as that in the Example of synthesis 2, except that dicyanophenol of the Example of synthesis 2 was replaced by vanillic acid. The compound having been obtained has a melting point of 201° C. through 203° C.

EXAMPLE OF SYNTHESIS 29

Synthesis of Example Compound A-62

The compound A-62 was synthesized according to the same procedure as that in the Example of synthesis 10, except that 2,4,5-trimethoxybenzoic acid of the Example of synthesis 10 was replaced by 4-ethoxy-2-methoxybenzoic acid. The compound having been obtained has a melting point of 88° C. through 89° C.

EXAMPLE OF SYNTHESIS 30

Synthesis of Example Compound A-63

The compound A-63 was synthesized according to the same procedure as that in the Example of synthesis 10, except that 2,4,5-trimethoxybenzoic acid of the Example of synthesis 10 was replaced by 4-hydroxy-2-methoxybenzoic acid. The compound having been obtained has a melting point of 108° C. through 113° C.

EXAMPLE OF SYNTHESIS 31

Synthesis of Example Compound A-65

The compound A-65 was synthesized according to the same procedure as that in the Example of synthesis 2, except that 2,4-dimethoxybenzoic acid of the Example of synthesis 2 was replaced by 4-hydroxy-2-methoxybenzoic acid. The compound having been obtained has a melting point of 142° C. through 144° C.

0.1 through 20 percent by mass of at least one of the compounds expressed by the Formulae (6), (7), (7-A) through (7-E) and (8) is preferably added to cellulose, wherein the amount of the aforementioned compound is more preferably 0.5 through 16 percent by mass, still more preferably 1 through 12 percent by mass, particularly 2 through 8 percent by mass, most preferably 3 through 7 percent by mass.

As a retardation control agent, a compound having a 1,3,5-triazine ring can be preferably used.

Among the compounds having a 1,3,5-triazine ring, preferable is a compound represented by Formula (9).

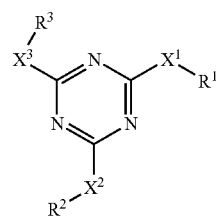

Formula (9)

In Formula (9), $X^1$ is a single bond, —$NR_4$—, —O— or —S—;

$X^2$ is a single bond, —$NR_5$—, —O— or —S—; $X^3$ is a single bond, —$NR_6$—, —O— or —S—; $R^1$, $R^2$ and $R^3$ are each an alkyl group, an alkenyl group, an aryl group or a heterocyclic group; and $R_4$, $R_5$ and $R_6$ are each a hydrogen atom, an alkyl group, an alkenyl group, an aryl group or a heterocyclic group. The compound represented by Formula (9) is particularly preferably a melamine compound.

In the melamine compound of Formula 12, it is preferable that the $X^1$, $X^2$ and $X^3$ are each the —$NR_4$—, —$NR_5$— and —$HR_6$—, respectively, or the $X^1$, $X^2$ and $X^3$ are each a single bond and the $R^1$, $R^2$ and $R^3$ are each a heterocyclic group having a free valency at the nitrogen atom thereof. The —$X^1$—$R^1$, —$X^2$—$R^2$ and —$X^3$—$R^3$ are preferably the same substituting group. The $R^1$, $R^2$ and $R^3$ are particularly preferably an aryl group. The $R_4$, $R_5$ and $R_6$ are each particularly preferably a hydrogen atom.

The alkyl group is more preferably a chain alkyl group than a cyclic alkyl group. A straight-chain alkyl group is more preferably to a branched-chain alkyl group.

The number of carbon atom of the alkyl group is preferably from 1 to 30, more preferably from 1 to 20, further preferably from 1 to 10, further more preferably from 1 to 8, and most preferably from 1 to 6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group. The alkenyl group is more preferably a chain alkenyl group than a cyclic alkenyl group. A straight-chain alkenyl group is preferably to a branched-chain alkenyl group. The number of carbon atom of the alkenyl group is preferably from 2 to 30, more preferably from 2 to 20, further preferably from 2 to 10, further more preferably from 2 to 8, and most preferably from 2 to 6. The alkyl group may have a substituent.

Concrete examples of the substituent include a halogen atom, an alkoxy group such as a methoxy group, an ethoxy group and an epoxyethyloxy group, and a acyloxy group such as an acryloyl group and a methacryloyl group.

The aryl group is preferably a phenyl group or a naphthyl group, and the phenyl group is particularly preferable. The aryl group may have a substituent.

Concrete examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an aryloxycarbonyl group, a sulfamoyl group, an alkyl-substituted sulfamoyl group, an alkenyl-substituted sulfamoyl group, an aryl-substituted sulfamoyl group, a sulfonamido group, a carbamoyl group, an alkyl-substituted carbamoyl group, an alkenyl-substituted carbamoyl group, an aryl-substituted carbamoyl group, an amido group, an alkylthio group, an alkenylthio group, an arylthio group and an acyl group. The above alkyl group is the same as the foregoing alkyl group.

The alkyl moiety of the alkoxyl group, acyloxy group, alkoxycarbonyl group, alkyl-substituted sulfamoyl group, sulfonamido group, alkyl-substituted carbamoyl group, amido group, alkylthio group and acyl group is the same as the foregoing alkyl group.

The above alkenyl group is the same as the forgoing alkenyl group.

The alkenyl moiety of the alkenyloxy group, acyloxy group, alkenyloxycarbonyl group, alkenyl-substituted sulfamoyl group, sulfonamido group, alkenyl-substituted carbamoyl group, amido group, alkenylthio group and acyl group is the same as the foregoing alkenyl group.

Concrete examples of the aryl group include a phenyl group, an α-naphthyl group, a β-naphthyl group, a 4-methoxyphenyl group, a 3,4-diethoxyphenyl group, a 4-octyloxyphenyl group and a 4-dodecyloxyphenyl group.

The aryl moiety of the aryloxy group, acyloxy group, aryloxycarbonyl group, aryl-substituted sulfamoyl group, sulfonamido group, arylsubstituted carbamoyl group, amido group, arylthio group and acyl group is the same as the foregoing aryl group.

The heterocyclic group is preferably has aromaticity, when the $X^1$, $X^2$ and $X^3$ are an —NR— group, an —O— atom or an —S— group.

The heterocycle in the heterocyclic group having aromaticity is usually a unsaturated heterocycle, preferably a heterocycle having highest number of double bond. The heterocycle is preferably a 5-, 6- or 7-member ring, more preferably the 5- or 6-member ring and most preferably the 6-member ring.

The hetero atom in the heterocycle is preferably a nitrogen atom, a sulfur atom or an oxygen atom, and the nitrogen atom is particularly preferable.

As the heterocycle having aromaticity, a pyridine ring such as a 2-pyridyl group and a 4-pyridyl group is particularly preferable. The heterocyclic group may have a substituent. Examples of the substituent are the same as the substituent of the foregoing aryl moiety.

When $X^1$, $X^2$ and $X^3$ are each the single bond, the heterocyclic group preferably has a free valency at the nitrogen atom. The heterocyclic group having the free valency at the nitrogen atom is preferably 5-, 6- or 7-member ring, more preferably the 5- or 6-member ring, and most preferably the 5-member ring. The heterocyclic group may have plural nitrogen atoms.

The heterocyclic group may have a hetero-atom other than the nitrogen atom such as an oxygen atom and a sulfur atom. The heterocyclic group may have a substituent. Concrete examples of the heterocyclic group are the same as those of the aryl moiety.

Examples of the heterocyclic group having the free valency at the nitrogen atom are listed below.

(Hc-1)

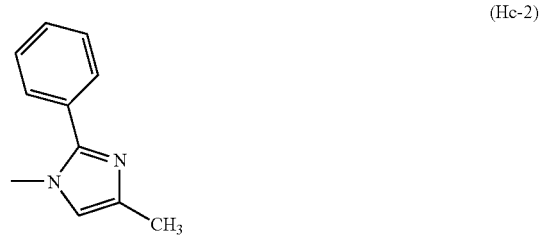

(Hc-2)

(Hc-3)

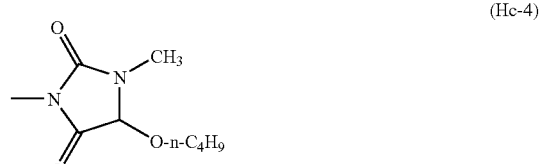

(Hc-4)

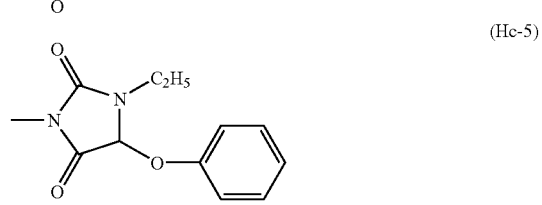

(Hc-5)

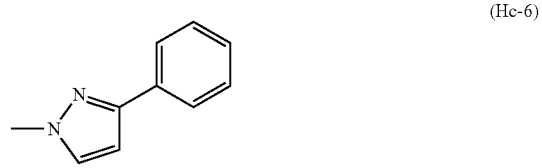

(Hc-6)

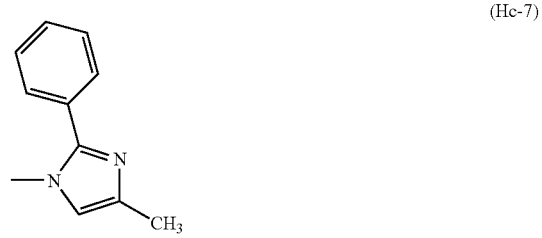

(Hc-7)

-continued

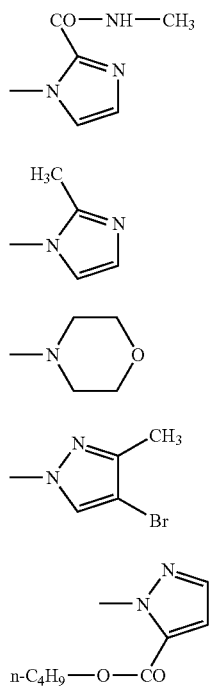

(Hc-8)

(Hc-9)

(Hc-10)

(Hc-11)

(Hc-12)

The molecular weight of the compound having a 1.3.5-triazine ring is preferably from 300 to 2,000. The boiling point of these compounds is preferably not less than 260° C. The boiling point can be measured by a measuring apparatus available on the market such as TG/DTA100, manufactured by Seiko Denshi Kogyo Co., Ltd.

Concrete examples of the compound having the 1,3,5-triazine ring are shown below.

In the followings, plural R each represent the same group.

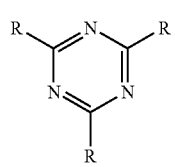

(1)~(12)

(1) Butyl
(2) 2-methoxy-2-ethoxyethyl
(3) Undecenyl
(4) Phenyl
(5) 4-ethoxycarbonylphenyl
(6) 4-butozyphenyl
(7) p-biphenylyl
(8) 4-pyridyl
(9) 2-naphthyl
(10) 2-methylphenyl
(11) 3,4-dimethoxyphenyl
(12) 2-furyl (13)

(14)~(79)

(14) phenyl
(15) 3-ethoxycarbonylphenyl
(16) 3-butoxyphenyl
(17) m-biphenyryl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenol
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenyryl
(36) 4-phenylthiophenyl
(37) 4-chlorophenyl
(38) 4-benzoylphenyl
(39) 4-actoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diactoxyphenyl
(58) 3,4-dibenzoyloxyphenyl
(59) 3,4-diphenoxycarbonylphenyl

(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylpenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

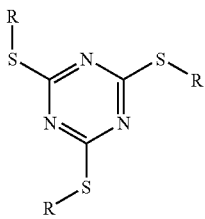

(80)~(145)

(80) phenyl
(81) 3-ethoxycarbonylphenyl
(82) 3-butoxyphenyl
(83) m-biphenyryl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenol
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3-hydroxyphenyl
(99) 4-ethoxycarbonylphenyl
(100) 4-butoxyphenyl
(101) p-biphenyryl
(102) 4-phenylthiophenyl
(103) 4-chlorophenyl
(104) 4-benzoylphenyl
(105) 4-actoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diactoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylpenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

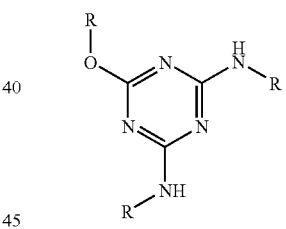

(146)~(164)

(146) phenyl
(147) 4-ethoxycarbonylphenyl
(148) 4-butoxyphenyl
(149) p-biphenyryl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenol
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

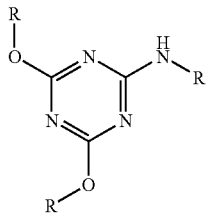

(165)~(183)

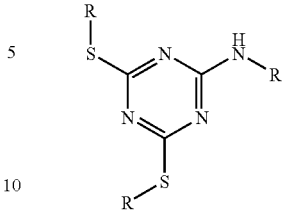

(165) phenyl
(166) 4-ethoxycarbonylphenyl
(167) 4-butoxyphenyl
(168) p-biphenyryl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenol
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl (203) phenyl
(204) 4-ethoxycarbonylphenyl
(205) 4-butoxyphenyl
(206) p-biphenyryl
(207) 4-phenylthiophenyl
(208) 4-chlorophenyl
(209) 4-benzoylphenyl
(210) 4-acetoxyphenyl
(211) 4-benzoyloxyphenyl
(212) 4-phenoxycarbonylphenol
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl (203)~(221)

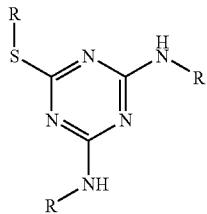

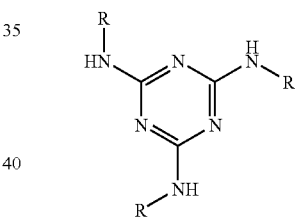

(222)~(419)

(184) phenyl
(185) 4-ethoxycarbonylphenyl
(186) 4-butoxyphenyl
(187) p-biphenyryl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenol
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl (222) phenyl
(223) 4-butylphenyl
(224) 4-2-methoxy-2-ethoxyethyl)phenyl
(225) 4-(5-nenenyl)phenyl
(226) p-biphenyryl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-aceoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl (245) 3-(2-methoxy-2-ethoxyethyl)phenyl
(246) 3-(5-nonenyl)phenyl
(247) m-biphenyryl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-actoxyphenyl
(255) 3-benzoyloxyphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3-hydroxyphenyl
(265) 2-butylphenyl
(266) 2-(2-methoxy-2-ethoxyethyl)phenyl
(267) 2-(5-nonenyl)phenyl
(268) o-biphenyryl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-aceoxyphenyl
(276) 2-benzoyloxyphenyl
(277) 4-phenoxycarbonylphenyl
(278) 2-methoxyphenyl
(279) 2-anilinophenyl
(280) 2-isobutyrylaminophenyl
(281) 2-phenoxycarbonyl aminophenyl
(282) 2-(3-ethylureido)phenyl
(283) 2-(3,3-dimethylureido)phenyl
(284) 2-phenoxyphenyl
(285) 2-hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxyphenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl (351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydoxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl
(382) 2,4,6-triphenoxyphenyl
(383) 2,4,6-trihydoxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsufamoyl-2-naphtyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenylsulfamoyl-2-naphthyl
(395) 1-(4-methylphenyl)-2-naphthyl
(396) 6,8-di-N-methylsufamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

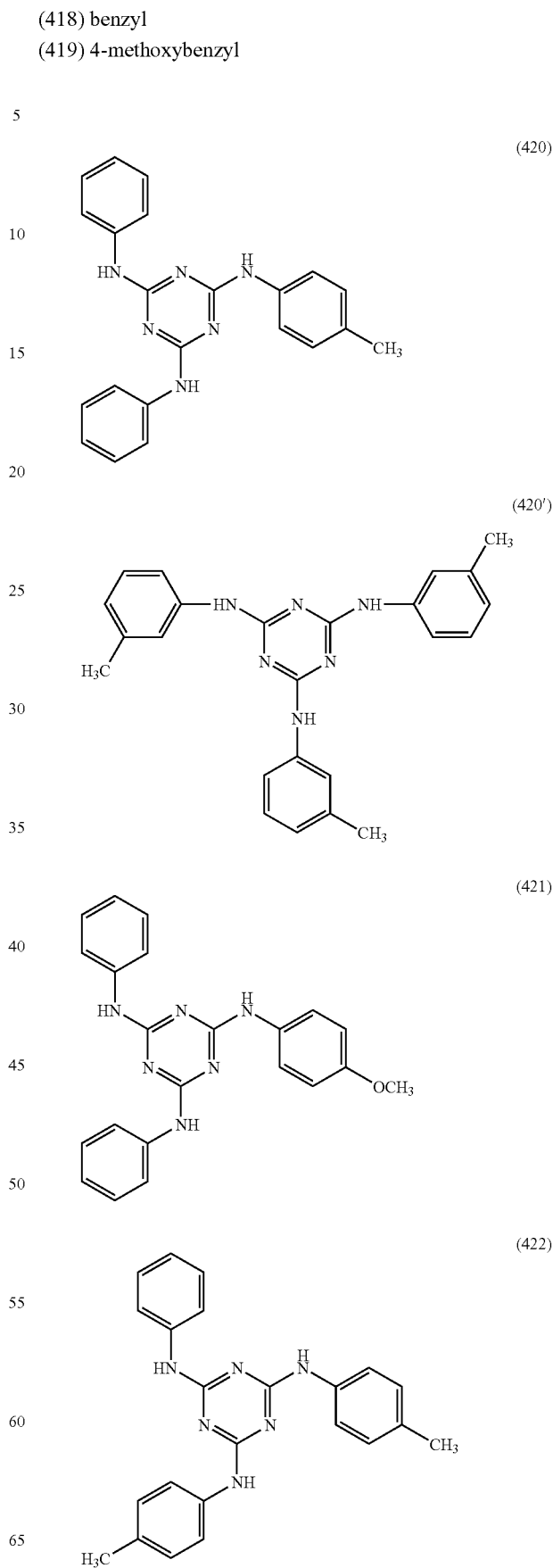

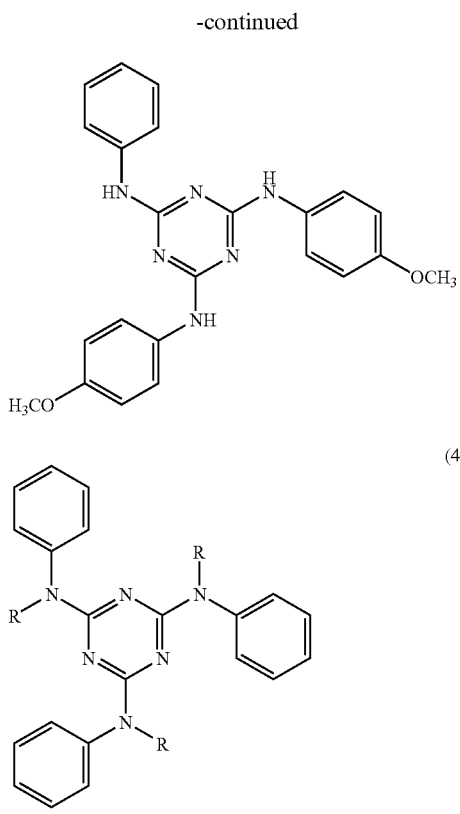
(423)
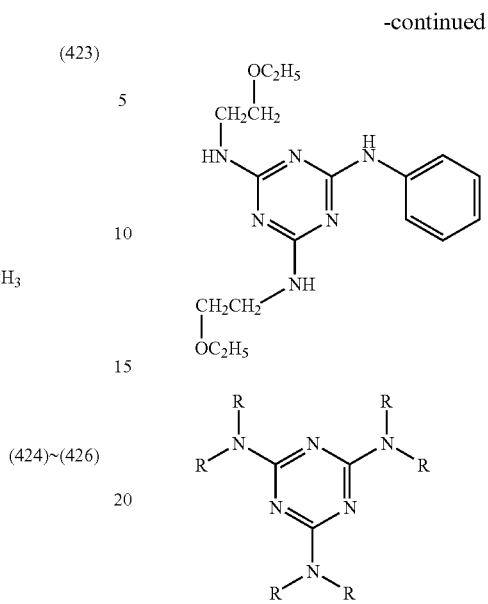
(429)
(424)~(426)
(424) methyl
(425) phenyl
(426) butyl
(430)~(437)
(430) methyl
(431) ethyl
(432) butyl
(433) octyl
(434) dodecyl
(435) 2-butoxy-2-ethoxyethyl
(436) benzyl
(437) 4-methoxybenzyl
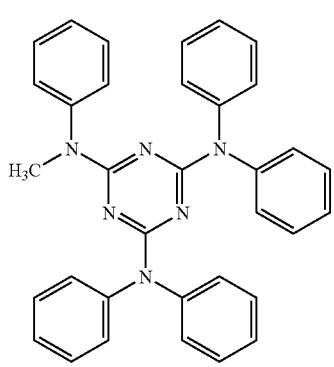
(427)
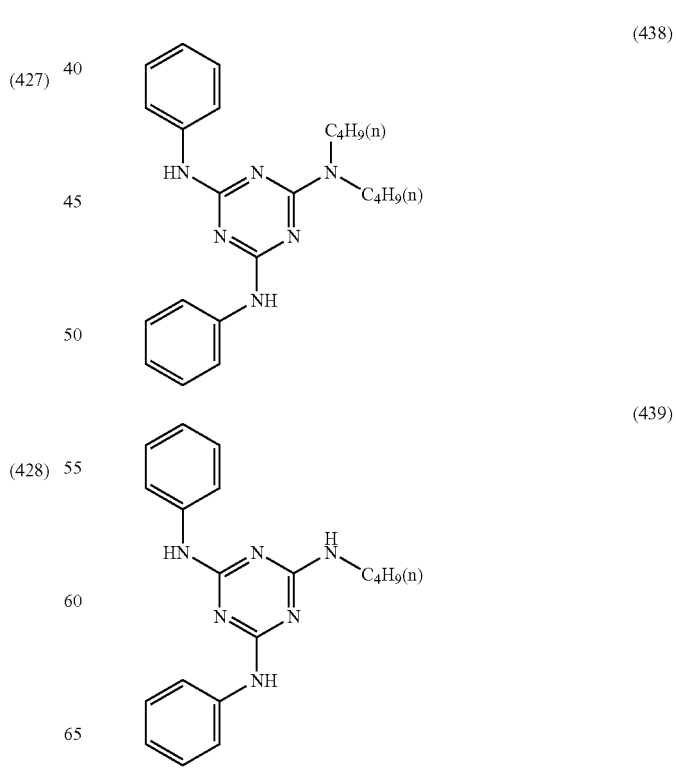
(438)
(439)
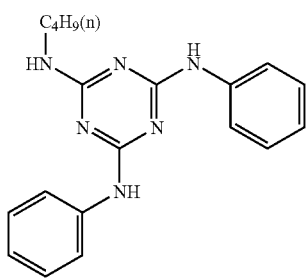
(428)

(440)

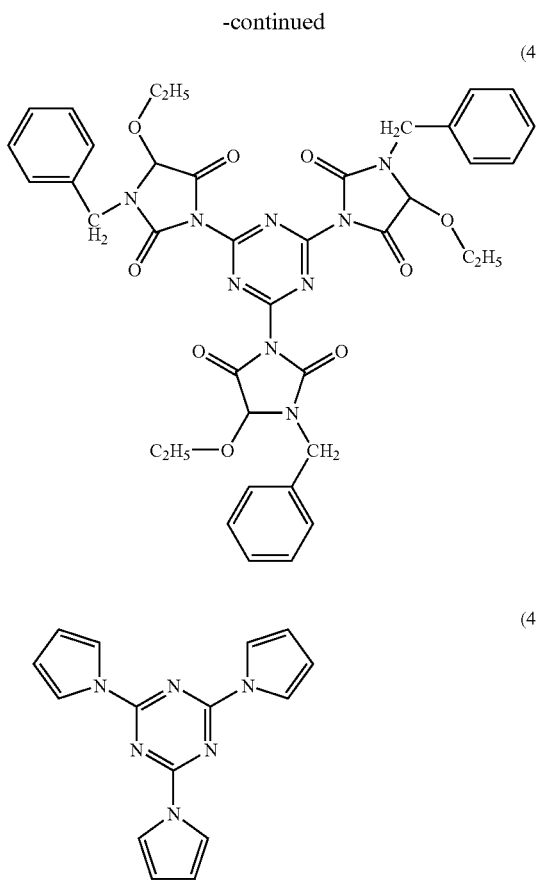

(441)

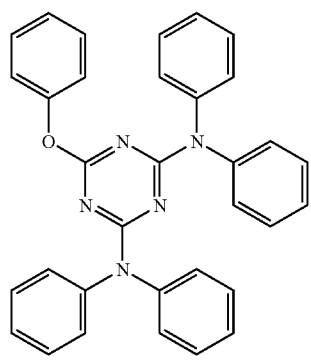

(442)

(443)

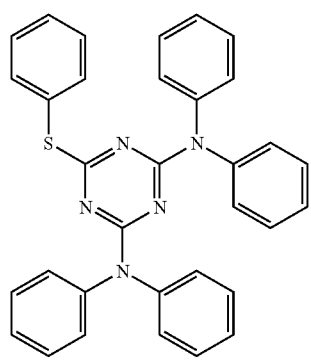

(444)

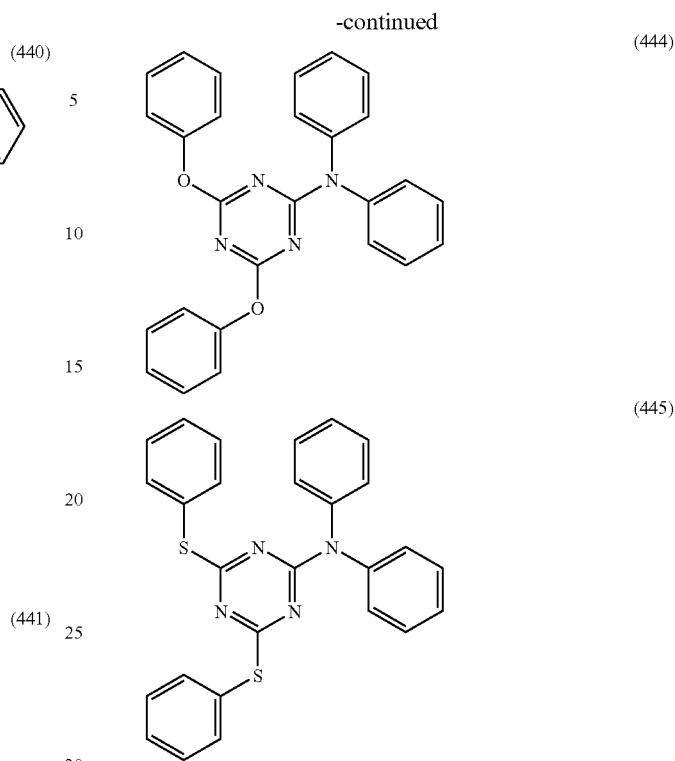

(445)

In the present invention, employed as a compound having a 1,3,5-triazine ring may be melamine polymers. It is preferable that the above melamine polymers are synthesized employing a polymerization reaction of the melamine compounds represented by Formula (10) below with carbonyl compounds.

Formula (10)

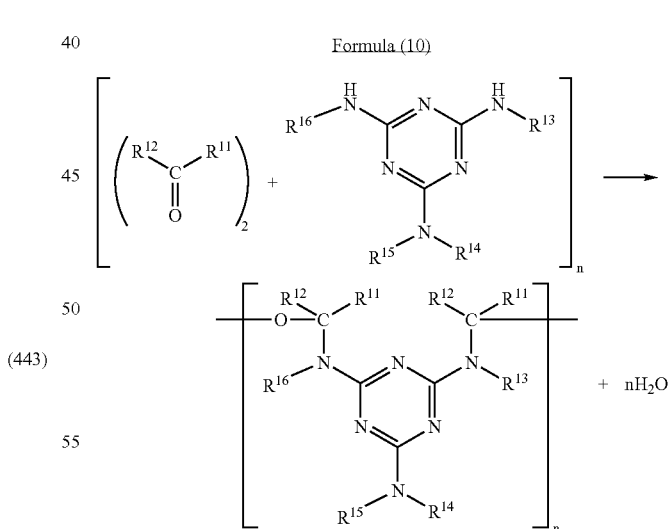

In the above synthesis reaction scheme, $R^{11}$, $R^{12}$, $R^{13}$, $R^{14}$, $R^{15}$, and $R^{16}$, each represent a hydrogen atom, an alkyl group, an alkenyl group, an aryl group or a heterocyclyl group.

The above alkyl group, alkenyl group, aryl group, and heterocyclyl group, as well as those substituents are as defined for each group and also the substituents described in above Formula (4).

The polymerization reaction of melamine compounds with carbonyl compounds is performed employing the same synthesis method as for common melamine resins (for example, a melamine-formaldehyde resin). Further, employed may be commercially available melamine polymers (being melamine resins).

The molecular weight of melamine polymers is preferably 2,000-400,000. Specific examples of repeating units of melamine polymers are shown below.

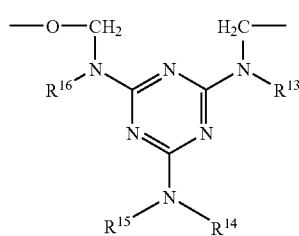

(MP-1)~(MP-50)

MP-1: $R^{13}, R^{14}, R^{15}, R^{16}$: $CH_2OH$
MP-2: $R^{13}, R^{14}, R^{15}, R^{16}$: $CH_2OCH_3$
MP-3: $R^{13}, R^{14}, R^{15}, R^{16}$: $CH_2O\text{-}i\text{-}C_4H_9$
MP-4: $R^{13}, R^{14}, R^{15}, R^{16}$: $CH_2O\text{-}n\text{-}C_4H_9$
MP-5: $R^{13}, R^{14}, R^{15}, R^{16}$: $CH_2NHCOCH=CH_2$
MP-6: $R^{13}, R^{14}, R^{15}, R^{16}$: $CH_2NHCO(CH_2)_7CH=CH(CH_2)_7CH_3$
MP-7: $R^{13}, R^{14}, R^{15}$: $CH_2OH$; $R^{16}$ $CH_2OCH_3$
MP-8: $R^{13}, R^{14}, R^{16}$: $CH_2OH$; $R^{15}$: $CH_2OCH_3$,
MP-9: $R^{13}, R^{14}$: $CH_2OH$; $R^{15}, R^{16}$: $CH_2OCH_3$
MP-10: $R^{13}, R^{16}$: $CH_2OH$; $R^{14}, R^{15}$: $CH_2OCH_3$
MP-11: $R^{13}$: $CH_2OH$; $R^{14}R^{15}, R^{16}$: $CH_2OCH_3$
MP-12: $R^{13}, R^{14}, R^{16}$: $CH_2OCH_3$; $R^{15}$: $CH_2OH$
MP-13: $R^{13}, R^{16}$: $CH_2OCH_3$; $R^{14}, R^{15}$: $CH_2OH$
MP-14: $R^{13}, R^{14}, R^{15}$: $CH_2OH$; $R^{16}$: $CH_2O\text{-}i\text{-}C_4H_9$
MP-15: $R^{13}, R^{14}, R^{16}$: $CH_2OCH_3$; $R^{15}$: $CH_2O\text{-}i\text{-}C_4H_9$
MP-16: $R^{13}, R^{14}$: $CH_2OH$; $R^{15}, R^{16}$: $CH_2O\text{-}i\text{-}C_4H_9$
MP-17: $R^{13}, R^{16}$: $CH_2OH$; $R^{14}, R^{15}$: $CH_2O\text{-}i\text{-}C_4H$
MP-18: $R^{13}$: $CH_2OH$; $R^{14}, R^{15}, R^{16}$: $CH_2O\text{-}i\text{-}C_4H_9$
MP-19: $R^{13}, R^{14}, R^{16}$: $CH_2O\text{-}i\text{-}C_4H_9$; $R^{15}$: $CH_2OH$
MP-20: $R^{13}, R^{16}$: $CH_2O\text{-}i\text{-}C_4H_9$; $R^{14}, R^{15}$: $CH_2OH$
MP-21: $R^{13}, R^{14}, R^{15}$: $CH_2OH$; $R^{16}$: $CH_2O\text{-}n\text{-}C_4H_9$
MP-22: $R^{13}, R^{14}, R^{16}$: $CH_2OH$; $R^{15}$: $CH_2O\text{-}n\text{-}C_4H_9$
MP-23: $R^{13}, R^{14}$: $CH_2OH$; $R^{15}, R^{16}$: $CH_2O\text{-}n\text{-}C_4H_9$
MP-24: $R^{13}, R^{16}$: $CH_2OH$; $R^{14}, R^{15}$: $CH_2O\text{-}n\text{-}C_4H_9$
MP-25: $R^{13}$: $CH_2OH$; $R^{14}R^{15}, R^{16}$: $CH_2O\text{-}n\text{-}C_4H_9$
MP-26: $R^{13}, R^{14}, R^{16}$: $CH_2O\text{-}n\text{-}C_4H_9$; $R^{15}$: $CH_2OH$
MP-27: $R^{13}, R^{16}$: $CH_2O\text{-}n\text{-}C_4H_9$; $R^{14}, R^{15}$: $CH_2OH$
MP-28: $R^{13}, R^{14}$: $CH_2OH$; $R^{15}$: $CH_2OCH_3$; $R^{16}$: $CH_2O\text{-}n\text{-}C_4H_9$
MP-29: $R^{13}, R^{14}$: $CH_2OH$; $R^{15}$: $CH_2\text{-}n\text{-}C_4H_9$; $CH_2OCH_3$
MP-30: $R^{13}, R^{16}$: $CH_2OH$; $R^{14}$: $CH_2OCH_3$; $R^{15}$: $CH_2O\text{-}n\text{-}C_4H_9$
MP-31: $R^{13}$: $CH_2OH$; $R^{14}, R^{15}$: $CH_2OCH_3$; $R^{16}$: $CH_2O\text{-}n\text{-}C_4H_9$
MP-32: $R^{13}$: $CH_2OH$; $R^{14}$: $CH_2OCH_3$; $R^{15}$: $CH_2O\text{-}n\text{-}C_4H_9$
MP-33: $R^{13}$: $CH_2OH$; $R^{14}$: $CH_2OCH_3$; $R^{15}, R^{16}$: $CH_2O\text{-}n\text{-}C_4H_9$
MP-34: $R^{13}$: $CH_2OH$; $R^{14}, R^{15}$: $CH_2O\text{-}n\text{-}C_4H_9$; $R^{16}$: $CH_2OCH_3$
MP-35: $R^{13}, R^{14}$: $CH_2OCH_3$; $R^{15}$: $CH_2OH$; $R^{16}$: $CH_2O\text{-}n\text{-}C_4H_9$
MP-36: $R^{13}, R^{16}$: $CH_2OCH_3$; $R^{14}$: $CH_2OH$; $R^{15}$: $CH_2O\text{-}n\text{-}C_4H_9$
MP-37: $R^{13}$: $CH_2OCH_3$; $R^{14}, R^{15}$: $CH_2OH$; $R^{16}$: $CH_2O\text{-}n\text{-}C_4H_9$
MP-38: $R^{13}, R^{16}$: $CH_2O\text{-}n\text{-}C_4H_9$; $R^{14}$: $CH_2OCH_3$; $R^{15}$: $CH_2OH$
MP-39: $R^{13}$: $CH_2OH$; $R^{14}$: $CH_2OCH_3$; $R^{15}$: $CH_2O\text{-}n\text{-}C_4H_9$; $R^{16}$: $CH_2NHCOCH=CH_2$
MP-40: $R^{13}$: $CH_2OH$; $R^{14}$: $CH_2OCH_3$; $R^{15}$: $CH_2NHCOCH=CH_2$; $R^{16}$: $CH_2O\text{-}n\text{-}C_4H_9$
MP-41: $R^{13}$: $CH_2OH$; $R^{14}$: $CH_2O\text{-}n\text{-}C_4H_9$; $R^{15}$: $CH_2NHCOCH=CH_2$; $R^{16}$: $CH_2OCH_3$
MP-42: $R^{13}$: $CH_2OCH_3$; $R^{14}$: $CH_2OH$; $R^{15}$: $CH_2O\text{-}n\text{-}C_4H_9$; $R^{16}$: $CH_2NHCOCH=CH_2$
MP-43: $R^{13}$: $CH_2OCH_3$; $R^{14}$: $CH_2OH$; $R^{15}$: $CH_2NHCOCH=CH_2$; $R^{16}$: $CH_2O\text{-}n\text{-}C_4H_9$
MP-44: $R^{13}$: $CH_2O\text{-}n\text{-}C_4H_9$; $R^{14}$: $CH_2OCH_3$; $R^{15}$: $CH_2OH$; $R^{16}$: $CH_2NHCOCH=CH_2$
MP-45: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-46: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-47: $R^{13}$: $CH_2OH$; $R^{14}$: $CH_2NHCO(CH_2)_7CH=CH(CH_2)_7CH_3$; $R^{15}$ $CH_2NHCOCH=CH_2$: $R^{16}$: $CH_2OCH_3$
MP-48: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-49: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-50: $R^{13}$: $CH_2NHCO(CH_2)_7CH=CH(CH_2)_7CH_3$; $R^{14}$: $CH_2OCH_3$; $R^{15}$ $CH_2OH$; $R^{16}$: $CH_2NHCOCH=CH_2$ (MP-51)~(MP-100)

MP-51: $R^{13}, R^{14}, R^{15}, R^{16}$: $CH_2OH$
MP-52: $R^{13}, R^{14}, R^{15}, R^{16}$: $CH_2OCH_3$
MP-53: $R^{13}, R^{14}, R^{15}, R^{16}$: $CH_2O\text{-}i\text{-}C_4H_9$
MP-54: $R^{13}, R^{14}, R^{15}, R^{16}$: $CH_2O\text{-}n\text{-}C_4H_9$
MP-55: $R^{13}, R^{14}, R^{15}, R^{16}$: $CH_2NHCOCH=CH_2$
MP-56: $R^{13}, R^{14}, R^{15}, R^{16}$: $CH_2NHCO(CH_2)_7CH=CH(CH_2)_7CH_3$
MP-57: $R^{13}, R^{14}, R^{15}$: $CH_2OH$; $R^{16}CH_2OCH_3$
MP-58: $R^{13}, R^{14}, R^{16}$: $CH_2OH$; $R^{15}$: $CH_2OCH_3$,
MP-59: $R^{13}, R^{14}$: $CH_2OH$; $R^{15}, R^{16}$: $CH_2OCH_3$
MP-60: $R^{13}, R^{16}$: $CH_2OH$; $R^{14}, R^{15}$: $CH_2OCH_3$
MP-61: $R^{13}$: $CH_2OH$; $R^{14}R^{15}, R^{16}$: $CH_2OCH_3$
MP-62: $R^{13}, R^{14}, R^{16}$: $CH_2OCH_3$; $R^{15}$: $CH_2OH$
MP-63: $R^{13}, R^{16}$: $CH_2OCH_3$; $R^{14}, R^{15}$: $CH_2OH$
MP-64: $R^{13}, R^{14}, R^{15}$: $CH_2OH$; $R^{16}$: $CH_2O\text{-}i\text{-}C_4H_9$
MP-65: $R^{13}, R^{14}, R^{16}$: $CH_2OCH_3$; $R^{15}$: $CH_2O\text{-}i\text{-}C_4H_9$
MP-66: $R^{13}, R^{14}$: $CH_2OH$; $R^{15}, R^{16}$: $CH_2O\text{-}i\text{-}C_4H_9$
MP-67: $R^{13}, R^{16}$: $CH_2OH$; $R^{14}, R^{15}$: $CH_2O\text{-}i\text{-}C_4H_9$
MP-68: $R^{13}$: $CH_2OH$; $R^{14}R^{15}, R^{16}$: $CH_2O\text{-}i\text{-}C_4H_9$ MP-69: $R^{13}$, $R^{14}$, $R^{16}$: $CH_2$-i-$C_4H_9$; $R^{15}$: $CH_2OH$
MP-70: $R^{13}$, $R^{16}$: $CH_2$O-i-$C_4H_9$; $R^{14}$, $R^{15}$: $CH_2OH$
MP-71: $R^{13}$, $R^{14}$, $R^{15}$: $CH_2OH$; $R^{16}$: $CH_2$O-n-$C_4H_9$
MP-72: $R^{13}$, $R^{14}$, $R^{16}$: $CH_2OH$; $R^{15}$: $CH_2$O-n-$C_4H_9$
MP-73: $R^{13}$, $R^{14}$: $CH_2OH$; $R^{15}$, $R^{16}$: $CH_2$O-n-$C_4H_9$
MP-74: $R^{13}$, $R^{16}$: $CH_2OH$; $R^{14}$, $R^{15}$: $CH_2$O-n-$C_4H_9$
MP-75: $R^{13}$: $CH_2OH$; $R^{14}$, $R^{15}$, $R^{16}$: $CH_2$O-n-$C_4H_9$
MP-76: $R^{13}$, $R^{14}$, $R^{16}$: $CH_2$O-n-$C_4H_9$; $R^{15}$: $CH_2OH$
MP-77: $R^{13}$, $R^{16}$: $CH_2$O-n-$C_4H_9$; $R^{14}$, $R^{15}$: $CH_2OH$
MP-78: $R^{13}$, $R^{14}$: $CH_2OH$; $R^{15}$: $CH_2OCH_3$; $R^{16}$: $CH_2$O-n-$C_4H_9$
MP-79: $R^{13}$, $R^{14}$: $CH_2OH$; $R^{15}$: $CH_2$-n-$C_4H_9$; $R^{16}$: $CH_2OCH_3$
MP-80: $R^{13}$, $R^{16}$: $CH_2OH$; $R^{14}$: $CH_2OCH_3$; $R^{15}$: $CH_2$O-n-$C_4H_9$
MP-81: $R^{13}$: $CH_2OH$; $R^{14}$, $R^{15}$: $CH_2OCH_3$; $R^{16}$: $CH_2$O-n-$C_4H_9$
MP-32: $R^{13}$: $CH_2OH$; $R^{14}$, $R^{15}$: $CH_2OCH_3$; $R^{16}$: $CH_2$O-n-$C_4H_9$
MP-83: $R^{13}$: $CH_2OH$; $R^{14}$: $CH_2OCH_3$; $R^{15}$: $CH_2$O-n-$C_4H_9$
MP-84: $R^{13}$: $CH_2OH$; $R^{14}$, $R^{15}$: $CH_2$O-n-$C_4H_9$; $R^{16}$: $CH_2OCH_3$
MP-85: $R^{13}$, $R^{14}$: $CH_2OCH_3$; $R^{15}$: $CH_2OH$; $R^{16}$: $CH_2$O-n-$C_4H_9$
MP-86: $R^{13}$, $R^{16}$: $CH_2OCH_3$; $R^{14}$: $CH_2OH$; $R^{15}$: $CH_2$O-n-$C_4H_9$
MP-87: $R^{13}$: $CH_2OCH_3$; $R^{14}$, $R^{15}$: $CH_2OH$; $R^{16}$: $CH_2$O-n-$C_4H_9$
MP-88: $R^{13}$, $R^{16}$: $CH_2$O-n-$C_4H_9$; $R^{14}$: $CH_2OCH_3$; $R^{15}$: $CH_2OH$
MP-89: $R^{13}$: $CH_2OH$; $R^{14}$: $CH_2OCH_3$; $R^{15}$: $CH_2$O-n-$C_4H_9$; $R^{16}$: $CH_2NHCOHCH=CH_2$
MP-90: $R^{13}$: $CH_2OH$; $R^{14}$: $CH_2OCH_3$; $R^{15}$: $CH_2NHCOCH=CH_2$; $R^{16}$ $CH_2$O-n-$C_4H_9$
MP-91: $R^{13}$: $CH_2OH$; $R^{14}$: $CH_2$O-n-$C_4H_9$; $R^{15}$: $CH_2NHCOCH=CH_2$; $R^{16}$: $CH_2OCH_3$
MP-92: $R^{13}$: $CH_2OCH_3$; $R^{14}$: $CH_2OH$; $R^{15}$: $CH_2$O-n-$C_4H_9$; $R^{16}$: $CH_2NHCOCH=CH_2$
MP-93: $R^{13}$: $CH_2OCH_3$; $R^{14}$: $CH_2OH$; $R^{15}$: $CH_2NHCOCH=CH_2$; $R^{16}$: $CH_2$O-n-$C_4H_9$
MP-94: $R^{13}$: $CH_2$O-n-$C_4H_9$; $R^{14}$: $CH_2OCH_3$; $R^{15}$: $CH_2OH$; $R^{16}$: $CH_2NHCOCH=CH_2$
MP-95: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-96: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-97: $R^{13}$: $CH_2OH$; $R^{14}$: $CH_2NHCO(CH_2)_7CH=CH(CH_2)_7CH_3$; $R^{15}$ $CH_2NHCOCH=CH_2$: $R^{16}$: $CH_2OCH_3$
MP-98: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-99: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-100: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$ (MP-101)~(MP-150)

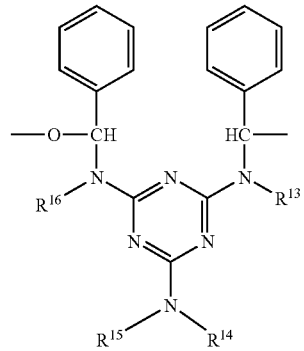

MP-101: $R^{13}$, $R^{14}$, $R^{15}$, $R^{16}$: $CH_2OH$
MP-102: $R^{13}$, $R^{14}$, $R^{15}$, $R^{16}$: $CH_2OCH_3$
MP-103: $R^{13}$, $R^{14}$, $R^{15}$, $R^{16}$: $CH_2$O-i-$C_4H_9$
MP-104: $R^{13}$, $R^{14}$, $R^{15}$, $R^{16}$: $CH_2$O-n-$C_4H_9$
MP-105: $R^{13}$, $R^{14}$, $R^{15}$, $R^{16}$: $CH_2NHCOCH=CH_2$
MP-106: $R^{13}$, $R^{14}$, $R^{15}$, $R^{16}$: $CH_2NHCO(CH_2)_7CH=CH(CH_2)_7CH_3$
MP-107: $R^{13}$, $R^{14}$, $R^{15}$: $CH_2OH$; $R^{16}$: $CH_2OCH_3$
MP-108: $R^{13}$, $R^{14}$, $R^{16}$: $CH_2OH$; $R^{15}$: $CH_2OCH_3$,
MP-109: $R^{13}$, $R^{14}$: $CH_2OH$; $R^{15}$, $R^{16}$: $CH_2OCH_3$
MP-110: $R^{13}$, $R^{16}$: $CH_2OH$; $R^{14}$, $R^{15}$: $CH_2OCH_3$
MP-111: $R^{13}$: $CH_2OH$; $R^{14}$ $R^{15}$, $R^{16}$: $CH_2OCH_3$
MP-112: $R^{13}$, $R^{14}$, $R^{16}$: $CH_2OCH_3$; $R^{15}$: $CH_2OH$
MP-113: $R^{13}$, $R^{16}$: $CH_2OCH_3$; $R^{14}$, $R^{15}$: $CH_2OH$
MP-114: $R^{13}$, $R^{14}$, $R^{15}$: $CH_2OH$; $R^{16}$: $CH_2$O-i-$C_4H_9$
MP-115: $R^{13}$, $R^{14}$, $R^{16}$: $CH_2OH$; $R^{15}$: $CH_2$O-i-$C_4H_9$
MP-116: $R^{13}$, $R^{14}$: $CH_2OH$; $R^{15}$, $R^{16}$: $CH_2$O-i-$C_4H_9$
MP-117: $R^{13}$, $R^{16}$: $CH_2OH$; $R^{14}$, $R^{15}$: $CH_2$O-i-$C_4H_9$
MP-118: $R^{13}$: $CH_2OH$; $R^{14}$ $R^{15}$, $R^{16}$: $CH_2$O-i-$C_4H_9$
MP-119: $R^{13}$, $R^{14}$, $R^{16}$: $CH_2$O-i-$C_4H_9$; $R^{15}$: $CH_2OH$
MP-120: $R^{13}$, $R^{16}$: $CH_2$O-i-$C_4H_9$; $R^{14}$, $R^{15}$: $CH_2OH$
MP-121: $R^{13}$, $R^{14}$, $R^{15}$: $CH_2OH$; $R^{16}$: $CH_2$O-n-$C_4H_9$
MP-122: $R^{13}$, $R^{14}$, $R^{16}$: $CH_2OH$; $R^{15}$: $CH_2$O-n-$C_4H_9$
MP-123: $R^{13}$, $R^{14}$: $CH_2OH$; $R^{15}$, $R^{16}$: $CH_2$O-n-$C_4H_9$
MP-124: $R^{13}$, $R^{16}$: $CH_2OH$; $R^{14}$, $R^{15}$: $CH_2$O-n-$C_4H_9$
MP-125: $R^{13}$: $CH_2OH$; $R^{14}$ $R^{15}$, $R^{16}$: $CH_2$O-n-$C_4H_9$
MP-126: $R^{13}$, $R^{14}$, $R^{16}$: $CH_2$O-n-$C_4H_9$; $R^{15}$: $CH_2OH$
MP-127: $R^{13}$, $R^{16}$: $CH_2$O-n-$C_4H_9$; $R^{14}$, $R^{15}$: $CH_2OH$
MP-128: $R^{13}$, $R^{14}$: $CH_2OH$; $R^{15}$: $CH_2OCH_3$; $R^{16}$: $CH_2$O-n-$C_4H_9$
MP-129: $R^{13}$, $R^{14}$: $CH_2OH$; $R^{15}$: $CH_2$-n-$C_4H_9$; $R^{16}$: $CH_2OCH_3$
MP-130: $R^{13}$, $R^{16}$: $CH_2OH$; $R^{14}$: $CH_2OCH_3$; $R^{15}$: $CH_2$O-n-$C_4H_9$
MP-131: $R^{13}$: $CH_2OH$; $R^{14}$, $R^{15}$: $CH_2OCH_3$; $R^{16}$: $CH_2$O-n-$C_4H_9$
MP-132: $R^{13}$: $CH_2OH$; $R^{14}$, $R^{16}$: $CH_2OCH_3$; $R^{15}$: $CH_2$O-n-$C_4H_9$
MP-133: $R^{13}$: $CH_2OH$; $R^{14}$: $CH_2OCH_3$; $R^{15}$, $R^{16}$: $CH_2$O-n-$C_4H_9$
MP-134: $R^{13}$: $CH_2OH$; $R^{14}$, $R^{15}$: $CH_2$O-n-$C_4H_9$; $R^{16}$: $CH_2OCH_3$
MP-135: $R^{13}$, $R^{14}$: $CH_2OCH_3$; $R^{15}$: $CH_2OH$; $R^{16}$: $CH_2$O-n-$C_4H_9$
MP-136: $R^{13}$, $R^{16}$: $CH_2OCH_3$; $R^{14}$: $CH_2OH$; $R^{15}$ $CH_2$O-n-$C_4H_9$
MP-137: $R^{13}$: $CH_2OCH_3$; $R^{14}$, $R^{15}$: $CH_2OH$; $R^{16}$: $CH_2$O-n-$C_4H_9$

MP-138: $R^{13}$, $R^{16}$: $CH_2O$-n-$C_4H_9$; $R^{14}$: $CH_2OCH_3$; $R^{15}$: $CH_2OH$
MP-139: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-140: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-141: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-142: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-143: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-144: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-145: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-146: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-147: $R^{13}$: $CH_2OH$; $R^{14}$: $CH_2NHCO(CH_2)_7CH=CH(CH_2)_7CH_3$; $R^{15}$ $CH_2NHCOCH=CH_2$: $R^{16}$: $CH_2OCH_3$
MP-148: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-149: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-150: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

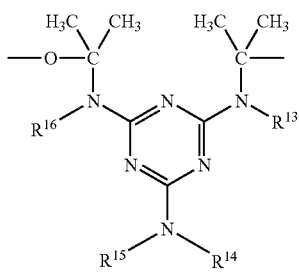

(MP-151)~(MP-200)

MP-151: $R^{13}$, $R^{14}$, $R^{15}$, $R^{16}$: $CH_2OH$
MP-152: $R^{13}$, $R^{14}$, $R^{15}$, $R^{16}$: $CH_2OCH_3$
MP-153: $R^{13}$, $R^{14}$, $R^{15}$, $R^{16}$: $CH_2O$-i-$C_4H_9$
MP-154: $R^{13}$, $R^{14}$, $R^{15}$, $R^{16}$: $CH_2O$-n-$C_4H_9$
MP-155: $R^{13}$, $R^{14}$, $R^{15}$, $R^{16}$: $CH_2NHCOCH=CH_2$
MP-156: $R^{13}$, $R^{14}$, $R^{15}$, $R^{16}$: $CH_2NHCO(CH_2)_7CH=CH(CH_2)_7CH_3$
MP-157: $R^{13}$, $R^{14}$, $R^{15}$: $CH_2OH$; $R^{16}$ $CH_2OCH_3$
MP-158: $R^{13}$, $R^{14}$, $R^{16}$: $CH_2OH$; $R^{15}$: $CH_2OCH_3$,
MP-159: $R^{13}$, $R^{14}$: $CH_2OH$; $R^{15}$, $R^{16}$: $CH_2OCH_3$
MP-160: $R^{13}$, $R^{16}$: $CH_2OH$; $R^{14}$, $R^{15}$: $CH_2OCH_3$
MP-161: $R^{13}$: $CH_2OH$; $R^{14}$$R^{15}$, $R^{16}$: $CH_2OCH_3$
MP-162: $R^{13}$, $R^{14}$, $R^{16}$: $CH_2OCH_3$; $R^{15}$: $CH_2OH$
MP-163: $R^{13}$, $R^{16}$: $CH_2OCH_3$; $R^{14}$, $R^{15}$: $CH_2OH$
MP-164: $R^{13}$, $R^{14}$, $R^{15}$: $CH_2OH$; $R^{16}$: $CH_2O$-i-$C_4H_9$
MP-165: $R^{13}$, $R^{14}$, $R^{16}$: $CH_2OH$; $R^{15}$: $CH_2O$-i-$C_4H_9$
MP-166: $R^{13}$, $R^{14}$: $CH_2OH$; $R^{15}$, $R^{16}$: $CH_2O$-i-$C_4H_9$
MP-167: $R^{13}$, $R^{16}$: $CH_2OH$; $R^{14}$, $R^{15}$: $CH_2O$-i-$C_4H_9$
MP-168: $R^{13}$: $CH_2OH$; $R^{14}$$R^{15}$, $R^{16}$: $CH_2O$-i-$C_4H_9$
MP-169: $R^{13}$, $R^{14}$, $R^{16}$: $CH_2O$-i-$C_4H_9$; $R^{15}$: $CH_2OH$
MP-170: $R^{13}$, $R^{16}$: $CH_2O$-i-$C_4H_9$; $R^{14}$, $R^{15}$: $CH_2OH$
MP-171: $R^{13}$, $R^{14}$, $R^{15}$: $CH_2OH$; $R^{16}$: $CH_2O$-n-$C_4H_9$
MP-172: $R^{13}$, $R^{14}$, $R^{16}$: $CH_2OH$; $R^{15}$: $CH_2O$-n-$C_4H_9$
MP-173: $R^{13}$, $R^{14}$: $CH_2OH$; $R^{15}$, $R^{16}$: $CH_2O$-n-$C_4H_9$
MP-174: $R^{13}$, $R^{16}$: $CH_2OH$; $R^{14}$, $R^{15}$: $CH_2O$-n-$C_4H_9$
MP-175: $R^{13}$: $CH_2OH$; $R^{14}$$R^{15}$, $R^{16}$: $CH_2$-n-$C_4H_9$
MP-126: $R^{13}$, $R^{14}$, $R^{16}$: $CH_2O$-n-$C_4H_9$; $R^{15}$: $CH_2OH$
MP-177: $R^{13}$, $R^{16}$: $CH_2O$-n-$C_4H_9$; $R^{14}$, $R^{15}$: $CH_2OH$
MP-178: $R^{13}$, $R^{14}$: $CH_2OH$; $R^{15}$: $CH_2OCH_3$; $R^{16}$: $CH_2O$-n-$C_4H_9$
MP-179: $R^{13}$, $R^{14}$: $CH_2OH$; $R^{15}$: $CH_2$-n-$C_4H_9$; $R^{16}$: $CH_2OCH_3$
MP-180: $R^{13}$, $R^{16}$: $CH_2OH$; $R^{14}$, $R^{15}$: $CH_2OCH_3$; $R^{15}$: $CH_2O$-n-$C_4H_9$
MP-181: $R^{13}$: $CH_2OH$; $R^{14}$, $R^{15}$: $CH_2OCH_3$; $R^{16}$: $CH_2O$-n-$C_4H_9$
MP-182: $R^{13}$: $CH_2OH$; $R^{14}$, $R^{16}$: $CH_2OCH_3$; $R^{15}$: $CH_2O$-n-$C_4H_9$
MP-183: $R^{13}$: $CH_2OH$; $R^{14}$: $CH_2OCH_3$; $R^{15}$, $R^{16}$: $CH_2O$-n-$C_4H_9$
MP-184: $R^{13}$: $CH_2OH$; $R^{14}$, $R^{15}$: $CH_2O$-n-$C_4H_9$; $R^{16}$: $CH_2OCH_3$
MP-185: $R^{13}$, $R^{14}$: $CH_2OCH_3$; $R^{15}$: $CH_2OH$; $R^{16}$: $CH_2O$-n-$C_4H_9$
MP-186: $R^{13}$, $R^{16}$: $CH_2OCH_3$; $R^{14}$: $CH_2OH$; $R^{15}$: $CH_2O$-n-$C_4H_9$
MP-187: $R^{13}$: $CH_2OCH_3$; $R^{14}$, $R^{15}$: $CH_2OH$; $R^{16}$: $CH_2O$-n-$C_4H_9$
MP-188: $R^{13}$, $R^{16}$: $CH_2O$-n-$C_4H_9$; $R^{14}$: $CH_2OCH_3$; $R^{15}$: $CH_2OH$
MP-189: $R^{13}$: $CH_2OH$; $R^{14}$: $CH_2OCH_3$; $R^{15}$: $CH_2O$-n-$C_4H_9$; $R^{16}$: $CH_2NHCOCH=CH_2$
MP-190: $R^{13}$: $CH_2OH$; $R^{14}$: $CH_2OCH_3$; $R^{15}$: $CH_2NHCOCH=CH_2$; $R^{16}$ $CH_2O$-n-$C_4H_9$
MP-191: $R^{13}$: $CH_2OH$; $R^{14}$: $CH_2O$-n-$C_4H_9$; $R^{15}$: $CH_2NHCOCH=CH_2$; $R^{16}$: $CH_2OCH_3$
MP-192: $R^{13}$: $CH_2OCH_3$; $R^{14}$: $CH_2OH$; $R^{15}$: $CH_2O$-n-$C_4H_9$; $R^{16}$: $CH_2NHCOCH=CH_2$
MP-193: $R^{13}$: $CH_2OCH_3$; $R^{14}$: $CH_2OH$; $R^{15}$: $CH_2NHCOCH=CH_2$; $R^{16}$: $CH_2O$-n-$C_4H_9$
MP-194: $R^{13}$: $CH_2O$-n-$C_4H_9$; $R^{14}$: $CH_2OCH_3$; $R^{15}$: $CH_2OH$; $R^{16}$: $CH_2NHCOCH=CH_2$
MP-195: $R^{13}$: $CH_2OH$; $R^{14}$: $CH_2OCH_3$; $R^{15}$: $CH_2NHCO(CH_2)_7CH=CH(CH_2)_7CH_3$; $R^{16}$: $CH_2NHCOCH=CH_2$
MP-196: $R^{13}$: $CH_2OH$; $R^{14}$: $CH_2OCH_3$; $R^{15}$: $CH_2NHCO=CH_2$; $R_{16}$: $CH_2NHCO(CH_2)_7CH=CH(CH_2)_7CH_3$
MP-197: $R^{13}$: $CH_2OH$; $R^{14}$: $CH_2NHCO(CH_2)_7CH=CH(CH_2)_7CH_3$; $R^{15}$ $CH_2NHCOCH=CH_2$: $R^{16}$: $CH_2OCH_3$
MP-198: $R^{13}$: $CH_2OCH_3$; $R^{14}$: $CH_2OH$; $R^{15}$: $CH_2NHCO(CH_2)_7CH=CH(CH_2)_7CH_3$; $R^{16}$: $CH_2NHCOCH=CH_2$
MP-199: $R^{13}$: $CH_2OCH_3$; $R^{14}$: $CH_2OH$; $R^{15}$: $CH_2NHCOCH=CH_2$; $R^{16}$: $CH_2NHCO(CH_2)_7CH=CH(CH_2)_7CH_3$
MP-200: $R^{13}$: $CH_2NHCO(CH_2)_7CH=CH(CH_2)_7CH_3$; $R^{14}$: $CH_2OCH_3$; $R^{15}$: $CH_2OH$; $R^{16}$: $CH_2NHCOCH=CH_2$

In the present invention, employed may be copolymers in which at least two types of the above repeating units are combined. Also, two or more homopolymers or two or more copolymers may be used.

Further, utilized in combination may be at least two types of compounds having a 1,3,5-triazine ring. At least two types of disk form compounds (for example, a compound having 1,3,5-triazine ring and a compound having a porphyrin moiety) may be utilized in combination.

These additives are preferably contained at 0.2-30 weight % and specifically preferably at 1-20 weight % against optical film.

(Manufacturing Method of Retardation Film of Invention)

Next, a manufacturing method of retardation film of the present invention will be detailed.

Retardation film of the present invention is characterized in that a slow axis in the film plane along the width direction of long roll film is provided, and elastic modulus of the slow axis in the film plane $\epsilon_s$ and elastic modulus of the direction perpendicular to the aforesaid slow axis (the direction perpendicular to $\epsilon_s$) $\epsilon_p$ satisfy the relationship of following Condition (1).

$$1.26 \leq \epsilon_s/\epsilon_p \leq 2.60 \qquad \text{Condition (1)}$$

Further, in retardation film of the present invention, the aforesaid elastic modulus, $\epsilon_s$ and $\epsilon_p$, preferably satisfy the relationship of following Conditions (2) and (3).

$$700 \leq \epsilon_s - \epsilon_p \leq 2,450 \qquad \text{Condition (2)}$$

$$100 \leq (\epsilon_s + \epsilon_p) \times d \leq 500 \qquad \text{Condition (3)}$$

(wherein, $\epsilon$: [MPa], d: [mm])

An effect of front contrast improvement of the present invention is insufficient when the value of Condition (1) is less than 1.26, while the balance of a elastic modulus of the slow axis in the film plane and a elastic modulus of the direction perpendicular to the aforesaid slow axis will be broken to easily cause a break defect when it is over 2.60. Therefore to balance a elastic modulus of the slow axis in the film plane and a elastic modulus of the direction perpendicular to the aforesaid slow axis, it is preferable that the relationship of and difference between the both elastic modulus preferably satisfy the range of Conditions (2) and (3). Further, this range is specifically preferable to significantly improve front contrast.

This is considered that such as generation of micro-crystals (or crystallization) of polymer itself and of additives, generation of micro-voids and micro phase separation of polymer and additives can be restrained by rapidly orientating polymer which constitutes film, whereby unnecessary light leak is depressed.

Further, to increase front contrast, which is an object of the present invention, it has been proved that important is to decrease distortion of polymer constituting film, which is arranged between polarizer film and a liquid crystal cell, as much as possible. As described before, in stretched film, it is necessary to eliminate causes to generate light leak as much as possible by rapidly orientating polymer constituting the film, however, film thickness is also important due to the same reason with respect to front contrast, and the thickness of retardation film of the present invention is preferably not more than 100 μm. In the case of increased film thickness, factors to generate the aforesaid light leak will increase as much the thickness increases, in addition to this, light leak is liable to be caused by increased film thickness when the thickness becomes over 100 μm. The film thickness is more preferably not more than 80 μm.

Further, retardation film of the present invention exhibits retardation effect by applying force to film (specifically, by such as stretching, shrinking and sliding), however, as described before, the smaller is distortion due to stretching, the better. Therefore, needless to say, the smaller is dimension change in a durability test (particularly in a humidity and heat resistance test, such as at 80° C./90% RH and at 85° C./85% RH), the better (both elongation and shrinkage).

In addition to satisfying the aforesaid factors, retardation film of the present invention preferably satisfies an essential factor of Condition (3). When a manufacturing method to provide film with distortion is applied, causes for light leak will be generated.

Since distortion of film causes a change of the form such as shrinkage or elongation to cancel said distortion, distortion of film can be expressed by a product of an amount of dimension change, a layer thickness and a elastic modulus, under a suitable condition. The condition of dimension change concerning distortion differs depending on the film composition, however, a product of a elastic modulus at 23° C./55% RH and a layer thickness being in the aforesaid range is required to satisfy conditions as polarizing plate protective film as well as to minimize film distortion and to improve contrast.

An ability to restrain shrinkage of polarizer film as polarizing plate protective film is insufficient when the value of Condition (3) is not more than 100, while distortion of retardation film itself becomes large resulting in contrast decrease when it is over 500. Taking the balance also in considering, it is not less than 200 and not more than 400.

Manufacturing of retardation film of the present invention is performed by a process to prepare a dope by dissolving cellulose ester and additives such as the aforesaid plastisizer into a solvent, a process to cast the dope on a metal support of a belt form or a drum form, a process to dry the cast dope as a web, a process to peel off the web from the metal support, a process to further dry the web, a process to further heat treat the prepared film and a process to wind the film after cooling. 70-95 weight % of cellulose ester is preferably contained in the solid content of retardation film of the present invention.

The dope preparation process will now be explained. In the dope preparation process, a higher content of cellulose ester in the dope is preferable since duration of the drying process following the casting process is shortened, however, a too high content may result in loss of filtration accuracy. Preferable content of cellulose ester is from 10-35% by weight and more preferably from 15-25% by weight.

A solvent may be used alone, however, two or more solvents may also be used together. A mixture of a good solvent and a poor solvent is more preferably used to increase manufacturing efficiency. A mixed solvent being rich in a good solvent is preferable to increase solubility of cellulose ester. The preferable mixing ratios are from 70 to 98 percent by weight of a good solvent, and from 2 to 30 percent of a poor solvent. Herein, a good solvent is described as being capable of dissolving cellulose ester with a single use, and a poor solvent as being incapable of dissolving nor swelling cellulose ester alone. Sometimes, a solvent works as a good solvent of a cellulose ester, and sometimes as a poor solvent depending on the average acylation degree (degree of acyl substitution) of the cellulose ester. For example, acetone is a good solvent for an acetic ester of cellulose of which the acetylation degree is 2.4, as well as for cellulose acetatepropionate, however, it is a poor solvent for cellulose acetate of which acetylation degree is 2.8.

Example of good solvents used in the present invention include: an organic halide (such as methylene chloride), dioxolane, acetone, methyl acetate and methyl acetoacetate. Of these, methylene chloride and methyl acetate are specifically preferable. However, the present invention is not specifically limited thereto.

Examples of poor solvents used in the present invention include: methanol, ethanol, n-butanol, cyclohexane and cyclohexanone, however, the present invention is not specifically limited thereto. A dope may preferably contain from 0.01 to 2 percent by weight of water.

In the process of preparing a dope, cellulose ester is dissolved using a common method. Dissolving cellulose ester at a higher temperature is possible when the heating is carried out under a higher pressure. Formation of a gel or an insoluble agglomerate (known as "Mamako" in Japanese which represents insoluble residue when powder is dissolved in a solvent) may be avoided when the dissolving temperature is higher than the ambient pressure boiling point of the mixed solvents, and simultaneously the temperature is in the range where the mixed solvents do not boil under the applied higher pressure. The following dissolving method is also preferable, in which cellulose ester is swollen by mixing with a poor solvents followed by adding good solvents to dissolve the swollen cellulose ester.

Pressure may be applied by injecting an inert gas such as nitrogen or by increasing the vapor pressure of the solvents by heating. Heating is preferably carried out from the outside of the container. A jacket type heater is preferable because the temperature is easily controlled.

A higher dissolving temperature is preferable with respect to the solubility of the cellulose ester, however, too high a temperature may lower the productivity because the pressure also becomes very high. The dissolving temperature is preferably 45-120° C., more preferably 60-110° C. and still more preferably 70-105° C. The pressure should be controlled not to allow boiling at the set temperature.

A low temperature dissolution method is also preferably utilized, by which cellulose ester is successfully dissolved in solvents such as methyl acetate.

In the next process, the cellulose ester solution thus prepared is filtered using an appropriate filter material. A filter material with a smaller absolute filtration accuracy is more preferable for removing insoluble materials, however, too small a filtration accuracy easily cause clogging up of the filter. The absolute filtration accuracy of the filter is preferably not larger than 0.008 mm, more preferably 0.001-0.008 mm and still more preferably 0.003-0.006 mm.

The filter material used in the present invention is not specifically limited, and plastic filters (such as polypropylene and Teflon®) as well as metal(alloy) filters (such as stainless steel) are preferable, since these materials are free from peeling of a fiber, which may occur when fibrous material is used. Impurities and, specifically, luminescent foreign materials contained in the cellulose ester are preferably diminished or entirely removed by filtering.

"Luminescent foreign materials" denote impurities which are observed as bright spots when a cellulose ester film is placed between two polarizing plates arranged in a crossed Nicols state, illuminated with a light from one side and observed from the other side. The number of luminescent foreign materials of larger than 0.01 mm in diameter is preferably not more than 200 per $cm^2$, more preferably not more than 100 per $cm^2$, still more preferably not more than 50 per $cm^2$ and further more preferably from 0 to 10 per $cm^2$. The number of luminescent foreign materials of not more than 0.01 mm in diameter is preferably minimal.

The dope may be filtered by any common method. One of these preferable filtering methods is to filter the dope at temperatures which are higher than the ambient pressure boiling point of the solvent, and simultaneously in the range where the solvent does not boil under the higher pressure. This method is preferable because the pressure difference between before and after filtering is reduced. The filtering temperature is preferably from 45 to 120° C., more preferably from 45 to 70° C. and still more preferably from 45 to 55° C.

The pressure applied during filtering is preferably low, being preferably not more than 1.6 MPa, more preferably not more than 1.2 MPa and still more preferably not more than 1.0 MPa.

Casting of a dope will be explained below:

A metal support polished to a mirror finished surface is used in the casting process. A polished stainless steel belt or a plated cast drum is used as a metal support. The width of the support is preferably from 1 to 4 m. The surface temperature of the metal support is preferably from −50° C. to a temperature just below the boiling point of the solvent. A relatively high temperature of the support is more preferable because the web is more quickly dried, however, too high a temperature may cause foaming or loss of flatness of the web. The temperature of the support is appropriately determined in the range of 0-100° C., however, preferably 5-30° C. Another preferable method is that a web is gelated by cooling the drum followed by peeling the web from the drum while the web still contains much solvent. The method to control the temperature of the support is not specifically limited and a method of blowing warm or cool air onto the support or to apply warm water on the rear side of the support is acceptable. The warm water method is more preferable because the temperature of the metal support becomes stable in a shorter time due to more efficient thermal conduction. In the case when warm air is used, in order to avoid the lowering of the web temperature due to latent heat of evaporation, the air temperature should be higher than the desired temperature of the support while avoiding foaming of the web. Drying process of the web is preferably carried out effectively by changing the temperatures of the warm air and the support during the process between casting and peeling.

In order to obtain a cellulose ester film with a sufficient flatness, the residual solvent content of the web when it is peeled from a metal support is preferably 10-150% by weight, however, it is more preferably 20-40% by weight or 60-130% by weight. The residual solvent content is specifically preferably 20-30% by weight or 70-120% by weight. The temperature of the support at the peeling point is preferably −50 to 40° C., more preferably 10 to 40° C., and most preferably 15 to 30° C.

The residual solvent content of the web is defined by the following formula:

$$\text{Residual solvent content (\% by weight)} = \{(M-N)/N\} \times 100$$

where M represents the weight of a sample of the web collected in the manufacturing process or after manufacturing, and N represents the weight of the same sample after it was dried at 115° C. for 1 hour.

In the drying process of a cellulose ester film, the film is peeled from the support and further dried until the residual solvent decreases to not more than 0.5%.

The peeled web is generally dried by a roll drying method (the web is passed through many rolls alternately provided up and down in a staggered array), or by a tenter method in which both the web is dried while the web is being transported.

The web may be stretched in the film transport direction by a peeling tension or by a transporting tension when the web is peeled from the support. Accordingly, in the present invention, peeling of the web is preferably carried out with a peeling tension and a transport tension as low as possible. The tension of, specifically, 50-170 N/m is effective. At that time a cold air of 20° C. is preferably applied to rapidly solidify the web.

An example of the stretching process (also referred to as a tenter process) of the present invention will now be explained using FIG. 2.

Figure 2:
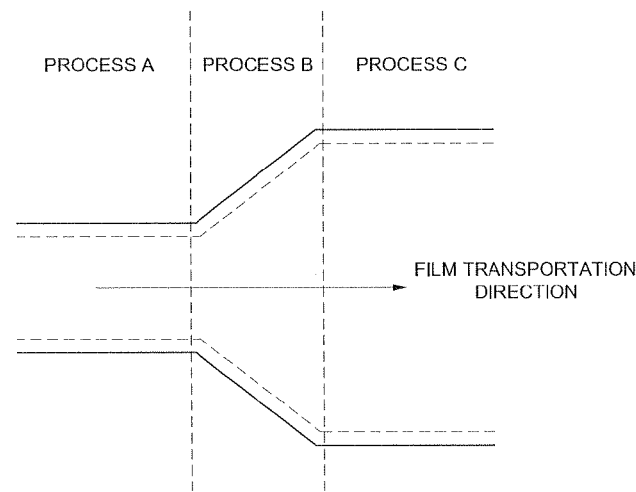
FIG. 2 is a schematic drawing to show an example of a tenter process utilized in the present invention.

In FIG. 2, Process A is the process in which the web transported from Transport Process D0 which is not illustrated is hold. In Process B, the film is stretched in the lateral direction (perpendicular to the film transport. direction) with the stretching angle illustrated in FIG. 1. In Process C, stretching is completed and the film is transported to the next production process while being hold.

A slitter which trims both edges of the film is preferably provided at any position between just after the web is peeled and just after Process B or C. Specifically preferably, a slitter is provided just before Process A. When a stretching was carried out under the same condition, a stretched film of which the edges are slit before Process B showed an improved orientation angle distribution of slow axes (hereafter referred to as a orientation angle dispersion) than a stretched film without slitting.

This may be because an undesirable stretching in the film transport direction is suppressed between the peeling process and Process B where the film still contains much solvent.

In the tenter process, a different temperature domain may be purposely provided in the film to improve the orientation angle distribution. Also a neutral domain is preferably provided between two different temperature domains to prevent interference.

The stretching process may be divided into several steps. Biaxial stretching in both film transport direction and the lateral direction is also preferable. Biaxial stretching may be carried out simultaneously or in series of steps. In stepped stretching, stretching may be carried out alternately in different directions or stepwise in one direction. Stretching alternately in different directions may also be added to the sequence of stepped stretching in one direction.

It is specifically preferable to obtain the effect of the present invention that the web peeled from the metal support is transported while being dried, followed by stretching the web in the lateral direction via a tenter method in which the both edges of the web are held using pins or clips, whereby a prescribed retardation value is provided to the web. The stretching may be carried out only in the lateral direction or simultaneous biaxial stretching may be carried out. The stretching ratio of the web in both the directions is preferably 1.05-2 and more preferably 1.15-1.5. The web may be shrunk in the film transport direction when the web is biaxially stretched, where the shrinking ratio is preferably 0.8-0.99 and preferably 0.9-0.99. The enlarging ratio of the area of the web after stretching (or shrinking) in the lateral direction and in the film transport direction is preferably 1.12-1.44 and more preferably 1.15-1.32. The enlarging ratio of the area of the web is obtained by (stretching ratio in the lateral direction)×(stretching ratio in the film transport direction).

The term "stretching direction" used in the present invention usually represents the direction in which stretching tension is applied, however, when a web is biaxially stretched in a plurality of steps, the "stretching direction" may mean the direction in which the final stretching ratio of the web becomes larger (which is usually the slow axis direction).

It is well known that, when a web is stretched in the lateral direction of the web, the orientation angle distribution becomes unfavorable in the lateral direction. In order to conduct stretching in the lateral direction of a web while keeping the ratio of Rt to Ro constant and having a favorable orientation angle dispersion, a preferable relationships among web temperatures of Processes A, B and C exist, namely, the relationship $Ta \leq (Tb-10)$ is preferably satisfied and the relationship $Tc \leq Tb$ is preferably satisfied, or more preferably the both relationships $Ta \leq (Tb-10)$ and $Tc \leq Tb$ are simultaneously satisfied, wherein Ta, Tb and Tc represents temperatures in Celsius at each end of Processes A, B and C, respectively.

In order to have a favorable orientation angle distribution, the temperature increasing rate of the web in Process B is preferably 0.5-10° C./s.

The stretching duration in Process B is preferably shorter, however, a lower limitation of the stretching duration may be prescribed to maintain uniformity of the web. The stretching duration is preferably 1-10 seconds and more preferably 4-10 seconds. In relation to the temperatures of Processes B and C, the film temperature is preferably from the glass transition temperature −30° C. to the glass transition temperature −1° C., and more preferably 100-160° C.

In the tenter process, the coefficient of heat transfer may be constant or may be changed. The heat transfer coefficient is preferably in the range of $41.9$-$419 \times 10^3$ $J/m^2$ h, more preferably $41.9$-$209.5 \times 10^3$ $J/m^2$ h, and still more preferably $41.9$-$126 \times 10^3$ $J/m^2$ hr.

The stretching rate in the lateral direction in Process B may be constant or may be changed. The stretching rate is preferably in the range of 50-500%/minute, more preferably 100-400%/minute, and most preferably 200-300%/minute.

In order to obtain the effect of the present invention, it is preferable to control the stress of the film in the first 10 cm in Process B, and it is more preferable to control the stress in the range of 100-200 N/mm.

In the tenter process, the distribution of environmental temperature in the lateral direction of the web is preferably smaller to improve uniformity of the web. The distribution of environmental temperature in the lateral direction in the tenter process is preferably within ±5° C., more preferably within ±2° C., and most preferably within ±1° C. By decreasing the distribution of environmental temperature, the temperature distribution in the lateral direction of a web may also be decreased.

In Process C, the width of a web held by a tenter is preferably reduced. Specifically, the width is preferably reduced to 95 to 99.5% of the width in the former process.

In the present invention, in order to precisely orient the polymer, preferably used is a tenter in which the holding lengths (the holding length being the length of the web from the beginning of holding to the end of holding) of the left side edge and the right side edge can be independently controlled.

Figure 3:
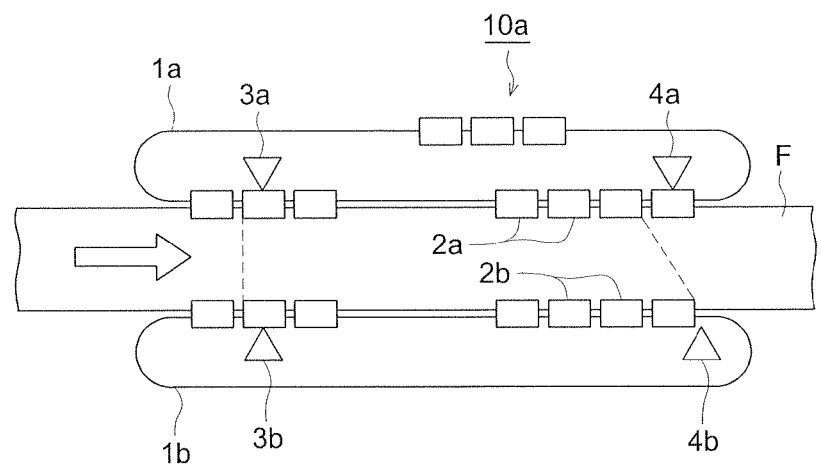
FIG. 3 is a schematic drawing to show an example of a tenter stretching system (10a) utilized in a method of the present invention.

As a means to change the holding lengths of left and right edges by independently controlling the lengths of the left and right edges where the web is held in a tenter stretching apparatus, exemplified is, for example, the apparatus shown in FIG. 3. FIG. 3 is a schematic illustration of a preferably used tenter apparatus (10a) in the production process of the polymer film of the present invention. In this figure, by changing the positions of the holding members (clips) (2a) (2b) of left and right, namely, by changing the set positions of the clip closers (3a)(3b) of left and right to change the start positions of holding of left and right edges, the left and right holding lengths of the film (F) are changed, whereby a forth to twist the film (F) is generated. By the forth to twist the film, the displacement occurred in the transport process other than in the tenter is corrected, and the occurrence of meandering, tensile or wrinkle of the film can be avoided, even when the length between the peeling point and the tenter becomes longer.

Further, though tenter stretching apparatus (10a) in the figure is schematically shown, a usual arrangement is as follows. Many clips (2a) (2b) are equipped on a pair of rotating devices arranged on left and right sides, each rotating device containing a looped chain (1a) (1b). The track of each of the left and right chains (1a) (1b) is set so that the clips moving in the forward direction of the chains, which hold the left and right edges to stretch the film, gradually draw apart from the film (F) toward the lateral direction of the film, whereby the film (F) is stretched in the lateral direction. In FIGS. 3, 4a represent a clip opener of the left side, and 4b represents a clip opener of the right side.

In order to precisely correct the wrinkle, tensile, and displacement, a device which avoids the meandering of the long roll film is preferably equipped. It is preferable that an edge position controller (also referred to as EPC) disclosed in JP-A No. 6-8663, or a center position controller (also referred to as CPC) is used to correct meandering. These devices detect the edges of the film with an air servo sensor or an optical sensor to control the transport of the film using the obtained information, whereby the edge positions and the center position of the film with respect to the lateral direction are kept constant while the film is transported. One or two guide rolls or a flat expander roll having a driving member as actuators are moved to the right and left (or up and down) along the line to correct the meandering. A pair of small pinch rolls are placed on each of the right and left of the film (one of the pair of pinch rolls is placed on the front surface of the film and the other is placed on the back surface of the film, wherein the two pairs of the pinch rolls are located on both sides of the film), whereby the film is sandwiched and pulled to correct meandering (a cross guide method). The principle of meandering correction of these devices can be described as follows: When the running film tends to move to the left, the roll is tilted so as to move the film to the right, in the former method, and in the latter method, a pair of pinch rolls on the right nip the film to pull it to the right. At least one of the aforementioned meandering preventive apparatuses is preferably installed between the peeling point of the film and the tenter stretching apparatus.

After a web is treated in the tenter process, a subsequent-drying process (hereafter referred to as Process D1) is preferably provided.

Although the tension applied to the web while the web is being transported is affected by several factors, for example: the property of a dope, the amount of residual solvent at the peeling process and Process D0, and the temperature of Process D1, the film tension is preferably 120-200 N/m, more preferably 140-200 N/m, and most preferably 140-160 N/m.

In order to prevent the stretching of the web in the film transport direction in Process D1, a tension cut roller is preferably provided.

The means to dry the web is not specifically limited, and, generally, heated air, infra-red rays, heating roll and microwaves are applicable, however, preferable is heated air with respect to the easiness.

It is effective to conduct heat treatment of the web for 10-60 min. at the temperature of not more than the glass transition temperature −5° C. and not less than 100° C. The drying temperature is more preferably 100-200° C. and still more preferably 110 to 160° C. Further more preferable is to carry out heat treatment while the web is being transported at the temperature of 105-155° C., in the atmosphere of which rate of atmosphere replacement is not less than 12 times/hour and more preferably 12-45 times/hour.

In order to obtain the elastic modulus of the present invention, the retardation film of the present invention preferably has a free volume radius determined by positron annihilation lifetime spectroscopy of 0.250-0.350 nm and specifically preferably 0.250-0.310 nm.

The free volume mentioned here represents a vacant area which is not occupied by the cellulose chain. This free volume can be measured using positron annihilation lifetime spectroscopy. More specifically, by measuring the time from injection of positrons into a specimen to the annihilation of the positrons, information of the size and numerical concentration of atomic void or free volume is nondestructively obtained from the annihilation lifetime of positrons.

<Measurement of Free Volume Radius by Positron Annihilation Lifetime Spectroscopy>

Positron annihilation lifetime and relative intensity were measured under the following measurement condition.

(Measurement Condition)
Positron source: 22NaCl (intensity: 1.85 MBq)
Gamma-ray detector: Plastic scintillator+Photomultiplier tube
Apparatus time resolution: 290 ps
Measurement temperature: 23° C.
Total number of counts: 1 million counts
Specimen size: 20 mm×15 mm×2 mm 20 pieces of 20 mm×15 mm sized films were piled to prepare an about 2 mm thick sample. The sample was dried under vacuum 24 hours.
Irradiation area: About 10 mm in diameter
Time per channel: 23.3 ps/ch According to the above measurement condition, positron annihilation lifetime spectroscopy was carried out. Using a nonlinear least-square method, three components of cellulose ester films were analyzed. When the annihilation times were referred to as, in small order, $\tau 1$, $\tau 2$ and $\tau 3$ and the corresponding intensities were referred to as I1, I2 and I3 (I1+I2+I3=100%), respectively, using the largest annihilation time $\tau 3$, a free volume radius $R_3$ (nm) was determined using the following formula. The larger the $\tau 3$ value is, the larger the free volume is estimated to be.

$$\tau 3 = (½)\,[1-\{R3/(R3+0.166)\}+(½\pi)\sin\{2\pi R3/(R3+0.166)\}]-1$$

where, 0.166 (nm) represents the thickness of the electronic layer which is exuding from the wall of a hole.

The above measurement was repeated twice and the average value was obtained.

The positron annihilation lifetime spectroscopy is explained in, for example, MATERIAL STAGE vol. 4, No. 5, 2004, pp. 21-25, The TRC News, No. 80 (July, 2002) PP. 20-22 (published by Toray Research Center), and "BUNSEKI (Analysis)", 1988, pp. 11-20".

The free volume radius of the retardation film of the present invention is preferably 0.250-0.310 nm and is more preferably 0.270-0.305 nm.

The method to obtain a preferable free volume radius of the retardation film is not specifically limited, it can be controlled by the following method.

A retardation film having a free volume radius of 0.250-0.310 determined by positron annihilation lifetime spectroscopy is obtained by a method containing the steps of:

casting a dope containing a plasticzer and a cellulose derivative on a support to form a web;
stretching the web while the web still contains the solvent;
drying the web until the amount of residual solvent decreases to less than 0.3% to obtain a cellulose resin film; and
heat treating the web at 105-155° C. under a rate of atmosphere replacement of not less than 12 times/hour or more preferably 12-45 times/h while the web is transported. Thus a polarizing plate protective film having a preferable free volume radius.

The rate of atmosphere replacement is the number of times replacing the atmosphere of a heat treatment chamber by fresh-air per unit time, provided that the volume of the heat treatment chamber is expressed as V (m³) and the amount of fresh-air sent to the heat treatment chamber is expressed as FA (m³/h). Fresh-air does not include the air which is recycled and circulating, among the air sent to the heat treatment chamber but includes the air containing no evaporated solvent nor evaporated plasticizer, or the air from which evaporated solvent or evaporated plasticizer are removed.

Rate of atmosphere replacement=FA/V (times/hour)

Further, to prepare retardation film of the present invention, it is preferable to apply film with pressure of 0.5-10 kPa in the thickness direction in a heating treatment process after drying, and for example pressure is uniformly applied by a nip roll. Drying has been preferably finished sufficiently when pressure is applied in the thickness direction, and a free volume and a total free volume parameter of retardation film can be controlled by applying pressure of 0.5-10 kPa onto the both surfaces of film. Specifically, the method is one to apply pressure on film by two parallel nip rolls. Further, it may be such as a method utilizing a calendar roll. The temperature at applying pressure is preferably 105-155° C.

After a predetermined heating treatment, it is preferable to cut off the edge portions by arranging a slitter before winding with respect to preparing a good roll form. Further, the both edge portions in the width direction are preferably subjected to a knurling processing.

A knurling processing can be performed by pressing a heated embossing roll onto film. An embossing roll is provided with a fine roughness and is pressed onto film to form roughness, whereby the edge portions can be made thicker.

In retardation film of the present invention, the knurling at the edge portion in the width direction is preferably 4-20 μm high and 5-20 mm wide.

Further, in the present invention, the above-described knurling process is preferably arranged after finish of drying and before winding in a film casting process.

Further, retardation film having a multilayer structure by a co-casting method can be also preferably utilized. Even in the case of retardation film having a multilayer structure, provided is a layer containing a plastisizer, which may be any one of a core layer, a skin layer or the both thereof.

A center line mean roughness (Ra) of the surface of retardation film according to the present invention is preferably 0.001-1 μm.

Retardation in the plane Ro at 589 nm in the plane direction, which is defined by the following equation, of retardation film according to the present invention is preferably 30-100 nm and more preferably 50-100 nm. Further, retardation in the thickness direction Rt is preferably 70-300 nm and more preferably 100-250 nm. Particularly, Rt/Ro is preferably in a range of 2-5.

Ro, Rt or angle θ0 (°) between the width direction of retardation film according to the present invention and the slow axis can be measured by use of an automatic double refractometer. A double refractive index was measured by use of an automatic double refractometer to determine refractive indexes nx, ny and nz, and then Ro and Rt were calculated according to the following equation.

$Ro=(nx-ny) \times d$ $Rt=\{(nx+ny)/2-nz\} \times d$ (wherein, nx is a refractive index in the slow axis direction in the film plane, ny is a refractive index in the fast axis direction in the film plane, nz is a refractive index in the thickness direction and d is a thickness of film (nm).)

Retardation film according to the present invention has a thickness in a range of preferably 10-200 μm, more preferably 10-200 μm and specifically preferably 20-50 μm. Generally, it is easy to increase a retardation value when retardation film is thicker, however, in the present invention, it is possible to decrease the total layer thickness of a polarizing plate to decrease influences during drying and aging storage in manufacturing of a polarizing plate, by providing a polarizing plate protective film with a retardation function which is utilized as retardation film having a thinner thickness.

Moisture permeability is preferably not more than 200 g/m²·24 hour as a value measured based on JIS Z 0208 (25° C., 90% RH), more preferably 10-180 g/m²·24 hour and specifically preferably not more than 160 g/m²·24 hour. The moisture permeability is specifically preferably in the above-described range at a layer thickness of 20-60 μm.

A long roll retardation film of the present invention, specifically, means those having a length of approximately 100-10000 m, and generally provided with a roll form. Further, width of retardation film of the present invention is preferably not less than 1 m, more preferably not less than 1.4 m and specifically preferably 1.4-4 m.

[Cycloolefin Polymer Film]

Cycloolefin polymer film preferably utilized in the present invention will now be explained.

Cycloolefin polymer utilized in the present invention is comprised of polymer resin containing an alicyclic structure.

Preferable cycloolefin polymer is resin in which cycloolefin is polymerized or copolymerized. Cycloolefin includes unsaturated hydrocarbon having a polycyclic structure and derivatives thereof such as norbornene, cyclopentadiene, tetracyclododecene, ethyl tetracyclododecene, ethylidene tetracyclododecene and tetracyclo[7.4.0.110, 13.02, 7]trideca-2,4,6,11-tetraene; and unsaturated hydrocarbon having a monocyclic structure and derivatives thereof such as cyclobutene, cyclopentene, cyclohexene, 3,4-dimethylcyclopentene, 3-methylcyclohexene, 2-(2-methylbutyl)-1-cyclohexene, cyclooctene, 3a,5,6,7a-tetrahydro-4,7-methano-1H-indene, cycloheptene, cyclopentadiene and cyclohexadiene. These cycloolefin may be provided with a polar group as a substituent. A polar group includes a hydroxyl group, a carboxyl group, an alkoxyl group, an epoxy group, a glycidyl group, an oxycarbonyl group, a carbonyl group, an amino group, an ester group and a carbonic acid anhydride group, and specifically preferable is an ester group, a carboxyl group or a carbonic acid anhydride group.

Preferable cycloolefin polymer may be those in which monomer other than cycloolefin being addition copolymerized. Monomer capable of addition copolymerization includes ethylene such as ethylene, propylene, 1-butene and 1-pentene; or dien such as α-olefin-1,4-hexadiene, 4-methyl-1,4-hexadiene, 5-methyl-1,4-hexadiene and 1,7-octadiene.

Cycloolefin is prepared by an addition polymerization reaction or a metathesis open ring polymerization reaction. Polymerization is preformed in the presence of a catalyst. A catalyst for addition polymerization includes, for example, a catalyst comprising a vanadium compound and an organoaluminum compound. A catalyst for open ring polymerization includes a polymerization catalyst comprising a halogenide, nitrate or an acetylacetone compound of metal such as ruthenium, rhodium, palladium, osmium, iridium and platinum, and a reducing agent; or a polymerization catalyst comprising a halogenide or acetylacetone compound of metal such as titanium, vanadium, zirconium, tungsten and molybdenum, and an organoaluminum compound. Such as polymerization temperature and pressure are not specifically limited, however, polymerization is generally performed at a polymerization temperature of −50-100° C. and under a polymerization pressure of 0-490 N/cm².

Cycloolefin polymer utilized in the present invention is preferably those in which cycloolefin is polymerized or copolymerized followed by being subjected to a hydrogen addition reaction to convert unsaturated bonds in the molecule into saturated bonds. A hydrogen addition reaction is performed by blowing hydrogen in the presence of a hydrogenation catalyst well known in the art. A hydrogenation catalyst includes a homogeneous catalyst comprising a combination of a transition metal compound/an alkyl metal compound such as cobalt acetate/triethyl aluminium, neckel acetylacetonato/triisobutyl aluminum, titanocene dichloride/n-butyl lithium, zirconocene dichloride/sec-butyl lithium and tetrabutoxy titanate/dimethyl magnesium; an inhomogeneous catalyst such as nickel, palladium and platinum; and an inhomogeneous solid carrying catalyst comprising a metal catalyst held by a carrier such as nickel/silica, nickel/diatomaceous earth, nickel/alumina, palladium/carbon, palladium/silica, palladium/diatomaceous earth and palladium/alumina.

In addition, cycloolefin polymer also includes the following norbornene type polymer. Norbornene type polymer is preferably provided with a norbornene skeleton as a repeating unit, and specific examples thereof include those described in such as JP-A Nos. 62-252406, 62-252407, 2-133413, 63-145324, 63-264626 and 1-240517, Examined Japanese Patent Application Publication No. 57-8815, JP-A Nos. 5-39403, 5-43663, 5-43834, 5-70655, 5-279554, 6-200985, 7-62028, 8-176411 and 9-241484, however, is not limited thereto. Further, these may be utilized alone or in combination of at least two types.

In the present invention, among the above-described norbornene type polymer, preferable are those provided with a repeating unit represented by any one of following structural formulas (I)-(IV).

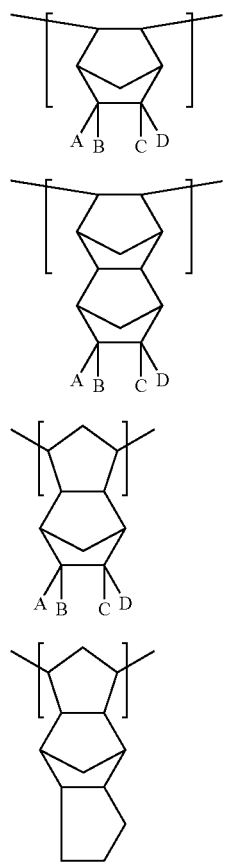

A, B, C and D, in above structural formula (I)-(IV), each independently represent a hydrogen atom or a monovalent organic group.

Further, among the aforesaid norbonene type polymer, also preferable is hydrogenated polymer prepared by hydrogenation of polymer, which is prepared by metathesis polymerization of at least one compound represented by following chemical structure (V) or (VI) and an unsaturated cyclic compound which is copolymeizabele with this.

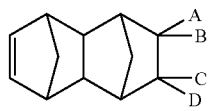

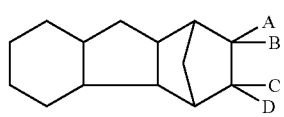

In the aforesaid chemical structures, A, B, C and D each independently represent a hydrogen atom or a monovalent organic group.

Herein, the above-described A, B, C and D are not specifically limited, however, are preferably a hydrogen atom, a halogen atom, a monovalent organic group or an organic group connected via a connecting group of at least divalent, and these may be identical to or different from each other. Further, A or B, and C or D may form a monocyclic ring or polycyclic ring structure. Herein, the above-described connecting group of at least divalent contains a hetero atom such as an oxygen atom, a sulfur atom and a nitrogen atom, and includes ether, ester, carbonyl, urethane, amide and thioether, however, is not limited thereto. Further, the above described organic group may be further substituted via the above-described connecting group.

Further, as other monomer copolymerizable with norbornene type monomer, utilized are α-olefin having a carbon number of 2-20 such as ethylene, propylene, 1-butene, 1-pentene, 1-hexene, 1-octene, 1-decene, 1-dodecene, 1-tetradecene, 1-hexadecene, 1-octadecene and 1-eicosene, and derivatives thereof; cycloolefin such as cyclobutene, cyclopentene, cyclohexene, cyclooctene and 3a,5,6,7a-tetrahydro-4,7-methano-1H-indene, and derivatives thereof; non-conjugated diene such as 1,4-hexadiene, 4-methyl-1,4-hexadiene, 5-methyl-1,4-hexadiene and 1,7-octadiene. Among them, α-olefin and ethylene are specifically preferable.

These other monomers copolymerizable with norbornene type monomer may be utilized each alone or in combination of at least two types. In the case of addition polymerization of norbornene type monomer and other monomer copolymerizable therewith, a ratio of a structural unit arising from norbornen type monomer and a structural unit arising from copolymerizable other monomer is suitably selected to be in a range of generally 30/70-99/1, preferably 50/50-97/3 and more preferably 70/30-95/5, based on a weight ratio.

When unsaturated bonds remaining in a polymer molecule chain are saturated by a hydrogenation reaction, the hydrogenation degree is preferably set to not less than 90%, preferably not less than 95% and specifically preferably not less than 99%, with respect to light stability and weather-proofing.

In addition, cycloolefin polymer utilized in the present invention includes such as thermoplastic saturated norbornene type resin described in paragraph Nos. [0014]-

[0019] of JP-A 5-2108, thermoplastic norbornene type resin described in paragraph Nos. [0015]-[0031] of JP-A 2001-277430, thermoplastic norbornene type resin described in paragraph Nos. [0008]-[0045] of JP-A 2003-14901, norbornene type resin compositions described in paragraph Nos. [0014]-[0028] of JP-A 2003-139950, norbornene type resin described in paragraph Nos. [0029]-[0037] of JP-A 2003-161832, norbornene type resin described in paragraph Nos. [0027]-[0036] of JP-A 2003-195268, alicyclic structure containing polymer resin described in paragraph Nos. [0009]-[0023] of JP-A 2003-211588 and norbornen type polymer resin or vinyl alicyclic hydrocarbon polymer resin described in paragraph Nos. [0008]-[0024] of JP-A 2003-211588.

Specifically, such as Zeonex and Zeonoa, manufactured by Nippon Zeon Co., Ltd.; Arton manufactured by JSR Co., Ltd; Apel (such as APL 8008T, APL 6509T, APL 6013T, APL 5014DP and APL 6015T) manufactured by Mitsui Chemicals Co., Ltd. are preferably utilized.

A molecular weight of cycloolefin polymer utilized in the present invention is appropriately selected according to the application, however, it is preferred to achieve a highly balanced mechanical strength and a mold processing behavior of a molded product, when it is in a range of generally 5,000-500,000, preferably 8,000-200,000 and more preferably 10,000-100,000 based on a weight average molecular weight of converted polyisobutylene or polystyrene, measured by a gel permeation chromatography method.

Further, it is possible to effectively prevent polymer from such as decomposition and coloring at mold processing from, by blending a low volatile anti-oxidant at a ratio of 0.01-5 weight parts against 100 weight parts of cycloolefin polymer.

As an antioxidant, those having a vapor pressure at 20° C. of not more than $10^{-5}$ Pa and specifically not more than $10^{-8}$ Pa are preferred. An antioxidant having a vapor pressure of over $10^{-5}$ Pa will cause problems of foaming at extrusion molded and of evaporation of an antioxidant from the surface of a molded product when being exposed to high temperature.

An antioxidant utilizable in the present invention includes the following and these may be utilized alone or in combination of a few types.

Hindered phenol type: such as 2,6-di-t-butyl-4-methylphenol, 2,6-di-t-butylphenol, 4-hydroxymethyl-2,6-di-t-butylphenol, 2,6-di-t-butyl-α-methoxy-p-dimethyl-phenol, 2,4-di-t-aminophenol, t-butyl-m-cresol, 4-t-butylphenol, styrenized phenol, 3-t-butyl-4-hydroxyanisol, 2,4-dimethyl-6-t-butylphenol, octadecyl-3-(3,5-di-t-butyl-4-hydroxyphenyl) propionate, 3,5-di-t-butyl-hyroxybenzylphosphonate-diethylester, 4,4'-bidphenol, 4,4'-bis-(2,6-di-t-butylphenol), 2,2'-methylene-bis-(4-methyl-6-t-butylphenol), 2,2'-methylene-bis-(4-methyl-6-α-methylcyclohexylphenol), 4,4'-methylene-bis-(2,6-di-t-butylphenol), 1,1'-methylene-bis-(2,6-di-t-butylnaphthol), 4,4'-butylidene-bis-(2,6-di-t-butyl-methacresol), 2,2'-thio-bis-(4-methyl-6-t-butylphenol), di-o-cresol sulfide, 2,2'-thio-bis-(2-methyl-6-t-butylphenol), 4,4'-thio-bis(3-methyl-6-t-butylphenol), 4,4'-thio-bis-(2,3-di-t-sec-amylphenol), 1,1'-thio-bis-(2-naphthol), 3,5-di-t-butyl-4-hydroxybenzylether, 1,6-hexanediol-bis[3,(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl) propionate], 2,2-thiobis(4-methyl-6-t-butylphenol), N,N'-hexamethylenebis(3,5-di-t-butyl-4-hydrocynamide), bis(3,5-di-t-butyl-4-hydroxybenzyl ethylphsphonate)calcium, 1,3,5-trimethyl-2,4,6-tris-(3,5-di-t-butyl-4-hydroxybenzyl) benzene, triethyleneglycol-bis[3,(3-t-butyl-5-mehyl-4-hydroxyphenyl)propionate], 1,3,5-trimethyl-2,4,6-tris(3,5-di-t-butyl-4-hydroxybenzyl)benzene, tris-(3,5-di-t-butyyl-4-hydrovybenzyl)-isocyanulate and pentaerythlityl-tetrakis[3-(3,5-di-t-butyl-4-hydroxyphenyl)propionate].

Aminophenols: such as normalbutyl-p-aminophenol, normalbutyloyl-p-aminophenol, normalpelargonoyl-p-aminophenol, normallauroyl-p-amnophenol, normalstearoyl-p-aminophenol, 2,6-di-t-butyl-α-dimethyl and amino-p-cresol.

Hydroquinone type: such as hydroquinone, 2,5-di-t-butyl-haydroquinone, 2,5-di-t-amylhydroquinone, hydroquinone methylether and hydroquinone monobenzylether.

Phosphite type triphosphite: such as tris(3,4-di-t-butylephenyl)phosphite, tris(nonylphenyl)phosphite, tetrakis(2,4-di-t-butylphenyl)-4,4'-biphenylenephosphite and 2-ethyl-hexyloctylphosphite.

Others: such as 2-mercaptobenzothiazole zinc salt, dicate-colborate-di-o-triguanidine salt, nickel-dimethyldithiocarbamate, nickel-pentamethylene dithiocarbamate, mercapto-benzimidazole and 2-mercaptobenzimidazole zinc salt.

Cycloolefin polymer film may be incorporated with an additive which can be generally blended in plastic film. Such an additive includes such as a thermal stabilizer, a light stabilizer, an ultraviolet absorbent, an antistatic agent, a sliding agent, a plasticizer and a filling agent, and the content can be selected in a range of not disturbing the object of the present invention.

A molding method of cycloolefin is not specifically limited, and either a heat fused molding method or a solution casting method can be utilized. A heat fused molding method can be classified, in further details, into such as an extrusion molding method, a press molding method, an inflation molding method, an ejection molding method, a blow molding method and a stretching molding method, however, among these methods, to prepare film being excellent in such as mechanical strength and surface precision, preferable are an extrusion molding method, an inflation molding method and a press molding method, and most preferable is an extrusion molding method. The molding condition is appropriately selected depending on an application purpose and a molding method, however, in the case of applying a heat fused molding method, cylinder temperature is appropriately set generally in a range of 150-400° C., preferably of 200-350° C. and more preferably of 230-330° C. There is a possibility of causing molding defects such as a shrink mark or distortion in film due to deteriorated fluidity when the resin temperature is excessively low, while voids or silver streaks or yellowing of film may be generated when the resin temperature is excessively high. Thickness of film is generally in a range of 5-300 μm, preferably of 10-200 μm and more preferably of 20-100 μm. Handling at accumulation becomes difficult when the thickness is excessively thin, while drying time after accumulation becomes long to deteriorate productivity when the thickness is excessively thick.

Cycloolefin polymer film is preferably has a wetting tension of the surface of preferably not less than 40 mN/m, more preferably not less than 50 mN/m and furthermore preferably not less than 55 mN/m. When the wetting tension of the surface is in the above-described range, adhesion strength between the film and polarizer film will be increased. To adjust the wetting tension of the surface, for example, it is possible to apply film with a corona discharge treatment, ozone blowing, ultraviolet ray irradiation, a flame treatment, a chemical treatment and other surface treatments well known in the art.

Thickness of a sheet before stretching is required to be approximately 50-500 μm; and thickness unevenness is preferably as small as possible and is within ±8%, preferably within ±6% and more preferably within ±4%, in the whole surface.

To form retardation film of the present invention from cycloilefin polymer film described above, it is possible to prepare by a manufacturing method similar to the aforesaid cellulose ester, and at least by uniaxially stretching the sheet. Herein, it may be essential uniaxial stretching, that is for example, a biaxial stretching, in which a sheet is stretched in the uniaxial direction to orient the molecule after having been stretched in a range of not to affect the molecular orientation. For stretching, it is preferable to utilize such as the aforesaid tenter system.

The stretching ratio is 1.1-10 times and preferably 1.3-8 times, and in this range, retardation is adjusted to be a desired value. The absolute value of retardation is not increased not to achieve the predetermined value when the stretching ratio is excessively small, while the sheet may be broken when it is excessively large.

Stretching is generally performed in a temperature range of from Tg of resin constituting the sheet to Tg+50° C. and preferably Tg–Tg+40° C. The sheet may be broken when the stretching temperature is excessively low, while molecular arrangement is insufficient not to prepare desired retardation film when it is excessively high.

Thus obtained film is comprised of molecules being oriented by stretching to be provided with a desired amount of retardation. In the present invention, retardation in the plane Ro at 589 nm is preferably 30-100 nm and more preferably 40-70 nm. Further, retardation in the thickness direction Rt is preferably 70-300 nm and more preferably 100-250 nm.

Retardation can be controlled by a retardation of a sheet before stretching, a stretching ratio, a stretching temperature and a thickness of stretching oriented film. When a sheet before stretching has a constant thickness, since there is a tendency that an absolute value of retardation is increased as the stretching magnification of film is large, stretching oriented film having a desired retardation can be obtained by adjusting the stretching magnification.

The smaller is scattering of retardation, the more preferable, and cycloolefin film of the present invention has a scattering of retardation at a wavelength of 589 nm as small as generally within ±50 nm, preferably within ±30 nm and more preferably within ±20 nm.

Scattering of in-plane retardation or retardation in the thickness direction, or unevenness in thickness can be minimized by the following methods: (i) using a sheet having a smaller retardation scattering or a smaller thickness variation before stretching; and (ii) making stress to be uniformly applied to the sheet when the sheet is stretched. For this purpose, the sheet is preferably stretched under a uniform temperature distribution, that is, in an environment of controlled temperature of within ±5° C., preferably within ±2° C. and specifically preferably within ±0.5° C.

[Polycarbonate Type Film]

There are various polycarbonate type resins utilized to prepare polycarbonate type film; aromatic polycarbonate is preferable with respect to chemical properties and physical properties and specifically preferable is bisphenol A type polycarbonate. Among them, furthermore preferable resin includes those utilizing a bisphenol derivative, in which such as a benzene ring, a cyclohexane ring or an aliphatic hydrocarbon group is introduced in bisphenol A, however, specifically preferable is polycarbonate, which is prepared by utilizing a derivative introduced with these groups asymmetrically against the central carbon, having a structure with reduced anisotropy in a unit molecule. For example, preferable is polycarbonate prepared by utilizing bisphenol A in which tow methyl groups of the central carbon are substituted by benzene rings, or bisphenol A in which one hydrogen of each benzene ring is substituted by a methyl group or a phenyl group, asymmetrically against the central carbon.

Specifically, preferable resin is those prepared from 4,4'-dihydroxydiphenylalkane or a halogen substitutent thereof by a phosgene method or an ester exchange method, and includes such as 4,4'-dihydroxydiphenylmethane, 4,4'-dihydroxydiphenylethane and 4,4'-dihydroxydiphenylbutane.

In retardation film comprising polycarbonate resin utilized in the present invention, transparent resin such as polystyrene type resin, methylmethacrylate type resin or cellulose acetate type resin may be utilized in combination by mixing, or polycarbonate resin may be accumulated on at least one surface of cellulose acetate type film. Preparation method of polycarbonate type film utilizable in the present invention is not specifically limited, and any one of film by an extrusion method, film by a solvent casting method and film by a calendar method may be utilized. In the present invention, uniaxial stretching or biaxial stretching is employed and a manufacturing method similar to a preferable manufacturing method of cellulose ester film can prepare polycarbonate type film which satisfies the relationship of Condition (1) concerning elastic modulus $\epsilon_s$ and elastic modulus $\epsilon_f$, as well as satisfying the range of a retardation value in the plane and in the thickness direction.

Polycarbonate type film utilized in the present invention is preferably has a glass transition temperature (Tg) of not lower than 110° C. and a water absorbability (a value measured under a condition in water of 23° C. for 24 hours) of not more than 0.3%. More preferable is to utilize those having a Tg of not lower than 120° C. and a water absorbability of not more than 0.2%.

(Polarizing Plate)

A polarizing plate can be prepared by a general method. A retardation film of the present invention, the back side of which has been subjected to an alkali saponification treatment, is preferably pasted up on at least one surface of polarizer film prepared by being emersion stretched in an iodine solution, by use of a completely saponified type polyvinyl alcohol aqueous solution. On the other surface, said film may be utilized or another polarizing plate protective film may be utilized. Cellulose ester film available on the market (for example, Konicaminolta TAC KC8UX, KC4UX, KC5UX, KC8UY, KC4UE, KC4UY, KC12UR, KC8UCR-3, KC8UCR-4, KC8UCR-5, KC8UY-HA, KC8UX-RHA and KC8UX-RHA-N, manufactured by Konicaminolta Opto, Inc.; Fuji TAC TD80UF, T80UZ, T40UZ and antireflection film (Fuji Film CV Clearview UA), manufactured by Fuji Photo Film Co., Ltd.) is preferably utilized. Polarizing plate protective film utilized on the other surface is preferably optically isotropic polarizing plate protective film having a retardation in the plane Ro of 0-20 nm and Rt of –50-50 nm. For example, preferably utilized is polarizing plate protective film provided with a hard-coat layer or an antiglare layer described in such as JP-A Nos. 2003-114333, 2004-203009, 2004-354699 and 2004-354828. Further, said hard-coat layer or antiglare layer is preferably accumulated with such as an antireflection layer and an anti-stain layer.

In addition to these, also preferably utilized is polarizing plate protective film which combines optical compensation film having an optical anisotropic layer formed by orientating a liquid crystal compound such as discotic liquid crystal, bar-form liquid crystal and cholesteric liquid crystal. For example, an optical anisotropic layer can be formed by a method described in JP-A 2003-98348. Combination use with a polarizing plate of the present invention can provide a liquid crystal display having excellent flatness and a stable viewing angle enlargement effect.

Polalizer film as a primary constituent element of a polarizing plate is an element which passes light having a polarized wave plane in a predetermined direction, and typical polarizer film commonly known at present is polyvinyl alcohol type polarizer film, which is classified into polyvinyl alcohol type film being dyed with iodine and one being dyed with dichroic dye. Polarizer film is prepared by film formation from polyvinyl alcohol aqueous solution, and the obtained film is uniaxially stretched and dyed, or is uniaxially stretched after dying, preferably followed by being subjected to a durability treatment with a boron compound. One surface of optical film of the present invention is pasted up on the surface of said polarizer film to prepare a polarizing plate. Pasting up is preferably carried out by use of a water-based adhesive comprising completely saponified polyvinyl alcohol as a primary component.

Further, ethylene modified polyvinyl alcohol is also utilized as polarizer film. The thickness of polarizer film is preferably 5-30 µm and specifically preferably 10-25 µm.

(Display)

A liquid crystal display constituted of a polarizing plate employing retardation film of the present invention is utilized to exhibit a higher display quality compared to that constituted of an ordinary polarizing plate. In particular, the effects of the present invention are more effectively exhibited when a polarizing plate of the present invention is utilized in a multi-domain type liquid crystal display and more preferably in a multi-domain type liquid crystal display by means of a double-refractive mode.

To be multi-domain is suitable for improvement of symmetry of image display and various types have been reported (Okita, Yamauchi: Liquid Crystal, 6 (3), 303 (2002)). Said liquid crystal cell is also shown in "Yamada, Yamahara: Liquid Crystal, 7 (2), 184 (2003)", however, is not limited thereto.

A polarizing plate of the present invention can be effectively utilized in a VMA (Multi-domain Vertical Alignment) mode represented by a vertical alignment mode, in particular, a quarterly-divided MVA mode, a PVA (Patterned Vertical Alignment) mode, which has been made into multi-domain by electrode arrangement and well known in the art, and a CPA (Continuous Pinwheel Alignment) in which electrode arrangement and cheiral ability are fused together. Further, also in an application to an OCB (Optical Compensated Bend) mode, film having an optical biaxial property is proposed (T. Miyashita, T. Uchida: J. SID, 3 (1), 29 (1995)), and the effects of the present invention in the display quality can be also exhibited by use of a polarizing plate of the present invention. Provided that the effects of the present invention are exhibited by utilizing a polarizing plate of the present invention, there is no limitation with respect to a liquid crystal mode and arrangement of a polarizing plate. Among them, retardation film of the present invention is preferably utilized in a vertical alignment mode liquid crystal display and specifically preferably in a MVA (Multi-domain Vertical Alignment) mode liquid crystal display.

A display quality of a display cell is preferably symmetric with respect to right and left in observation of human being. Therefore, in the case of a display cell being a liquid crystal display cell, the domain can be multiplied essentially preferring symmetry of the observer side. To divide the domain, a method well known in the art can be applied and the method by means of a half dividing method and preferably a quarterly-dividing method, which can be determined in consideration of characteristics of a liquid crystal mode well known in the art.

A liquid crystal display has been applied for devices of color display and moving image display, and a display quality of the present invention enables a fatigueless and faithful moving image display due to improvement in contrast and durability of a polarizing plate.

In a liquid crystal display of the present invention, a polarizing plate employing retardation film of the present invention is arranged on one surface of a liquid crystal cell or on the both surfaces. At this time, utilizing retardation film of the present invention, which is contained in a polarizing plate, to be on the liquid cell side contributes improvement of a display quality.

EXAMPLES

In the following, the present invention will be specifically explained with reference to examples, however, is not limited thereto.

Example 1

[Angle Measurement of Slow Axis of Film]

The measurement was carried out by use of KOBRA 21ADH produced by Oji Scientific Instruments. A sample was cut out so that an angle of the transport direction can be precisely recognized and precisely placed on a sample holder to be measured. The measurement was performed similarly to measurement of Ro and Rt.

[Measurement of Elastic Modulus $\epsilon s$, $\epsilon f$]

A mean refractive index of a film sample is measured by use of Abbe's refractometer (1T) to determine elastic modulus $\epsilon s$, $\epsilon f$ in the slow axis direction and the direction perpendicular to the slow axis. For example, in the case of retardation film having been stretched in the TD direction (the width direction), generally the slow axis becomes the TD direction and the direction perpaendicular to the slow axis becomes the MD direction (the longitudinal direction). In that case, the measurement can be performed with respect to elastic modulus in the MD direction and in the TD direction of each sample based on JIS K 7127.

In the case of the slow axis being the TD direction and the direction perpendicular to the slow axis being the MD direction, each sample, after having been kept under an environment of 23±2° C., 50±5% RH for 24 hours, is cut into a strip form of 10 mm wide×200 mm long so that the MD direction and the TD direction of each sample becomes the longitudinal direction respectively. Successively, the aforesaid strip form sample is set on TG-2KN Type Tensile Tester produced by Minibear Corp. at a chucking pressure of 0.25 MPa and a distance between standard lines of 100±10 mm, and is pulled at a pulling rate of 100±10 mm/min.

And, from the obtained tensile stress-distortion curve, a tangent line, which is drawn between the elastic modulus calculation starting point of 10N and the end point of 30N, is extrapolated to determine elastic modulus in the MD direction and in the TD direction.

[Measurement of Retardation Values Ro and Rt]

A mean refractive index of a film sample was measured by use of Abbe's refractometer (1T) and a spectral light source. Further, a thickness of film was measured by use of a micrometer available on the market.

Retardation of film, which had been kept under an environment of 23° C. and 55% RH for 24 hours, was measured by use of an automatic double refractometer KOBRA-21ADH (produced by Oji Scientific Instruments) at a wavelength of 589 nm under the same environment. The above described mean refractive index and layer thickness are input into the following equation to determine retardation in the plane Ro and retardation in the thickness direction Rt. Measurement is also performed with respect to the slow axis.

$$Ro=(nx-ny)\times d$$

$$Rt=\{(nx+ny)/2-nz\}\times d$$

(wherein, nx is a refractive index in the slow axis direction in the film plane, ny is a refractive index in the fast axis direction in the film plane, nz is a refractive index in the thickness direction and d is a thickness of film (nm).)

<Preparation of Retardation Film>

<Preparation of Retardation Film 101>

As for cellulose ester, utilized were those in which a substitution degree and a type of a substituent were varied as shown in Table 1.

TABLE 1

| Cellulose ester | Acetyl group | Propionyl group | Butyryl group | Total substitution degree |
|---|---|---|---|---|
| A | 1.7 | 0.9 | — | 2.6 |
| B | 1.6 | 0.8 | — | 2.4 |
| C | 2.9 | — | — | 2.9 |
| D | 1.7 | — | 0.9 | 2.6 |

<Particle Dispersion>

| | |
|---|---|
| Particles (Aerosil R972V (manufacturd by Nippon Aerosil Co., Ltd.)) (mean primary particle diameter of 16 nm, apparent specific gravity of 90 g/liter) | 11 weight parts |
| Ethanol | 89 weight parts |

The above composition, after having been mixed with stirring for 50 minutes by use of a dissolver, was dispersed by Manton-Gaulin homogenizer.

<Particle Containing Liquid>

Cellulose ester A was added into a dissolving tank charged with methylene chloride, and the resulting solution, after having been heated to be completely dissolved, was filtered through Azumi Filter No. 244 manufactured by Azumi Filter Paper Co., Ltd. The above particle dispersion having been filtered was slowly added into cellulose ester solution while sufficiently stirring. Further, dispersion by use of an atliter was performed to make a secondary particle diameter of a predetermined size. The resulting dispersion was filtered through Finemet NF manufactured by Nippon Seisen Co., Ltd. to prepare a particle containing liquid.

| | |
|---|---|
| Methylene chloride | 99 weight parts |
| Cellulose ester A | 4 weight parts |
| dispersion | 11 weight parts |

A primary dope solution comprising the following composition was prepared. First, a pressure dissolving tank was charged with methylene chloride and ethanol. Cellulose ester A was charged into the pressure dissolving tank containing a solvent while stirring. The mixture was completely dissolved while being heated and stirred, and further added with a plastisizer and an ultraviolet absorbent to be dissolved. The resulting solution was filtered through Azumi Filter No. 244 manufactured by Azumi Filter Paper Co., Ltd. to prepare a primary dope solution.

A primary dope solution of 100 weight parts and particle containing liquid of 5 weight parts were sufficiently mixed through an inline mixer (Toray Static Type Inline Mixer Hi-Mixer SWJ), followed by being uniformly cast on a stainless band support having a width of 2 m by use of a belt casting system. The cast web was peeled off from the stainless band support under a condition of a peeling tension of 130 N/m, a residual solvent amount of 100 weight % and a cold wind temperature of 20° C., and further transported in a state of keeping a speed difference between the portion (the roll) to cut a tension of the peeled off web and the potion (the roll) to apply the next transport tension.

Next, the both edge portions of a web were held by a tenter, stretching being performed under a condition of a tension until the position of 10 cm from the start of B process in FIG. 2 of 170 N/mm, a temperature of 140° C. and a stretching magnification of 20%, after stretching, a heating treatment at 130° C. for 20 minutes being performed while the width was kept to relax a tension in the width direction followed by release of width holding, and further drying was performed by transporting through the third drying zone, temperature of which was set to 125° C., for 30 minutes, whereby prepared was retardation film 101 having a thickness of 80 μm and a width of 1.4 m and provided with knurling of 1 cm wide and 8 μm high at the edge portions.

| (Composition of Primary Dope Solution) | |
|---|---|
| Methylene chloride | 390 weight parts |
| Ethanol | 80 weight parts |
| Cellulose ester A | 100 weight parts |
| Plastisizer: trimethylolpropane tribenzoate | 5 weigh parts |
| Plastisizer: ethylphthalyl ethylglycolate | 5.5 weigh parts |
| Ultraviolet absorbent: Tinuvin 109 (manufactured by Ciba Specialty Chemicals Co., Ltd.) | 1 weight part |
| Ultraviolet absorbent: Tinuvin 171 (manufactured by Ciba Specialty Chemicals Co., Ltd.) | 1 weight part |

(Preparation of Retardation Films 102-125, 136, 139-141)

Retardation film Nos. 102-125, 136, 139-141 were prepared in a similar manner to the above sample, except that a layer thickness, a peeling-off tension, a residual solvent amount at peeling off, a condition of cold wind, a tension until the position of 10 cm from the start of Process B, a temperature and a stretching magnification were changed as described in Tables 2-4.

Herein, in retardation film 121, 5 weight parts of following compound D, which is a compound having a 1,3,5-triazine ring, as a retardation controlling agent was added instead of the above-described two types of plastisizers.

Further, in retardation film 122, 5 weight parts of example compound A-18, which is a bar-form compound, as a retardation controlling agent was added instead of the above-described two types of plastisizers.

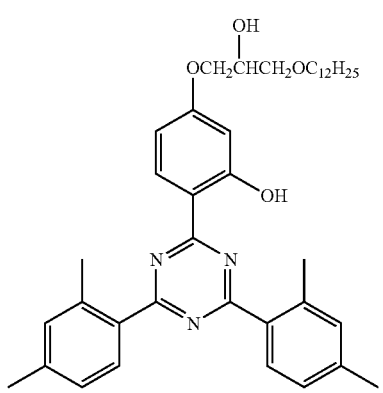

Compound D (Preparation of Cycloolefin Type Polymer Film 126-128)

After 500 parts of dehydrated cyclohexane, 1.2 parts of 1-hexene, 0.15 parts of dibutylether and 0.30 parts of triisobutyl aluminum were charged into a reaction vessel under a nitrogen atmosphere at room temperature to be mixed, a norbornene type monomer mixture, which was comprised of 20 parts of tricycle[4.3.0.12,5]deca-3,7-diene (dicyclopentadiene, hereinafter, being abbreviated as DCP), 140 parts of 1,4-methano-1,4,4a,9a-tetrahydrofluorene (hereinafter, being abbreviated as MTF) and 40 parts of 8-methyl-tetracyclo[4.4.0.12,5.17,10]-dodeca-3-ene (hereinafter, being abbreviated as MTD), and 40 parts of hexachloro tungsten (0.7% toluene solution) were continuously added over 2 hours while keeping 45° C. to be polymerized. The polymerization solution was added with 1.06 parts of butylglycidylether and 0.52 parts of isopropyl alcohol to inactivate a polymerization catalyst, where by the polymerization reaction was stopped.

Next, 100 parts of the obtained reaction solution containing open ring polymer were added with 270 parts of cyclohexane and further with 5 parts of a nickel-alumina catalyst (manufactured by Nikki Chemical Co., Ltd.) as a hydrogenation catalyst, and the reaction was performed for 4 hours after having being applied with a pressure of 5 MPa by hydrogen and heated at a temperature of 200° C. while stirring, whereby a reaction solution containing 20% of hydrogenated polymer of DCP/MTF/MTD open ring polymer was obtained. After eliminating the hydrogenation catalyst by filtration, soft polymer (Cepton 2002, manufactured by Kraray Corp.) and antioxidant (Irganox 1010, manufactured by Ciba Specialty Chemicals Co., Ltd.) each were added into the obtained solution to be dissolved (each 0.1 part per 100 parts of the polymer). Next, cyclohexane as a solvent and other volatile components were removed from the solution by use of a cylindrical concentrating dryer (produced by Hitachi Co., Ltd.), and hydrogenated polymer was extruded through an extruder in a fused state and recovered by being pelleted after cooling. A copolymerization ratio of each norborne monomer was calculated based on the residual norbornene composition (by means of a gas chromatography method) in the solution after polymerization, to be DCP/MTF/MDT=10/70/20, which is approximately equal to the charged composition. A weight average molecular weight (Mw) of this open ring polymer hydrogenated compound was 31,000, a molecular weight distribution was 2.5, a hydrogenated compound ratio was 99.9% and a Tg was 134° C.

The obtained pellets of an open ring polymer hydrogenated compound were dried by use of a hot wind dryer, in which air was circulated, at 70° C. for 2 hours to eliminate the water content. Next, the aforesaid pellets were fuse extrusion molded by use of a uniaxial extruder (produced by Mitsubishi Heavy Industry Co., Ltd.: screw diameter of 90 mm, T die rip part material made of tungsten carbide, peeling strength from fused resin of 44 N) provided with a coat hunger type T die having a rip width of 1.5 m to prepare cycloolefin resin film of 2,500 m long and 60 μm thick. Extrusion molding was performed in a clean room of a not more than 10,000 class under a molding condition of a fused resin temperature of 240° C. and a T die temperature of 240° C. With respect to this film, in a similar manner to retardation film 101, peeling off was performed under a condition of a peeling tension of 105 N/m, a residual solvent amount of 10 weight % and a cold wind temperature of 23° C., the both edge portions of the web being held by a tenter and stretched under a condition of a tension until 10 cm from the start of Process B of 135 N/mm, a temperature of 160° C. and a stretching ratio of 24%, and the both edges of cycloolefin resin film obtained were slit to be processed into 1.4 m width, whereby retardation film 123 having a layer thickness of 50 μm was prepared. Further, polyester film was wound up together as protective film at winding.

Retardation film Nos. 127 and 128, having a layer thickness of 60 μm and 80 μm, respectively, were prepared in a similar manner under the conditions described in Table 3.

(Preparation of Polycarbonate Type Film 129-131)

| (Dope Composition) | |
|---|---|
| Polycarbonate resin (viscosity average molecular weight of 40,000, bisphenol A type) | 100 weight parts |
| 2-(2'-hydroxy-3',5'-di-t-butylphenyl)benzotriazole | 1.0 weight part |
| Methylene chloride | 430 weight parts |
| Methanol | 90 weight parts |

The above-described composition was charged into a closed vessel and completely dissolved while stirring at 80° C. under pressure, whereby a dope composition was prepared.

Next, this dope composition was filtered and cooled to be kept at 33° C., being uniformly cast on a stainless band, and dried at 33° C. for 5 minutes. Then, peeling was performed under a condition of a peeling tension of 120 N/m, a residual solvent of 45 weight % and a cold wind temperature of 23° C., at the time of peeling off from the stainless band, in a similar manner to retardation film 101, and the both edge portions of the web were held by a tenter to be stretched under a condition of a tension until 10 cm from the start of Process B in FIG. 2 of 140 N/m, a temperature of 125° C. and a stretching magnification of 21%, whereby retardation film 129 having a width of 1.4 m and a layer thickness of 50 μm was prepared.

In a similar manner, under conditions described in Table 3, retardation film Nos. 130 and 131 having a layer thickness of 65 μm and 70 μm, respectively, were prepared.

(Preparation of Retardation Films 132-134 Provided with Polymer Layer on Support)

Next, 100 weight parts of the primary dope solution utilized in retardation film 101 were added with 5 weight parts of particle dispersion to be sufficiently mixed through an inline mixer (Toray Static Inline Mixer Hi-Mixer SWJ), and uniformly cast on a stainless band support having a width of 2 m by use of a belt casting system. The web was peeled off from the stainless band support under a condition of a peel-off tension of 130 N/m, a residual solvent amount of 100 weight % and a cold wind temperature of 20° C., and after the following polymer layer was coated and dried utilizing the prepared cellulose ester film as a support, a stretching treatment in the width direction was performed by a tenter together with the support in a similar manner to retardation film 101. The stretching was performed under a condition of a tension until 10 cm from the start of Process B of 150 N/m, a temperature of 145° C. and a stretching magnification of 15%, whereby retardation film 129 having a width of 1.4 m and a layer thickness of 60 μm was prepared.

In a similar manner, retardation film Nos. 133 and 134, which have layer thickness of 70 and 80 μm, respectively, were prepared under conditions described in Table 3.

<Polymer Layer>

A 15 weight % cyclohexanone solution of polyimide having a weight average molecular weight of 59,000, which had been synthesized from 2,2'-bis(3,4-dicarboxyphenyl)hexafluoropropane dianhydride and 2,2'-bis(trifluoromethyl)-4,4'-diaminobiphenyl, was coated on the above-described cellulose ester film by use of a micro-gravure coater and dried to form a polymer layer having a layer thickness of 6 μm.

(Polyvinyl Acetal Film)

19.07 g (0.43 mol) of PVA (NH-18, saponification degree: 98% and degree of polymerization:1800, produced by Nippon Synthetic Chemical Industry Co., Ltd.) was dissolved in 362.3 g of dimethylsulfoxide at 80° C. After dissolved, the solution was cooled to 40° C. and 11.55 g (77.9 mmol) of 2,4,6-trimethylbenzaldehyde and 16.37 g (138.5 mmol) of 1,1-diethoxyethane were dropped in to the solution to be dissolved (the total amount of 2,4,6-trimethylbenzaldehyde and 1,1-diethoxyethane was 0.5 equivalent based on the equivalent of the hydroxyl group of PVA). Further, 6.75 g (35.5 mmol) of p-toluenesulfonic acid monohydrates was added, and the solution was stirred at 40° C. for 4 hours to obtain the reaction product. In the solution in which 11.28 g (106.5 mmol) of sodium hydrogencarbonate was dissolved in 3000 ml of a mixture methanol and water (water: ethanol (volume ratio)=1:2), the above resultant solution was pored while stirring to obtain precipitate of white polymer. The white polymer was collected by filtration, dissolved in 600 g of tetrahydrofuran, and reprecipitated in 3000 ml of diethyl ether 3000 ml. The reprecipitate was collected by filtration, and dried at 50° C. for 15 hours in vacuum to obtain 25.0 g of the polymer. The degree of polymerization of this polymer was 1800, and Tg was 115° C.

The polymer thus obtained was dissolved in N,N-dimethylsulfoxide, and the solution was cast to form a film. This film was dried, and stretched by a ratio of 25% at 130° C. in the direction perpendicular to the transport direction of the film. Retardation film 135 was thus obtained.

(Liquid Crystal Coated Film)

A 0.1 μm gelatin layer was formed on retardation film 123, followed by applying solution 1 in a thickness of 0.2 μm.

| Solution 1 | |
|---|---|
| MP203 (produced by Kuraray Co. Ltd.) | 1 wt % |
| Water | 98 wt % |
| Methanol | 1 wt % |

Then, a solution of 200 parts of PARIOCOLOR LC242 produced by BASF and 800 parts of MEK (methyl ethyl ketone) was applied on the film. The film was dried at 75° C., heat treated at 50° C. for 30 seconds, and hardened by being irradiated with rays of a wavelength of 365 nm, of which energy was 400 mJ/m$^2$. using a high-pressure mercury lamp. Thus, liquid crystal coated film 137 was obtained.

(Preparation of Retardation film Nos. 138, 142-144 as Comparative Examples)

Retardation film Nos. 142 and 144 as comparative examples were cast utilizing the dope of retardation film 101 by use of a belt casting system in a similar manner, and were peeled off under a condition of a tension at peeling-off of 60 N/m, a residual solvent amount of 15 weight % and a cold wind temperature of 45° C., followed by being subjected to a stretching treatment under the conditions shown in Table 4.

Comparative examples 138 and 143 were cast under the conditions shown in Table 4 utilizing a dope of retardation film 111 by use of a belt casting system in a similar manner.

TABLE 2

| | Polymer | | Peeling | | | Stretching | | | Layer | |
| | | | Tension | Residual solvent amount | Cold wind | Tension | Temperature | | thickness | |
| *1 | film type | Cellulose ester | (N/m) | (weight %) | (° C.) | (N/mm) | (° C.) | *2 | d (μm) | Remarks |
|---|---|---|---|---|---|---|---|---|---|---|
| 101 | CE | A | 130 | 100 | 20 | 170 | 140 | 20 | 80 | Inv. |
| 102 | CE | A | 130 | 100 | 20 | 170 | 140 | 22 | 80 | Inv. |
| 103 | CE | A | 120 | 100 | 20 | 170 | 140 | 30 | 80 | Inv. |
| 104 | CE | A | 120 | 100 | 20 | 170 | 140 | 30 | 80 | Inv. |
| 105 | CE | A | 120 | 60 | 20 | 170 | 140 | 31 | 80 | Inv. |
| 106 | CE | A | 100 | 60 | 20 | 170 | 140 | 32 | 80 | Inv. |
| 107 | CE | A | 120 | 65 | — | 180 | 140 | 35 | 100 | Inv. |
| 108 | CE | A | 120 | 65 | — | 185 | 140 | 38 | 100 | Inv. |
| 109 | CE | A | 115 | 60 | — | 185 | 140 | 40 | 100 | Inv. |
| 110 | CE | A | 110 | 60 | — | 185 | 130 | 42 | 100 | Inv. |
| 111 | CE | B | 100 | 98 | — | 140 | 145 | 19 | 40 | Inv. |
| 112 | CE | B | 100 | 50 | — | 140 | 145 | 23 | 40 | Inv. |
| 113 | CE | B | 100 | 97 | 5 | 140 | 145 | 23 | 45 | Inv. |
| 114 | CE | B | 95 | 44 | 5 | 140 | 145 | 25 | 40 | Inv. |
| 115 | CE | B | 95 | 48 | 5 | 140 | 145 | 25 | 45 | Inv. |
| 116 | CE | B | 90 | 90 | 5 | 125 | 130 | 28 | 35 | Inv. |
| 117 | CE | B | 90 | 80 | 5 | 125 | 140 | 25 | 25 | Inv. |

TABLE 2-continued

| *1 | Polymer film type | Cellulose ester | Peeling Tension (N/m) | Residual solvent amount (weight %) | Cold wind (° C.) | Stretching Tension (N/mm) | Stretching Temperature (° C.) | *2 | Layer thickness d (μm) | Remarks |
|---|---|---|---|---|---|---|---|---|---|---|
| 118 | CE | B | 85 | 80 | 5 | 130 | 145 | 18 | 20 | Inv. |
| 119 | CE | B | 95 | 75 | 5 | 145 | 145 | 27 | 50 | Inv. |
| 120 | CE | B | 80 | 34 | 10 | 145 | 145 | 28 | 60 | Inv. |

CE: cellulose ester film,
*1: Retardation film No.,
*2: Stretching condition (%)
Inv.: Inventive,
Comp.: Comparative

TABLE 3

| *1 | Polymer film type | Cellulose ester | Peeling Tension (N/m) | Residual solvent amount (weight %) | Cold wind (° C.) | Stretching Tension (N/mm) | Stretching Temperature (° C.) | *2 | Layer thickness d (μm) | Remarks |
|---|---|---|---|---|---|---|---|---|---|---|
| 121 | CE | B | 80 | 70 | 0 | 145 | 145 | 30 | 60 | Inv. |
| 122 | CE | B | 75 | 80 | 0 | 145 | 145 | 33 | 65 | Inv. |
| 123 | CE | B | 70 | 85 | −4 | 145 | 145 | 36 | 70 | Inv. |
| 124 | CE | C | 100 | 55 | −4 | 170 | 140 | 25 | 80 | Inv. |
| 125 | CE | C | 100 | 45 | 10 | 170 | 140 | 27 | 85 | Inv. |
| 126 | COP | — | 105 | 10 | 23 | 135 | 160 | 24 | 50 | Inv. |
| 127 | COP | — | 110 | 13 | 23 | 135 | 160 | 27 | 60 | Inv. |
| 128 | COP | — | 130 | 1 | 23 | 135 | 150 | 30 | 80 | Inv. |
| 129 | PC | — | 120 | 45 | 23 | 140 | 125 | 21 | 50 | Inv. |
| 130 | PC | — | 135 | 50 | 23 | 140 | 135 | 24 | 65 | Inv. |
| 131 | PC | — | 130 | 43 | 23 | 140 | 135 | 25 | 70 | Inv. |
| 132 | Polymer coated | — | 130 | 100 | 20 | 150 | 145 | 15 | 75 | Inv. |
| 133 | Polymer coated | — | 130 | 100 | 20 | 170 | 140 | 15 | 75 | Inv. |
| 134 | Polymer coated | — | 130 | 100 | 20 | 170 | 135 | 15 | 70 | Inv. |
| 135 | Polyvinyl Acetal | — | 95 | 40 | 23 | 160 | 140 | 20 | 50 | Inv. |
| 136 | CE | B | 130 | 60 | 20 | 120 | 150 | 25 | 45 | Inv. |

CE: cellulose ester film,
COP: cycloolefin polymer film,
PC: polycarbonate film
*1: Retardation film No.,
*2: Stretching condition (%)
Inv.: Inventive,
Comp.: Comparative

TABLE 4

| *1 | Polymer film type | Cellulose ester | Peeling-off Tension (N/m) | Residual solvent amount (weight %) | Cold wind (° C.) | Stretching Tension (N/mm) | Stretching Temperature (° C.) | *2 | Layer thickness d (μm) | Remarks |
|---|---|---|---|---|---|---|---|---|---|---|
| 137 | Liquid Crystal Coated | B | 100 | 45 | 10 | — | — | — | 72 | Inv. |
| 138 | CE | B | 160 | 90 | 45 | 220 | 130 | 20 | 48 | Comp. |
| 139 | CE | A | 120 | 75 | 22 | 130 | 135 | 35 | 60 | Inv. |
| 140 | CE | B | 120 | 80 | 22 | 130 | 140 | 32 | 60 | Inv. |
| 141 | CE | D | 115 | 65 | 22 | 115 | 125 | 25 | 60 | Inv. |
| 142 | CE | A | 60 | 15 | 45 | 130 | 140 | 18 | 80 | Comp. |

TABLE 4-continued

|  | Polymer | | | Peeling-off | | Stretching | | Layer | |
|---|---|---|---|---|---|---|---|---|---|
| | | | | Residual | Cold | | | | |
| *1 | film type | Cellulose ester | Tension (N/m) | solvent amount (weight %) | wind (° C.) | Tension (N/mm) | Temperature (° C.) | *2 | thickness d (μm) | Remarks |
| 143 | CE | B | 160 | 126 | 45 | 220 | 130 | 52 | 80 | Comp. |
| 144 | CE | A | 60 | 15 | 45 | 115 | 130 | 17 | 35 | Comp. |

CE: cellulose ester film,
*1: Retardation film No.,
*2: Stretching condition (%)
Inv.: Inventive,
Comp.: Comparative <Evaluation>

With respect to prepared retardation film Nos. 101-144, measurement of retardation Ro, Rt, and measurement of elastic modulus were performed to determine ($\epsilon_s/\epsilon_f$) value, ($\epsilon_s-\epsilon_f$) value and (($\epsilon_s+\epsilon_f$)×d) value, which were described in Table 5. (Herein, $\epsilon$: [MPa], d: [mm])

Next, polarizing plates were prepared in the following manner utilizing prepared retardation film Nos. 101-144 and said plates were subjected to the following evaluations.

<Preparation of Polarizing Plate>

Next, a polarizing plate was prepared utilizing each of retardation film Nos. 101-144.

Polyvinyl alcohol film having a thickness of 120 μm was uniaxially stretched (temperature of 110° C., stretching magnification of 5 times). This was immersed in an aqueous solution, comprising 0.075 g of iodine, 5 g of potassium iodide and 100 g of water, for 60 seconds and then immersed in an aqueous solution comprising 6 g of potassium iodide, 7.5 g of boric acid and 100 g of water, at 68° C. The resulting sample was washed and dried to prepare polarizer film.

Next, the polarizer film, each of the aforesaid retardation film Nos. 101-144, and an antireflection film KC8UX-RHA (manufactured by Konica Minolta Opto, Inc.) as a cellulose ester film for the back surface were pasted up together according to following processes 1-5, whereby polarizing plates were prepared.

Process 1: The surface to be pasted with a polarizer film of each of cellulose ester films 101-125, 132-144 and cellulose ester films used for the back surface of the polarizer film was saponificated by being immersed in 1 mol/L sodium hydroxide solution at 50° C. for 60 seconds, washed and then dried. Herein, the retardation films 126-131 were subjected to a plasma treatment instead of a saponification treatment to obtain hydrophilic surfaces.

Process 2: The aforesaid polarizer film was immersed in a polyvinyl alcohol adhesive bath having a solid content of 2 weight % for 1-2 seconds.

Process 3: The polarizer film, an excess adhesive adhered on which in Process 2 was lightly wiped off, was placed on the cellulose ester film having been treated in Process 1 and further laminated so that the antireflection layer of said cellulose ester film came to outside.

Process 4: The laminated films in Process 3 containing a retardation film, a polarizer film and a cellulose ester film were pasted up together at a pressure of 20-30 N/cm² and at a transport speed of approximately 2 m/min.

Process 5: The sample containing the polarizer film, the cellulose ester film and each of retardation film Nos. 101-144, which had been pasted up together in Process 4, was dried at 80° C. for 2 minutes to prepare polarizing plates 101-144.

<Preparation of Liquid Crystal Display>

The polarizing plate of a liquid crystal TV (Aquos 32AD5 produced by Sharp Corp.) available on the market was peeled off and the above prepared polarizing plates 101-144 each were pasted up on the glass surface of the liquid crystal cell.

At that time, the direction of pasting-up of the polarizing plate was arranged so that the surface of retardation film was placed on the liquid crystal cell side and the absorption axis lay in the same direction as that of the original polarizing plate. Thus, liquid crystal displays 101-144 were prepared.

<Evaluation>

<Front Contrast Evaluation>

The measurement was performed after each liquid crystal TV, while a back light of said liquid crystal TV was lit, had been kept for 30 minutes under an environment of 23° C. and 55% RH. In the measurement, EZ-Contrast 160D produced by ELDIM Corp. was utilized, and front luminance at white display and at black display of a liquid crystal TV were measured, a ratio of which was designated as a front contrast. The larger is the value, the more superior is the contrast.

The above evaluation results are shown in Tables 5 and 6.

TABLE 5

| Retardation film No. | Ro (nm) | Rt (nm) | Rt/Ro | Elastic modulus in TD direction ($\epsilon s$) | Elastic modulus in MD direction ($\epsilon f$) | $\epsilon s/\epsilon f$ | $\epsilon s - \epsilon f$ | ($\epsilon s + \epsilon f$) × d | Front contrast of liquid crystal display | Remarks |
|---|---|---|---|---|---|---|---|---|---|---|
| 101 | 30 | 70 | 2.33 | 1970 | 1250 | 1.58 | 720 | 258 | 850 | Inv. |
| 102 | 30 | 110 | 3.67 | 2500 | 1800 | 1.39 | 700 | 344 | 820 | Inv. |
| 103 | 40 | 120 | 3.00 | 3200 | 2200 | 1.45 | 1000 | 432 | 720 | Inv. |
| 104 | 40 | 135 | 3.38 | 3000 | 2240 | 1.34 | 760 | 419 | 750 | Inv. |

TABLE 5-continued

| Retardation film No. | Ro (nm) | Rt (nm) | Rt/Ro | Elastic modulus in TD direction (εs) | Elastic modulus in MD direction (εf) | εs/εf | εs − εf | (εs + εf) × d | Front contrast of liquid crystal display | Remarks |
|---|---|---|---|---|---|---|---|---|---|---|
| 105 | 45 | 120 | 2.67 | 3200 | 2340 | 1.37 | 860 | 443 | 765 | Inv. |
| 106 | 50 | 130 | 2.60 | 3400 | 1650 | 2.06 | 1750 | 404 | 820 | Inv. |
| 107 | 70 | 180 | 2.57 | 3000 | 1900 | 1.58 | 1100 | 490 | 778 | Inv. |
| 108 | 80 | 200 | 2.50 | 3080 | 1920 | 1.60 | 1160 | 500 | 765 | Inv. |
| 109 | 90 | 180 | 2.00 | 3100 | 1880 | 1.65 | 1220 | 498 | 780 | Inv. |
| 110 | 140 | 280 | 2.00 | 3315 | 1650 | 2.01 | 1665 | 497 | 775 | Inv. |
| 111 | 30 | 70 | 2.33 | 1790 | 1080 | 1.66 | 710 | 115 | 700 | Inv. |
| 112 | 40 | 120 | 3.00 | 4020 | 2080 | 1.93 | 1940 | 244 | 860 | Inv. |
| 113 | 40 | 135 | 3.38 | 4200 | 1750 | 2.40 | 2450 | 268 | 880 | Inv. |
| 114 | 45 | 120 | 2.67 | 4300 | 1810 | 2.38 | 2490 | 244 | 920 | Inv. |
| 115 | 45 | 130 | 2.89 | 4100 | 2200 | 1.86 | 1900 | 284 | 900 | Inv. |
| 116 | 38 | 105 | 2.76 | 4030 | 1550 | 2.60 | 2480 | 195 | 850 | Inv. |
| 117 | 36 | 115 | 3.19 | 3500 | 2200 | 1.59 | 1300 | 143 | 750 | Inv. |
| 118 | 31 | 95 | 3.06 | 3200 | 2550 | 1.25 | 650 | 115 | 600 | Inv. |
| 119 | 50 | 130 | 2.60 | 4100 | 1680 | 2.44 | 2420 | 289 | 890 | Inv. |
| 120 | 70 | 180 | 2.57 | 3850 | 2450 | 1.57 | 1400 | 378 | 840 | Inv. |
| 121 | 80 | 200 | 2.50 | 3820 | 2300 | 1.66 | 1520 | 367 | 800 | Inv. |
| 122 | 90 | 180 | 2.00 | 3510 | 2100 | 1.67 | 1410 | 365 | 820 | Inv. |

Inv.: Inventive,
Comp.: Comparative

TABLE 6

| Retardation film No. | Ro (nm) | Rt (nm) | Rt/Ro | Elastic modulus in TD direction (εs) | Elastic modulus in MD direction (εf) | εs/εf | εs − εf | (εs + εf) × d | Front contrast of liquid crystal display | Remarks |
|---|---|---|---|---|---|---|---|---|---|---|
| 123 | 140 | 280 | 2.00 | 3630 | 2300 | 1.58 | 1330 | 415 | 780 | Inv. |
| 124 | 35 | 140 | 4.00 | 3300 | 2420 | 1.36 | 880 | 458 | 785 | Inv. |
| 125 | 45 | 150 | 3.33 | 3480 | 2280 | 1.53 | 1200 | 490 | 775 | Inv. |
| 126 | 50 | 105 | 2.10 | 1900 | 1125 | 1.69 | 775 | 151 | 755 | Inv. |
| 127 | 65 | 135 | 2.08 | 2450 | 1385 | 1.77 | 1065 | 230 | 865 | Inv. |
| 128 | 140 | 400 | 2.86 | 3550 | 2650 | 1.34 | 900 | 496 | 780 | Inv. |
| 129 | 70 | 250 | 3.57 | 3200 | 2500 | 1.28 | 700 | 285 | 860 | Inv. |
| 130 | 100 | 250 | 2.50 | 3500 | 2550 | 1.37 | 950 | 393 | 810 | Inv. |
| 131 | 130 | 300 | 2.31 | 3650 | 2900 | 1.26 | 750 | 459 | 795 | Inv. |
| 132 | 60 | 200 | 3.33 | 3700 | 2860 | 1.29 | 840 | 492 | 770 | Inv. |
| 133 | 70 | 220 | 3.14 | 3700 | 2815 | 1.31 | 885 | 489 | 790 | Inv. |
| 134 | 80 | 240 | 3.00 | 4080 | 3000 | 1.36 | 1080 | 496 | 780 | Inv. |
| 135 | 50 | 250 | 5.00 | 4505 | 2900 | 1.55 | 1605 | 370 | 800 | Inv. |
| 136 | 25 | 125 | 5.00 | 4010 | 2600 | 1.54 | 1410 | 297 | 820 | Inv. |
| 137 | 145 | 290 | 2.00 | 3700 | 3000 | 1.23 | 700 | 482 | 750 | Inv. |
| 138 | 22 | 140 | 6.36 | 3950 | 2700 | 1.46 | 1250 | 319 | 590 | Comp. |
| 139 | 55 | 150 | 2.73 | 3300 | 2625 | 1.26 | 675 | 356 | 700 | Inv. |
| 140 | 33 | 118 | 3.58 | 1550 | 1070 | 1.45 | 480 | 105 | 710 | Inv. |
| 141 | 40 | 125 | 3.13 | 3310 | 2630 | 1.26 | 680 | 356 | 710 | Inv. |
| 142 | 50 | 145 | 2.90 | 4180 | 3800 | 1.10 | 380 | 638 | 550 | Comp. |
| 143 | 65 | 155 | 2.38 | 4320 | 1620 | 2.67 | 2700 | 475 | 610 | Comp. |
| 144 | 33 | 110 | 3.33 | 1575 | 1260 | 1.25 | 315 | 99 | 610 | Comp. |

Inv.: Inventive,
Comp.: Comparative

It is clear from Tables 5 and 6 that the retardation film of the present invention, which has a front contrast of not less than 700, has been improved in a front contrast ratio compared to retardation film of comparative examples, which has a front contrast not more than 610.

Example 2

Retardation film 201 was prepared in a similar manner to retardation film 101 of example 1, except that the following heating treatment was applied.

(Heating Treatment)
A web, after having been stretched by a tenter, was dried at 105° C. in a transport drying process, in which plural rolls were arranged up and down, until to make a residual solvent amount of 0.3 weight % to prepare film; then the prepared film was applied with a pressure treatment of 10 kPa along the thickness direction by use of nip rolls, which were multi-stepwise arranged, while further being heat treated for 20 minutes in an atmosphere of 110° C. and a rate of atmosphere replacement of 25 times/hour, followed by being cooled down to room temperature and wound, whereby retardation film 201 was prepared.

Retardation film Nos. 202-205 were prepared in a similar manner, except that such as a heating treatment temperature, an atmosphere substitution rate and presence or absence of a pressure treatment were varied and a free volume radius was controlled, as shown in Table 7.

A rate of atmosphere replacement of the above-described heating treatment process is a number of substitutions of the atmosphere by fresh-air per a unit time, which is determined according to the following equation, when an atmosphere volume of a heating room is V (m³) and a fresh-air flow rate is FA (m³/hr).

Rate of atmosphere replacement=FA/V (times/hour)

<Measurement of Free Volume Radius by Positron Annihilation Lifetime Spectroscopy>

A free volume radius of each retardation film was measured by the aforesaid positron annihilation lifetime spectroscopy.

With respect to prepared retardation film Nos. 201-205, a front contrast evaluation of example 1 was performed.

The above evaluation results are shown in Table 7.

TABLE 7

| Retardation film No. | Heat treatment temperature (° C.) | Rate of atmosphere replacement (times/hour) | Press treatment (kPa) | Free volume radius (nm) | Front contrast of liquid crystal display | Remarks |
|---|---|---|---|---|---|---|
| 201 | 135 | 25 | 10 | 0.25 | 940 | Inventive |
| 202 | 110 | 12 | — | 0.31 | 900 | Inventive |
| 203 | 100 | 10 | — | 0.315 | 850 | Inventive |
| 204 | 125 | 15 | 1 | 0.285 | 930 | Inventive |
| 205 | 130 | 40 | 5 | 0.245 | 950 | Inventive |

It has been proved that prepared retardation film Nos. 201-205 have been further improved in front contrast by adjusting the free volume radius into a preferable range (0.250-0.310 nm) of the present invention by means of the above described heating and pressure treatment.

Example 3

Retardation film was prepared in a similar manner to example 1, except that the tenter stretching system utilized in example 1 was changed to the tenter stretching system shown in FIG. 3, in which a web clipping length (a distance from the start of clipping to the end of clipping) was independently adjustable with left and right sides, and a front contrast of a liquid crystal display was evaluated in a similar manner to example 1; it has been proved that retardation film of the present invention have improved in a front contrast as much as or more than retardation film of example 1.

What is claimed is:

1. A liquid crystal display, comprising: a liquid crystal cell; and a polarizing plate provided on the liquid crystal cell and comprising a polarizer and a retardation film provided on at least one surface of the polarizer; wherein the retardation film is manufactured as a long roll film having a slow axis in a lateral direction of the long roll film, and the retardation film has an elastic modulus in an in-plane slow axis direction $\epsilon_s$ and an elastic modulus in an in-plane fast axis direction $\epsilon_f$ that meet Condition (1), the in-plane fast axis direction being perpendicular to the in-plane slow axis direction, $$1.26 \leq \epsilon s/\epsilon f \leq 2.60,  \quad \text{Condition (1)}$$

wherein the front contrast of the display is not less than 700.

2. The liquid crystal display of claim 1, wherein the elastic moduli $\epsilon_s$ and $\epsilon_f$ meet Conditions (2) and (3):

$$700 \leq \epsilon_s - \epsilon_f \leq 2450 \quad \text{Condition (2)}$$

$$100 \leq (\epsilon_s + \epsilon_f) \times d \leq 500 \quad \text{Condition (3)}$$

wherein a unit of $\epsilon$ is MPa and a unit of d is mm.

3. The liquid crystal display of claim 1, wherein the retardation film comprises a cellulose ester; and the cellulose ester comprises at least one selected from the group consisting of cellulose acetate, cellulose acetate propionate, and cellulose acetate butyrate.

4. The liquid crystal display of claim 1, wherein the retardation film comprises a retardation control agent.

5. The liquid crystal display of claim 1, wherein the retardation film comprises a cycloolefin polymer as a main component.

6. The liquid crystal display of claim 1, wherein the retardation film comprises a polycarbonate polymer as a main component.

7. The liquid crystal display of claim 1, wherein the retardation film comprises a polyvinyl acetal polymer as a main component.

8. The liquid crystal display of claim 1, wherein the retardation film comprises a support having thereon an optical anisotropic layer; and the retardation film has an optical axis.

9. The liquid crystal display of claim 1, wherein the slow axis of the retardation film is perpendicular or parallel to a transmission axis of the polarizer.

10. The liquid crystal display of claim 1, wherein the liquid crystal display is a vertical alignment mode liquid crystal display.

11. The liquid crystal display of claim 1, wherein the retardation film has an in-plane retardation value Ro is 30 to 100 nm and a retardation value in a thickness direction of the retardation film Rt is 70 to 300 nm, Ro and Rt being measured at a wavelength of 589 nm; and Rt/Ro is 2 to 5, $$Ro=(nx-ny) \times d$$

$$Rt=\{(nx+ny)/2-nz\} \times d$$

wherein nx represents a refractive index in the in-plane slow axis direction, ny represents a refractive index in the in-plane fast axis direction, nz represents a refractive index in the thickness direction of the retardation film and d represents a thickness of the retardation film (nm).

* * * * *